US008117587B1

(12) United States Patent
Testardi

(10) Patent No.: US 8,117,587 B1
(45) Date of Patent: Feb. 14, 2012

(54) MICROCONTROLLER-RESIDENT SOFTWARE DEVELOPMENT ENVIRONMENT SUPPORTING APPLICATION-LEVEL ASYNCHRONOUS EVENT HANDLING, INTERACTIVE DEBUGGING AND PIN VARIABLES FOR EMBEDDED SYSTEMS

(76) Inventor: Richard Paul Testardi, Boulder, CO (US)

( * ) Notice: Subject to any disclaimer, the term of this patent is extended or adjusted under 35 U.S.C. 154(b) by 789 days.

(21) Appl. No.: 12/177,802

(22) Filed: Jul. 22, 2008

Related U.S. Application Data

(60) Provisional application No. 61/129,081, filed on Jun. 3, 2008.

(51) Int. Cl.
*G06F 9/44* (2006.01)
*G06F 9/45* (2006.01)

(52) U.S. Cl. ...................... 717/100; 717/140
(58) Field of Classification Search .............. 717/100, 717/110, 124, 140, 148
See application file for complete search history.

(56) References Cited

U.S. PATENT DOCUMENTS

| 4,998,279 | A | * | 3/1991 | Weiss ........................... 340/5.52 |
| 5,740,351 | A | | 4/1998 | Kasten |
| 6,374,268 | B1 | | 4/2002 | Testardi |
| 6,446,251 | B1 | * | 9/2002 | Gardner et al. ............... 716/103 |
| 6,912,708 | B2 | | 6/2005 | Wallman et al. |
| 7,318,172 | B2 | | 1/2008 | Lou |
| 2001/0023489 | A1 | * | 9/2001 | Liu et al. ....................... 713/500 |
| 2002/0108028 | A1 | * | 8/2002 | Nunoe ........................... 712/233 |
| 2003/0065984 | A1 | | 4/2003 | Takeda et al. |
| 2003/0074650 | A1 | | 4/2003 | Akgul et al. |
| 2004/0083464 | A1 | * | 4/2004 | Cwalina et al. ............... 717/141 |
| 2005/0055665 | A1 | | 3/2005 | Woo et al. |
| 2007/0234070 | A1 | * | 10/2007 | Horning et al. ............... 713/190 |

OTHER PUBLICATIONS

Marinescu, Bogdan, Contest Entry M1685: ReVaLuaTe, Renesas Valuable Lua Terminal (Abstract), Jun. 28, 2005, 9 pages, published on Internet by Circuit Cellar at http://www.circuitcellar.com/renesas2005m16c/winners/abstracts/M1685_abstract.pdf.
Marinescu, Bogdan, Contest Entry M1685: ReVaLuaTe, Renesas Valuable Lua Terminal (Entry), Jun. 25, 2005, 73 pages, published on Internet by Circuit Cellar as file m1685.doc at http://www.circuitcellar.com/renesas2005m16c/winners/entries/M1685.zip.
Marinescu, Bogdan, Contest Entry M1685: ReVaLuaTe, Renesas Valuable Lua Terminal (Source file), Jun. 25, 2005, 1137 pages, published on Internet by Circuit Cellar at http://www.circuitcellar.com/renesas2005m16c/winners/entries/M1685.zip.
Marks, Daniel, Jumentum-SOC for the NXP ARM7TDMI Microcontrollers (Web page), May 24, 2008, published on Internet by Sourceforge.net at http://jumentum.sourceforge.net/.

(Continued)

*Primary Examiner* — Anna Deng

(57) ABSTRACT

An operating system including a software development environment is programmed into the on-chip flash memory of a system-on-a-chip type microcontroller. The software development environment is configured to reside entirely in the microcontroller's on-chip flash memory and includes an editor, a line-by-line bytecode compiler, a flasher, and an interactive debugger. A user operating a terminal emulator on a host computer connects to the microcontroller chip by means of a serial (USB) connection based on an FTDI protocol, or other serial link, in order to develop a BASIC program for the embedded system. The operating system is configured to permit external I/O pins on the microcontroller chip to be mapped to special "pin variables" for manipulation or examination by the user program, and to manage internal peripherals (timers, UARTs) of the microcontroller chip so as to permit application-level interrupt handling.

46 Claims, 28 Drawing Sheets

OTHER PUBLICATIONS

Marks, Daniel, Introduction to the Jumentum-SOC programming environment (Web page), dated Apr. 6, 2008, published on Internet by Sourceforge.net at http://jumentum.sourceforge.net/Introduction.txt.

Marks, Daniel, Jumentum-SOC Screenshots (Web page), modified May 24, 2008, published on Internet by Sourceforge.net at http://jumentum.sourceforge.net/screenshots.html.

Marks, Daniel, Jumentum-SOC, version 0.92.2 (Source file), Jun. 1, 2008, 1217 pages, retrieved from the file Jumentum-src-0.922.zip linked to from the page http://sourceforge.net/project/showfiles.php?group_id=224582.

Marks, Daniel, MiniOn Programming Environment version 0.9 (Source file), Apr. 16, 2008, 1743 pages, retrieved from the file Minion-src-0.9.zip linked to from the page http://ftp.heanet.ie/disk1/sourceforge/j/juijumentum/?C=M;O=A.

Marks, Daniel, Minibasic ARM 0.5e (Source file), Dec. 14, 2007, 597 pages, retrieved from the file minibasic-arm-0.5e.zip, published on the Internet at http://f1.grp.yahoofs.com/v1/YEOpSfDOGFtZiqCd-ve5Az3TFMhg3qfTS086K3Dr4fumLqdhkhLaDlaCrDKg7Ydi61-TqEVktlaKGXm6z7y6E1pTcvpFmueJ4r/minibasic-arm-0.5e.zip.

Marks, Daniel, GMANE Web Post: Subject: Minibasic-ARM 0.2b New Version, including full screen editor, Nov. 17, 2007, published on the Internet at http://article.gmane.org/gmane.comp.hardware.arm.lpc2100/28554.

Marks, Daniel, GMANE Web Post: Subject: Announcing Minibasic port to LPC2148, Nov. 15, 2007, published on the Internet at http://article.gmane.org/gmane.comp.hardware.arm.lpc2100/28499.

ARMexpress brochure, dated Aug. 10, 2007, accessed Mar. 2, 2009, 1 page, published on the Internet by Coridium Corp. at http://www.coridiumcorp.com/ARMexpress.pdf.

ARMexpress Help, select pages, accessed Mar. 2, 2009, 169 pages, published on the Internet by Coridium Corp. at http://www.coridiumcorp.com/files/ARMhelp.pdf.

ArmBasic 7.09 "On Timer" Statement Description, accessed Mar. 2, 2009, 2 pages, published on the Internet by Coridium Corp. at http://www.coridiumcorp.com/ARMhelp/scr/v7on.html.

ArmBasic 7.09 Web Announcement (announcing TIMER interrupts), dated Mar. 27, 2008, accessed Mar. 2, 2009, published on the Internet by Yahoo! Groups at http://tech.groups.yahoo.com/group/ARMexpress/message/399.

Grehan, Rick, MetroTRK: Target Resident Debugging Kernel for Embedded Systems, Nov. 2005, 11 pages, published by Freescale Semiconductor at http://www.freescale.com/files/soft_dev_tools/doc/white_paper/CWMETROTWP.pdf.

Akgul, Tankut et al., "A Debugger RTOS for Embedded Systems", 27th Euromicro Conference Proceedings, 2001, IEEE, pp. 264-269.

Inferno Web Literature, accessed Apr. 8, 2008, 12 pages, published on the Internet by Vita Nuova at http://www.vitanuova.com/inferno/index.html; http://www.vitanuova.com/solutions/embedded/index.html; and http://www.vitanuova.com/inferno/papers/dev.html.

BASIC Stamp FAQ, Jul. 21, 2000, 23 pages, published on the Internet by Parallax.com at http://www.parallax.com/dl/docs/prod/stamps/basicstampfaq.pdf.

Parallax Inc. Web Page, PBASIC Instruction Set, date unknown (modified Sep. 12, 2007), published on the Internet at http://www.johnloomis.org/ece445/stamp/pbasic.htm.

GW Basic User's Guide, Chapter 2 and description of ON COM(n), ON KEY(n), ON PEN ON PLAY(n), ON STRIG(n), and ON TIMER(n) Statements, 1987, Microsoft Corp., 19 pages, from http://www.divonasperi.it/divona/tam/tecnologia/dow-all/GW%20Basic-%20(inglese).pdf.

Web page, BASIC87x Interpreter for the PlCmicro® PIC16F876/PIC16F877 MCU, accessed on Jul. 5, 2008, currently archived on the Internet at http://web.archive.org/web/20080214205335/http://www.myke.com/mbaspg1.htm.

Wikipedia web page, Arduino, accessed Oct. 25, 2008, published on the Internet at http://en.wikipedia.org/wiki/Arduino.

Poulter Jr., Thomas C., A Practical Time-Shared Computer System, Hewlett-Packard Journal, Hewlett-Packard Corp., U.S.A., Jul. 1968, pp. 2-7.

Moley, Richard M., BASIC at Hewlett-Packard, Hewlett-Packard Journal, Hewlett-Packard Corp., U.S.A., Nov. 1968, pp. 9-13.

Peterson, Gerald L., BASIC: The Language of Time-Sharing, Hewlett-Packard Journal, Hewlett-Packard Corp., U.S.A., Nov. 1968, pp. 2-8.

Using the Edit and Continue Feature in C# 2.0, Microsoft Visual Studio 2005 Technical Articles, Oct. 2004, published on the Internet by Microsoft Corp. at http://msdn.microsoft.com/en-us/library/ms379578(VS.80,printer).aspx.

Vickery, Christopher, Debugging with gdb/ddd, date unknown (Prior Art), published on the Internet at http://babbage.cs.qc.edu/courses/cs701/Handouts/using_gdb.html.

Williams, David M., Use the Java Debugger to Determine the Causes of Errors, Jupitermedia Corporation, 2007, published on the Internet at http://www.devx.com/Java/Article/10530/1954.

Wikipedia web page, Java Virtual Machine, accessed Feb. 25, 2009, published on the Internet at http://en.wikipedia.org/wiki/Java_virtual_machine.

Wikipedia web page, Memory-mapped file, accessed Feb. 25, 2009, published on the Internet at http://en.wikipedia.org/wiki/Memory-mapped_file.

ColdFire V1 Core Fact Sheet, accessed Apr. 8, 2008, 2 pages, published on the Internet by Freescale Semiconductor at http://www.freescale.com/files/microcontrollers/doc/fact_sheet/CFV1COREFS.pdf.

Napier, Tom, "Forth Still Suits Embedded Applications", Electronic Design, Nov. 22, 1999, published on the Internet at http://electronicdesign.com/Articles/ArticleID/7489/7489.html.

Pall, Mike, Subject: Re: Lua for tiny embedded system (was: Sanity check), Lua-L archive post, Jul. 17, 2005, published on the Internet by lua-users.org at http://lua-users.org/lists/lua-l/2005-07/msg00221.html.

Wikipedia web page, Microcontroller, as edited at 06:46, Jul. 21, 2008, published on the Internet at http://en.wikipedia.org/w/index.php?title=Microcontroller&oldid=226946502.

Smith, Jack R., Programming the PIC Microcontroller with MBASIC, published 2005 by Elsevier Inc., Burlington, MA, U.S.A., pp. 17 to 27.

Web page, QuickBASIC (Tutorial), copyright UCF Computer Services I&R Support, Aug. 25, 1993, 15 pages, published on the Internet at http://www.petesqbsite.com/sections/tutorials/tutorials/qbtut.htm.

Testardi, R.P., CPUStick™ and StickOS™ User's Guide v1.01, to be published by the author on Jul. 22, 2008 at http://www.cpustick.com/downloads/cpustick.2p.pdf, 60 pages.

Nordman, Mikael, Flashforth for the PIC 18, 24, 30 and 33 (web page), accessed Sep. 14, 2011, published on the Internet by Sourceforge at http://flashforth.sourceforge.net/.

Nordman, Mikael, FlashForth Version 3.2 Source Files (last modified Jan. 27, 2008), extracted from FlashForth_32.zip, downloaded from FlashForth Old Files web page, published on the Internet at http://ftp.heanet.ie/mirrors/sourceforge/f/project/fl/flashforth/OldFiles/.

* cited by examiner

PRIOR ART

```
delta program
(RAM)

40 while a<10 do
50   let a=a+1
60 endwhile
20 (deleted)
```

```
base program
current bank (flash)

10 dim a
20 dim b
30 let a=0
```

```
base program
alternate bank (flash)
```

FIG. 12

```
delta program
(RAM)
```

```
base program
alternate bank (flash)
```

```
base program
current bank (flash)

10 dim a
30 let a=0
40 while a<10 do
50   let a=a+1
60 endwhile
```

FIG. 13

MICROCONTROLLER-RESIDENT SOFTWARE DEVELOPMENT ENVIRONMENT SUPPORTING APPLICATION-LEVEL ASYNCHRONOUS EVENT HANDLING, INTERACTIVE DEBUGGING AND PIN VARIABLES FOR EMBEDDED SYSTEMS

CROSS-REFERENCE TO RELATED APPLICATIONS

This application claims the benefit of U.S. Provisional Application No. 61/129,081, filed on Jun. 3, 2008, the entire contents of which is incorporated herein by reference.

INCORPORATION-BY-REFERENCE OF COMPUTER LISTING SUBMITTED BY EFS-WEB

A computer program listing appendix is submitted with this patent document by EFS-Web in two text files. All material in the two text files is incorporated by reference herein. The computer program listing appendix includes 1) a copyrighted .S19 ColdFire binary image file of the StickOS operating system renamed StickOSMCF52221v101elfS19.txt (original file name: StickOS.MCF52221.v1.01.elf.S19), dated Jun. 27, 2008, with a file size of 134,364 bytes, and 2) a copyrighted plain-text file which includes a computer source code listing of the StickOS operating system named sourcesv101.txt, dated Jun. 28, 2008, with a file size of 256,894 bytes (the maximum line length in the sourcesv101.txt file is 72 characters). The two text files are Microsoft Windows (or DOS) compatible ASCII-encoded files in IBM-PC machine format which may be opened with a plain text editor such as Microsoft WordPad. The files use standard line terminators (ASCII Carriage Return plus Line Feed), are not dependent on control characters or codes which are not defined in the ASCII character set, and are not compressed.

COPYRIGHT NOTICE AND AUTHORIZATION

A portion of the disclosure of this patent document contains material which is subject to copyright protection. The copyright owner has no objection to the facsimile reproduction by anyone of the patent document or the patent disclosure material, as it appears in the Patent and Trademark Office patent file or records, but otherwise reserves all copyright rights whatsoever.

BACKGROUND OF THE INVENTION (1) Field of the Invention

The present invention pertains to the field of software development for embedded systems. More particularly, the present invention pertains to the field of integrated software development environments for embedded systems in which the software specific to the development tasks is resident on the target microcontroller (MCU), with the target microcontroller being adapted to connect to a remote user terminal by means of a development-environment independent transport mechanism.

(2) Description of Related Art

FIG. 1 is a schematic representation of a first traditional approach to embedded system development. In this approach, a host computer 10 provides very low-level control of a CPU core 21 of a system-on-a-chip type microcontroller μC embedded in a target board 20 by controlling an external in-circuit emulator 30, which in turn controls the target board CPU core 21 using a low-level hardware mechanism (such as JTAG or BDM). The host computer also typically controls an external flash programmer 40 to download the target board control program to the target board's flash memory 22, also using a low-level hardware mechanism (such as JTAG or BDM).

As shown in FIG. 1, the editor, compiler, flasher, and debugger used for software development run on the host computer 10. The flasher and debugger interact with the flash programmer 40 and the in-circuit emulator 30 to control the CPU core 21 and the flash memory 22 on the target board 20.

In the software development process of FIG. 1, the host computer 10 is used to:

1. edit and store the target board control program source code,
2. compile the target board control program source code to a binary code suitable for the target board's CPU core, and generate symbolics information for debugging,
3. download the target board control program binary code to the target board's flash memory through the flash programmer, and
4. control the execution and debug of the target board control program, through the in-circuit emulator, until it is working correctly.

Once the target board control program is working correctly, the host computer 10 (and the in-circuit emulator 30 and flash programmer 40) can be disconnected from the target board 20, and the target board 20 can be run in stand-alone mode. Thereafter, typically, other target boards can be "just flashed" (step 3, above) by hooking them up to a much more limited form of a host computer (without the ability to edit, compile, or debug the target board control program) with a flash programmer.

FIG. 2 is a schematic representation of a second traditional approach to embedded system development. In this approach, the need for an in-circuit emulator (and potentially the need for a flash programmer) is removed by adding a small amount of protected low-level software to be executed by the target board's CPU core 21. This protected low-level software, known as a "debug monitor", communicates CPU state information to the host computer 10 over a development-environment dependent transport mechanism 50. The editor, compiler, flasher, and debugger software still run on the host computer 10, with the debug monitor essentially being a slave to the main flasher and debugger program running on the host computer 10.

An example of a target resident debugging kernel for embedded systems is shown at http://www.freescale.com/files/soft_dev_tools/doc/white_paper/CWMETROTWP.pdf (Grehan, Rick, MetroTRK: Target Resident Debugging Kernel for Embedded Systems).

U.S. Patent Application Publication 2005/0055665 to Woo et al. reveals a system and method for developing a target application on a target system in a cross development environment. A source editing unit is provided in the target system, but the cross compiling unit still resides on the host.

Other attempts have been made to incorporate embedded system development software/functionality into the target system.

A debugger which is disposed completely inside a real-time operating system and runs on the target processor (with the host running the user interface only) is described in Akgul, T. et al., "A Debugger RTOS for Embedded Systems", Euromicro Conference 2001 Proceedings, pages 264-269. A similar debugger is shown in U.S. Patent Application Publication 2003/0074650 to Akgul et al.

Compact operating systems such as Inferno (http://www.vitanuova.com/inferno/index.html; http://www.vitanuova.com/solutions/embedded/index.html; http://www.vitanuova.com/inferno/papers/dev.html; and http://www.vitanuova.com/mkt/press/Inferno_overview.pdf) can apparently be run on embedded devices having as little as 1 MB of RAM. In one configuration, Inferno includes an integrated development environment (IDE), compiler, shell, and graphical debugger.

A development platform which can be used to develop and run programs on a Renesas M30626FHPFP processor independently of a host PC is described in a published contest entry entitled "ReVaLuaTe" by Bogdan Marinescu submitted for the Renesas M16C Design Contest 2005 (see http://www.circuitcellar.com/renesas2005m16c/winners/1685.htm and the linked "Abstract" page and the "Entry" link which points to the source-code containing file M1685.zip). The ReVaLua Te platform includes a Lua bytecode compiler, a built-in editor, and a flasher. The entry further suggested that an interactive debugger might be added as an important feature and was seen by the author to be "not as difficult as it sounds" (see Section 8, Conclusions and Future Work). However, during program development, the ReVaLuaTe system apparently requires the storage of both a source file and Lua compiled file (which is compiled from the source file with the "comp" command); this may result in increased memory requirements for the system during program development. Moreover, the ReVaLuaTe architecture utilized a 512 kB off-chip SRAM in addition to the processor RAM and flash. For system-on-a-chip (SoC) type embedded microcontroller applications, it is highly desirable that the development environment software reside completely in and run completely from the on-chip memory of the microcontroller chip itself, without the need for external (i.e., off the microcontroller chip) memory. It is also desirable that the interactive debugger have the ability to modify data (e.g., the values of program variables) and alter code execution during debug.

Recently, the Jumentum-SOC (formerly called MiniOn) programming environment for LPC2000-based microcontroller chips has been developed and published by Daniel Marks (http://jumentum.sourceforge.net/; formerly http://minion-system.sourceforge.net/; see also the source-code containing file Jumentum-src-0.92.2.zip linked to from the page http://sourceforge.net/project/showfiles.php?group_id=224582). The Jumentum-SOC programming environment is intended to lower both the cost and complexity of microcontroller embedding and uses a Basic-derived language. It is remotely programmable through the use of a web browser, a TELNET text-based session, or a serial port. The Basic programming environment is self-contained on the microcontroller chip and uses a built-in text editor and a Basic interpreter for program creation and execution. Jumentum-SOC programs (e.g., user programs) can be downloaded into the microcontroller and programmed into the microcontroller's flash memory so that the programs are automatically run when the microcontroller is powered up. The programs can be started, stopped, paused, and the program variables inspected at any time through the web browser page. However, for system-on-a-chip (SoC) type embedded microcontroller applications, it is desirable to use a bytecode or native compiler rather than an interpreter for performance reasons. It is also desirable to incorporate an interactive debugger, with the ability to modify data (e.g., the values of program variables) and alter code execution during debug.

Finally, when considering the ReVaLuaTe and Jumentum-SOC systems, it is desirable that such a microcontroller-resident software development environment support application-level interrupt handlers and the use pin variables which can be bound to the external I/O pins of the microcontroller chip. This is particularly true for embedded systems where a fast "external event response time" can be critical to the application.

BRIEF SUMMARY OF THE INVENTION

It is an object of the invention to provide a target microcontroller chip with a small, self-contained development environment which includes a compiler which runs entirely in the on-chip memory of the target microcontroller and which can be accessed and controlled by means of a separate terminal (or terminal emulator) connected to the target microcontroller chip through a standard communications interface.

It is another object of the invention to provide such a self-contained development environment which includes an application-level interrupt handler.

It is another object of the invention to provide such a self-contained development environment which includes an interactive debugger.

It is another object of the invention to provide such a self-contained development environment which features the use of "pin variables" bound to the I/O pins of the target microcontroller chip.

In one respect, the invention relates to a programmed system-on-a-chip computer for embedded systems comprising a microcontroller chip having at least one on-chip CPU core, on-chip memory including an on-chip programmable non-volatile memory and an on-chip RAM, an on-chip communications interface adapted to be connected to a user terminal and configured to receive and transmit source code symbolic information, and I/O pins adapted to interface between the microcontroller chip and a system in which the microcontroller chip is to be embedded. An operating system for the computer includes a trusted layer which is wholly programmed into the on-chip programmable non-volatile memory and which is configured to run on the CPU core. The trusted layer includes a compiler configured to compile the source code symbolic information input by a user through the user terminal into a target program to be stored in the on-chip memory. The trusted layer also includes a non-volatile memory controller configured to save the target program to the on-chip programmable non-volatile memory. The trusted layer further includes an interrupt service module having an on-chip event detector which is configured to detect an asynchronous on-chip event specified in the target program during execution of the target program and trampoline code which is configured to invoke, in response to the event detected by the on-chip event detector, an application-level interrupt handler which handles an interrupt specified for the event by executing a specific portion of the target program. The trusted layer is configured to run the target program in an application layer.

In another respect, the invention relates to a stand-alone programmed system-on-a-chip computer for embedded systems comprising a microcontroller chip having at least one on-chip CPU core, on-chip memory including an on-chip programmable non-volatile memory and an on-chip RAM, an on-chip serial communications interface adapted to be connected to a user terminal and configured to bidirectionally receive and transmit program lines of source code symbolic information, and I/O pins adapted to interface between the microcontroller chip and a system in which the microcontroller chip is to be embedded. An operating system for the computer includes a trusted layer which is wholly programmed into the on-chip programmable non-volatile memory and which is configured to run on the CPU core without need of external memory. The trusted layer includes a compiler configured to automatically and individually compile, on a line-by-line basis, the program lines of source code symbolic information input by a user through the user terminal into a target program to be stored in the on-chip memory. The trusted layer also includes a non-volatile memory controller configured to save the target program to the on-chip programmable non-volatile memory. The trusted layer further includes an interactive debugger operatively configured to enable interactive debugging of the target program. The trusted layer is configured to run the target program in an application layer.

In still another respect, the invention relates to a programmed system-on-a-chip computer for embedded systems comprising a microcontroller chip having at least one on-chip CPU core, on-chip memory including an on-chip programmable non-volatile memory and an on-chip RAM, an on-chip communications interface adapted to be connected to a user terminal and configured to receive and transmit source code symbolic information, and I/O pins adapted to interface between the microcontroller chip and a system in which the microcontroller chip is to be embedded. An operating system for the computer includes a trusted layer which is wholly programmed into the on-chip programmable non-volatile memory and which is configured to run on the CPU core. The trusted layer includes: A) a compiler configured to compile the source code symbolic information input by a user through the user terminal into a target program to be stored in the on-chip memory; B) a non-volatile memory controller configured to save the target program to the on-chip programmable non-volatile memory; C) an interactive debugger operatively configured to enable interactive debugging of the target program; D) a pin controller selectively configuring the I/O pins of the microcontroller chip to be input pins or output pins; and E) an interrupt service module including: i) an on-chip event detector which is configured to detect an asynchronous on-chip event specified in the target program during execution of the target program; and ii) trampoline code which is configured to invoke, in response to the event detected by the on-chip event detector, an application-level interrupt handler which handles an interrupt specified for the event by executing a specific portion of the target program. The trusted layer is configured to run the target program in an application layer.

In yet another respect, the invention relates to a programmed system-on-a-chip computer for embedded systems comprising a microcontroller chip having at least one on-chip CPU core, on-chip memory including an on-chip programmable non-volatile memory and an on-chip RAM, an on-chip communications interface adapted to be connected to a user terminal and configured to receive and transmit source code symbolic information, I/O pins adapted to interface between the microcontroller chip and a system in which the microcontroller chip is to be embedded, and I/O registers connected to the I/O pins for reading current pin states and storing output pin data. An operating system for the computer includes a trusted layer which is wholly programmed into the on-chip programmable non-volatile memory and which is configured to run on the CPU core. The trusted layer includes: A) a compiler configured to compile the source code symbolic information input by a user through the user terminal into a target program to be stored in the on-chip memory; B) a non-volatile memory controller configured to save the target program to the programmable non-volatile memory; C) a pin controller selectively configuring the I/O pins of the microcontroller chip to be input pins or output pins; and D) a variable access module configured to define at least one pin variable which is bound to one of the I/O pins of the microcontroller chip through one of the I/O registers. The trusted layer is configured to run the target program in an application layer.

In yet still another respect, the invention relates to a method of self-upgrading an operating system of a programmed system-on-a-chip computer. The programmed system-on-a-chip computer includes a microcontroller chip having at least one on-chip CPU core, on-chip memory including an on-chip programmable non-volatile memory and an on-chip RAM, the on-chip programmable non-volatile memory including a first portion and a second portion; an on-chip communications interface adapted to be connected to a user terminal and configured to receive and transmit source code symbolic information and object code information, and I/O pins adapted to interface between the microcontroller chip and a system in which the microcontroller chip is to be embedded. An operating system for the computer includes a trusted layer which is wholly programmed into the on-chip programmable non-volatile memory and which is configured to run on the CPU core without need of external memory. The trusted layer includes a compiler configured to compile the source code symbolic information input by a user through the user terminal into a target program to be stored in the on-chip memory. The trusted layer also includes a non-volatile memory controller configured to save the target program to the second portion of the on-chip programmable non-volatile memory. The trusted layer further includes a small upgrade control program, and is configured to run an application layer that includes the target program. In this respect, the self-upgrading method according to the invention comprises the steps of: I) by the original operating system, erasing the second portion of the on-chip programmable non-volatile memory; II) by the original operating system, programming a new version of the operating system into the second portion of the on-chip programmable non-volatile memory; III) by the original operating system, copying the small upgrade control program from the first portion of the on-chip programmable non-volatile memory to the on-chip RAM and executing the small upgrade control program from the on-chip RAM; IV) by the small upgrade control program, erasing the original operating system and copying the new version of the operating system from the second portion of the on-chip programmable non-volatile memory to the first portion of the on-chip programmable non-volatile memory; and V) erasing the second portion of the on-chip programmable non-volatile memory and resetting the programmed system-on-a-chip computer.

In yet still a further respect, the invention relates to a method of controlling a programmed microcontroller having I/O pins through the use of pin variables in a microcontroller program, the method comprising the steps of: providing I/O registers connected to the I/O pins for reading current pin states and storing output pin data; selecting at least one I/O pin of the microcontroller to function as one of an input pin and an output pin; designating for each selected I/O pin a signal type to be carried by the I/O pin as one of analog, digital, and uart; for each selected I/O pin, declaring a pin variable, configuring the selected function and the designated signal type of the I/O pin, and binding the pin variable to the I/O pin through at least one of the I/O registers by means of a single program statement; for all selected I/O pins, incorporating each respective single program statement into the microcontroller program; running the microcontroller program on the microcontroller; and manipulating each pin variable bound to one of the I/O pins configured as an output pin so as to cause an output state of the output pin to change correspondingly, and examining each pin variable bound to one of the I/O pins configured as an input pin to cause an input state of the input pin to be detected. (It is noted that the steps of this method can be performed in varying order in accordance with the invention. For example, the examining step could be performed before the running step, e.g., as part of a debug routine.)

The invention will, however, be more fully understood by a reading of the following detailed description in conjunction with the accompanying drawings, in which:

BRIEF DESCRIPTION OF THE SEVERAL VIEWS OF THE DRAWING(S)

Figure 6:
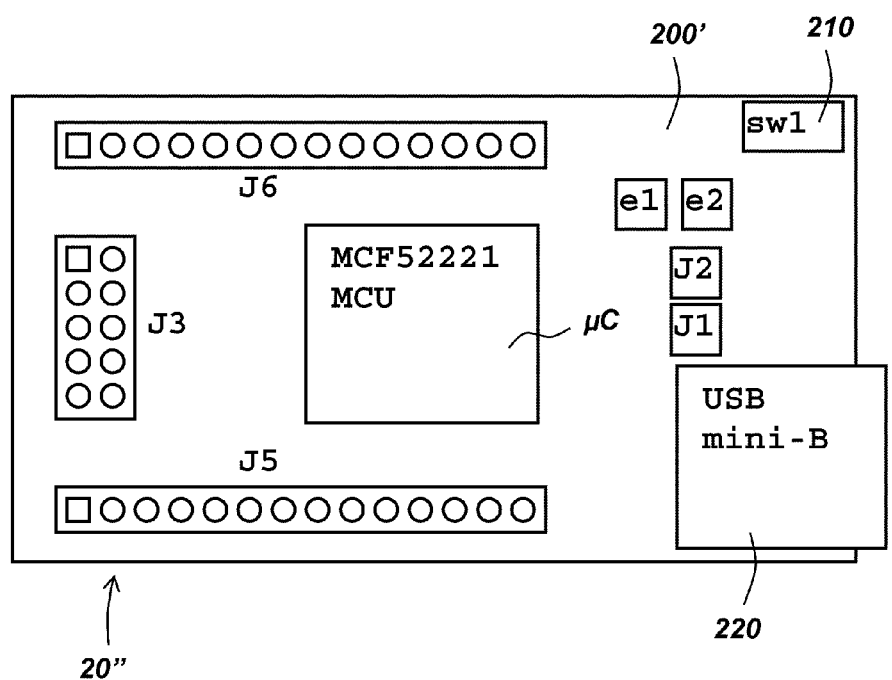
FIG. 6 is a diagrammatic representation of a CPUStick target board which can be used as part of the microcontroller-resident software development environment system shown in FIG. 3 according to a second preferred embodiment of the invention.

FIGS. 8A to 8D together show the component and conductive trace layouts for the target board of FIG. 6.

Figure 3:
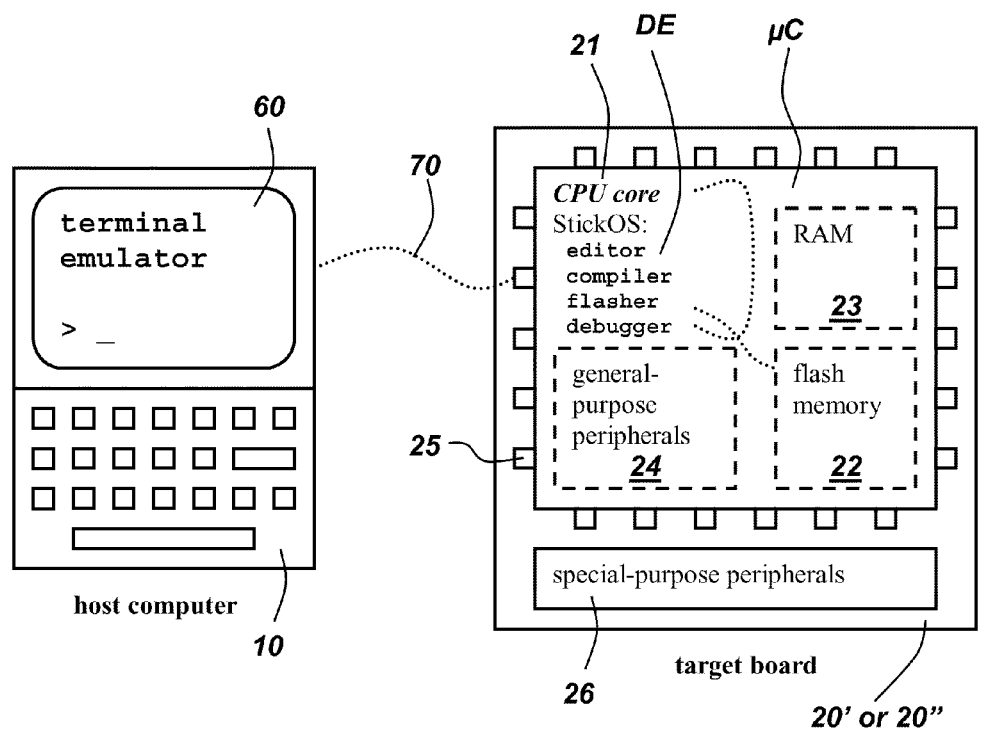
FIG. 3 is a conceptual representation of a microcontroller-resident software development environment system according to a preferred embodiment of the invention.
Figure 4:
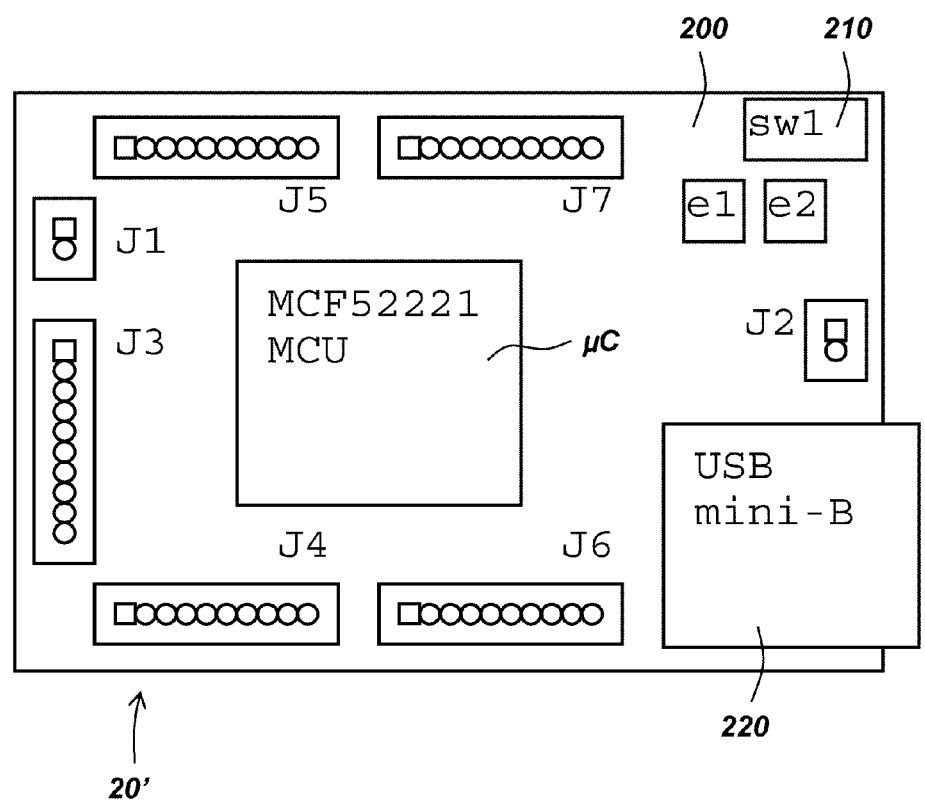
FIG. 4 is a diagrammatic representation of a CPUStick target board which can be used as part of the microcontroller-resident software development environment system shown in FIG. 3 according to a first preferred embodiment of the invention.
Figure 9:
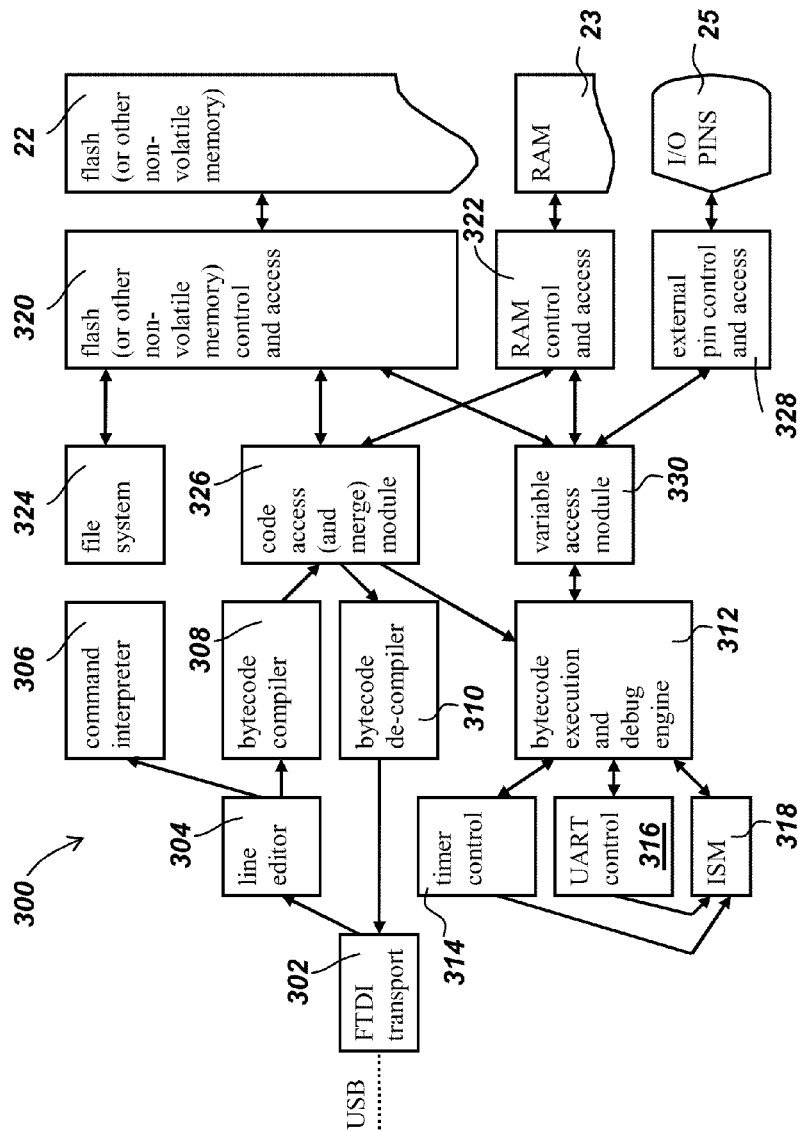
Figure 10:
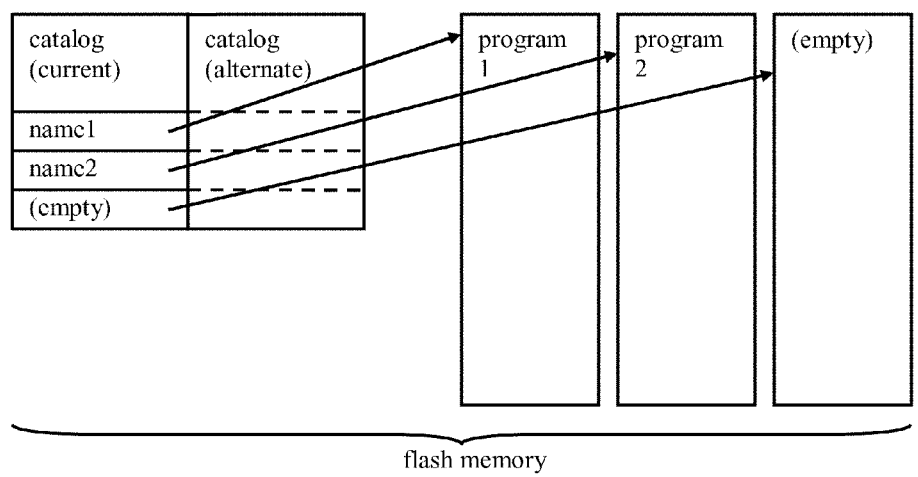
Figure 11:
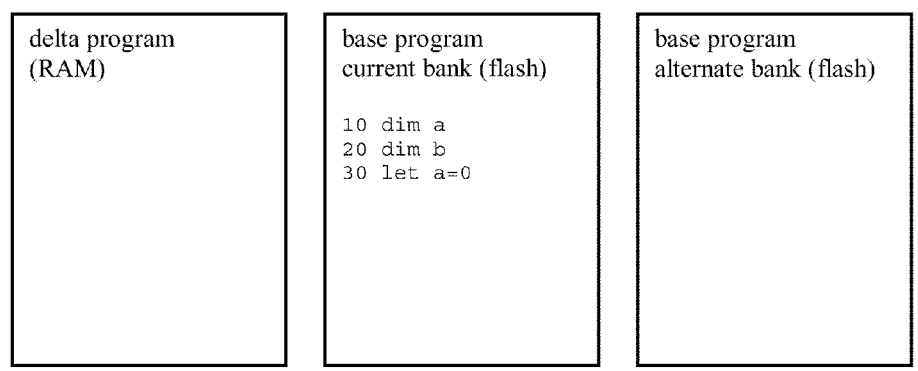
Figure 14:
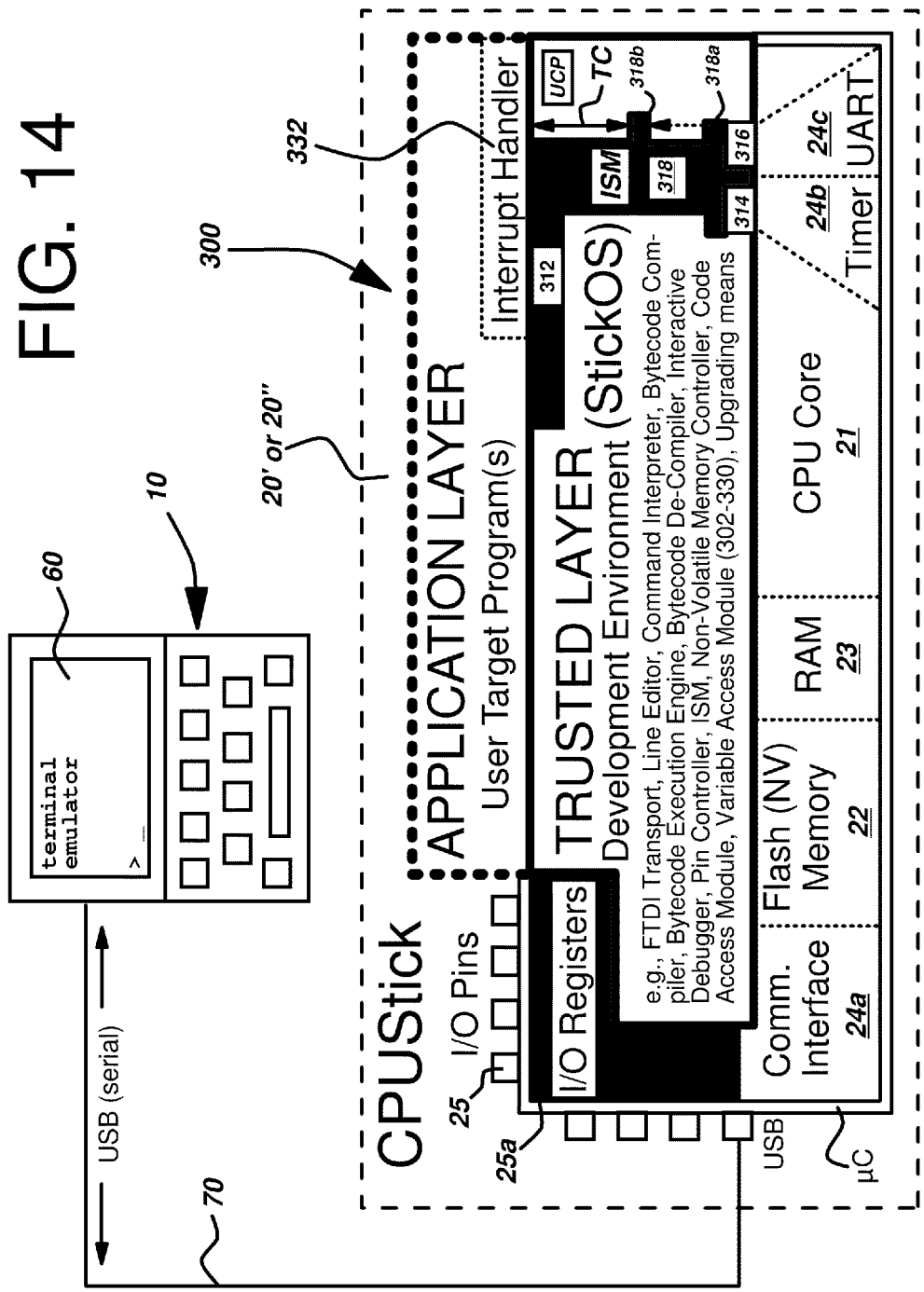
Figure 15:
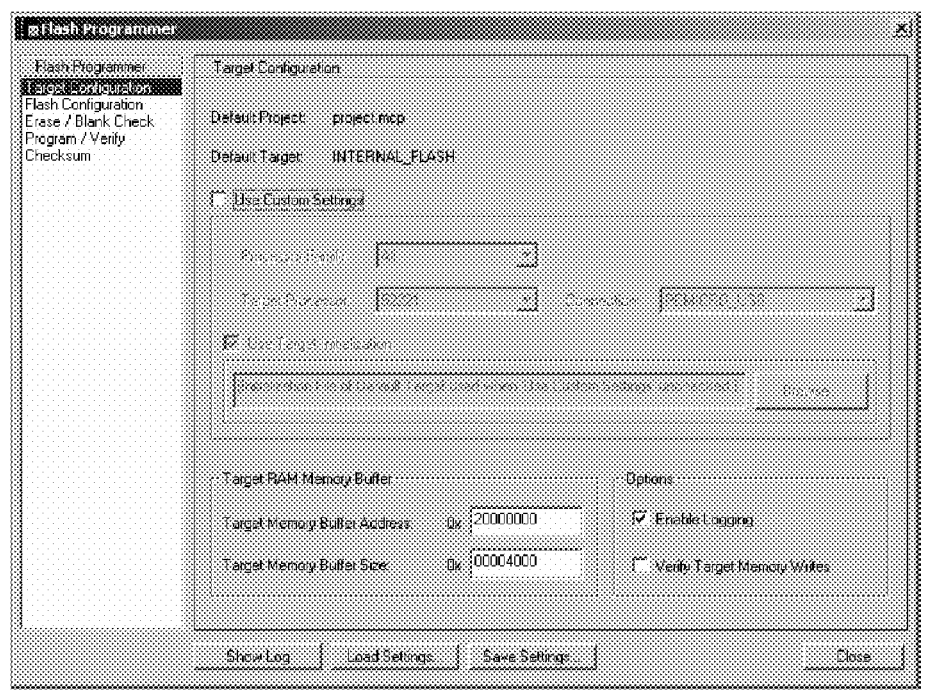
Figure 16:
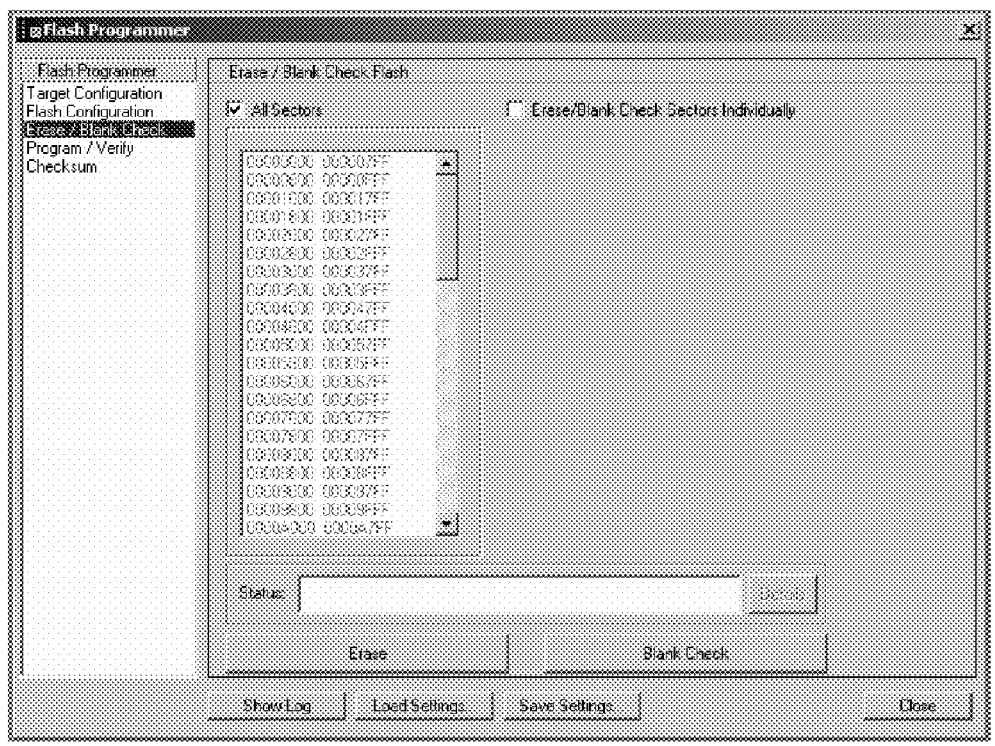
Figure 17:
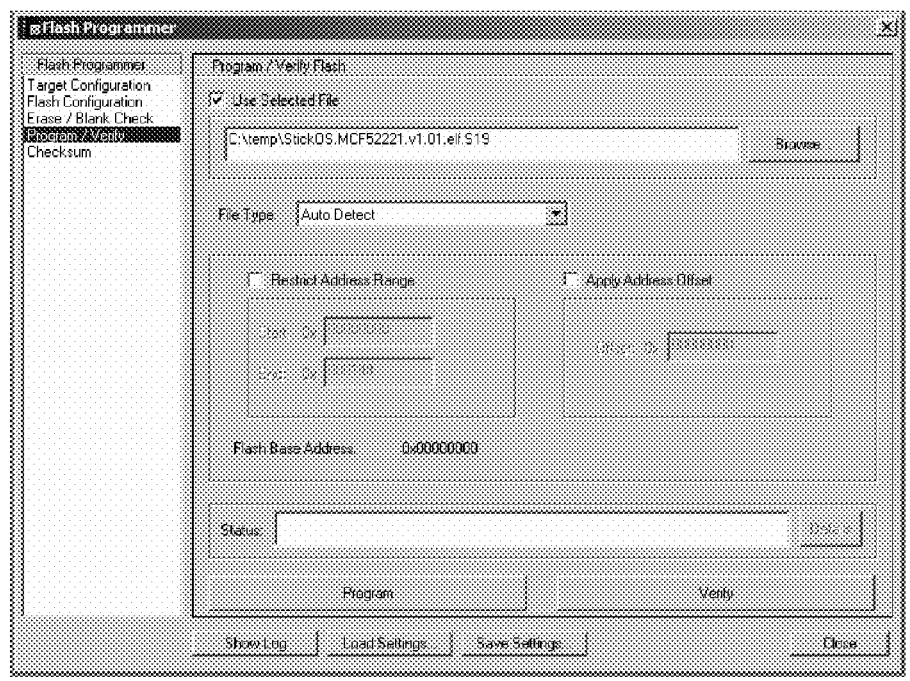
Figure 18:
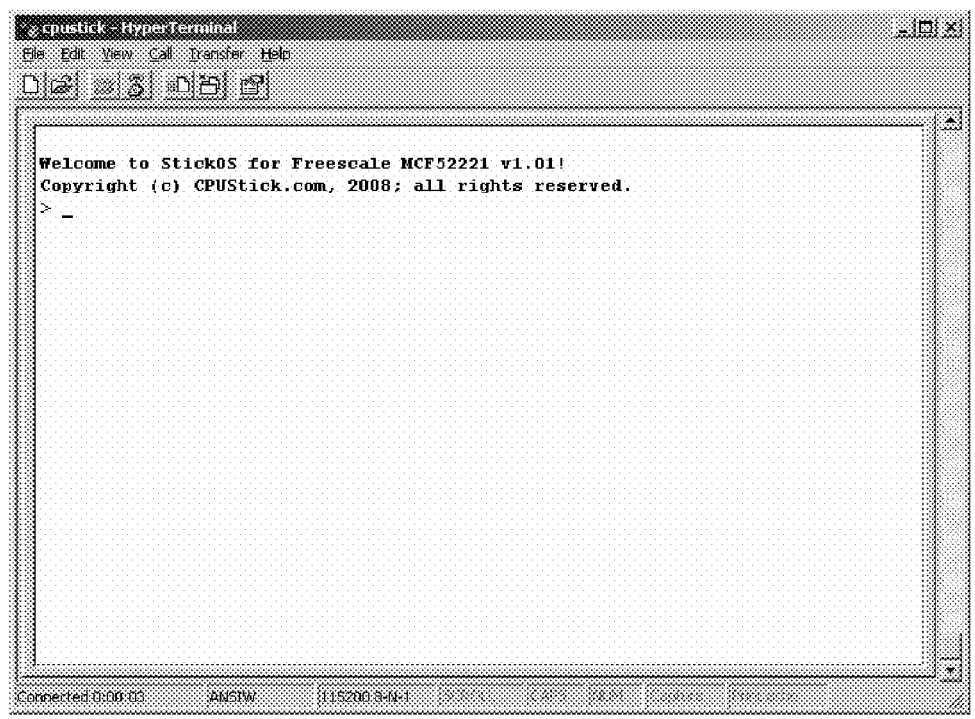
Figure 19:
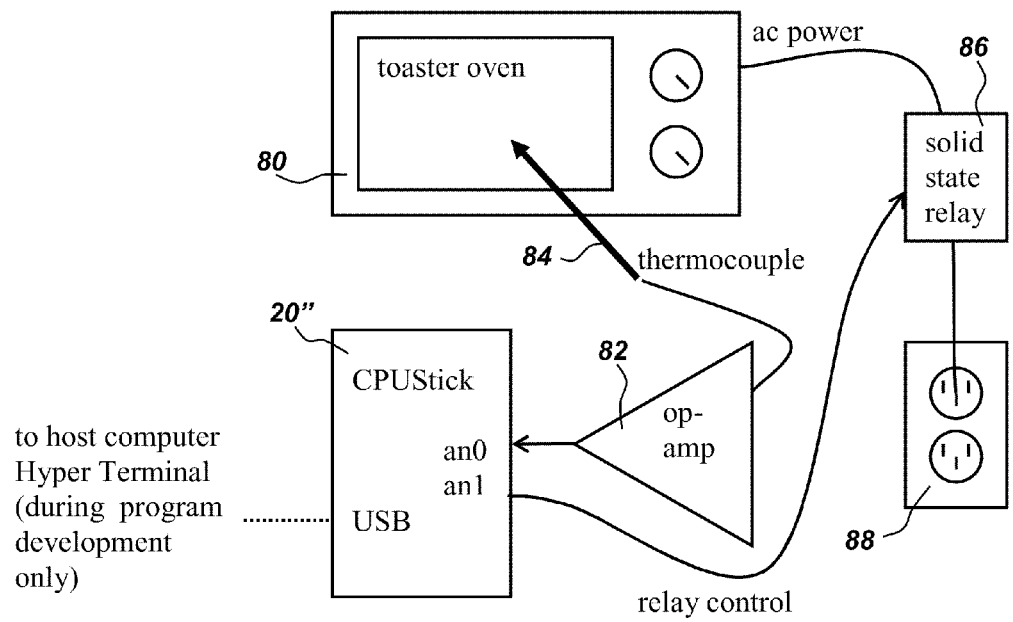
Figure 20:
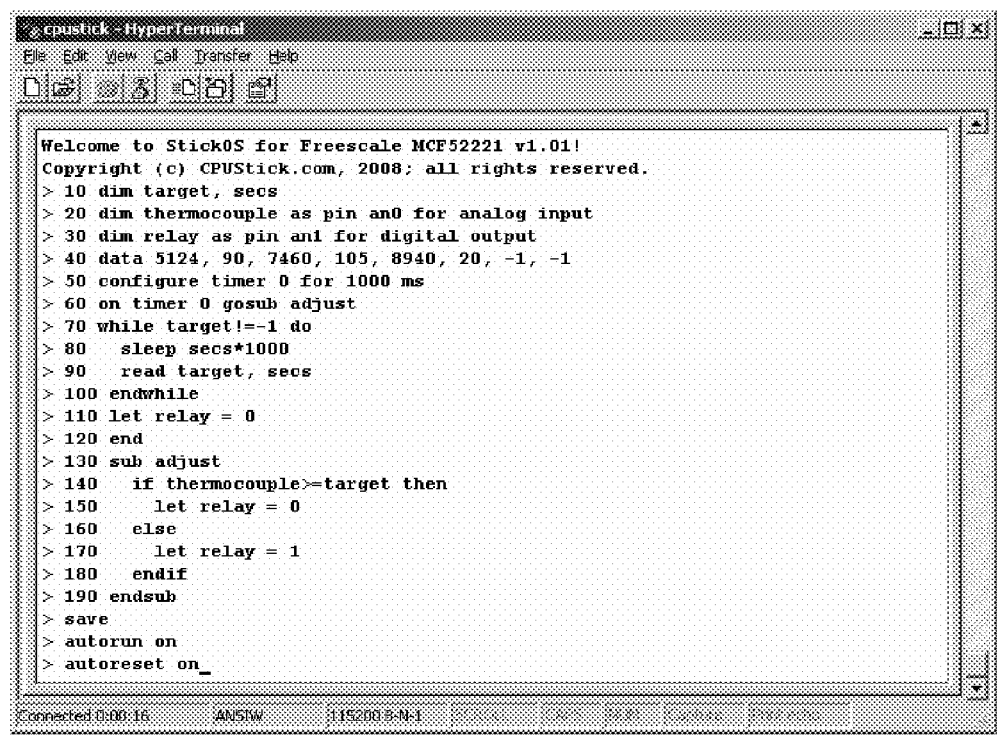
Figure 21:
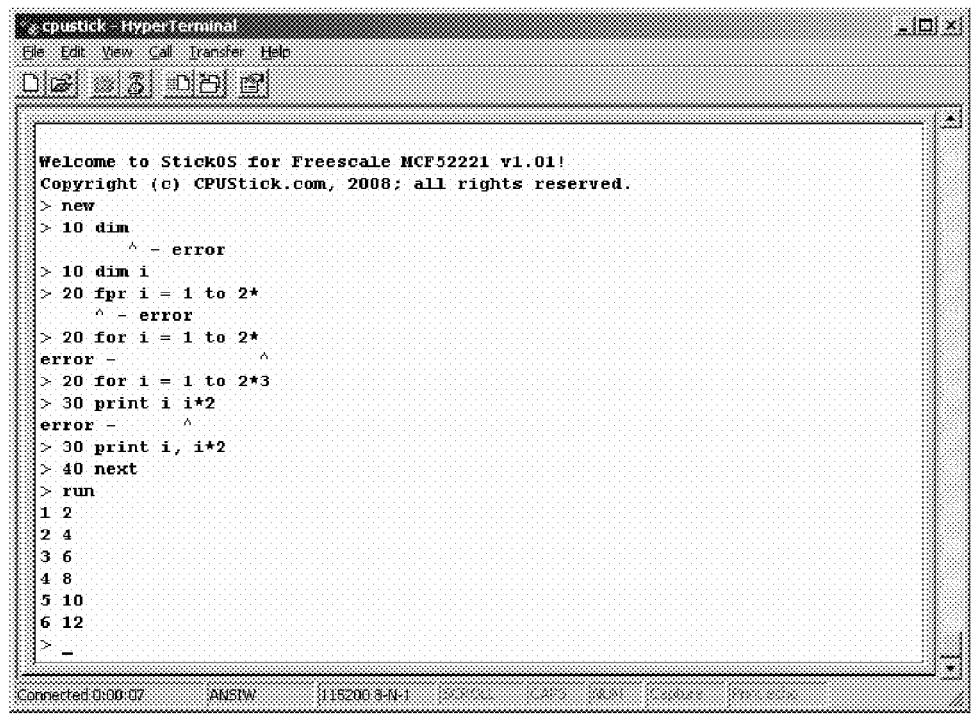

FIG. 9 is a diagrammatic overview of the software architecture for the StickOS operating system which can run on the target board of FIG. 4 or FIG. 6 according to a preferred embodiment of the invention;

FIG. 10 is a diagram of the StickOS file system;

FIGS. 11 to 13 are diagrams of the manner in which a delta program stored in RAM can be merged with a base program stored in a flash page;

FIG. 14 is a hybrid diagram showing the manner in which the CPUStick target board of FIG. 4 or FIG. 6 and the StickOS operating system of FIG. 9 can interact to produce the microcontroller-resident software development environment system of FIG. 3 according to a preferred embodiment of the invention;

FIG. 15 is a screenshot of the Flash Programmer window in CodeWarrior;

FIG. 16 is a screenshot of the Erase/Blank Check panel in CodeWarrior;

FIG. 17 is a screenshot of the Program/Verify Flash panel in CodeWarrior;

FIG. 18 is a screenshot of the Welcome screen for StickOS;

FIG. 19 is a diagram showing how a programmed CPUStick may be used to control a toaster oven;

FIG. 20 is a screenshot of the program which controls the toaster oven in FIG. 19;

FIG. 21 is a screenshot showing the manner in which a StickOS program can be entered by a user with line-by-line error reporting, and then executed.

DETAILED DESCRIPTION OF THE PREFERRED EMBODIMENTS OF THE INVENTION

This detailed description is arranged in the following order with the Section and Subsection headings indicated below:
1. Introduction to the Preferred Embodiment
2. The custom target board: CPUStick
3. The stand-alone operating system: StickOS
   A. Operating System Architecture
      i. FTDI Transport
      ii. Line Editor
      iii. Command Interpreter
      iv. Bytecode
      v. Bytecode Compiler
      vi. Bytecode De-Compiler
      vii. Bytecode Execution Engine
      viii. Interrupt Service Module and Interrupt Handler
      ix. Interactive Debugger
      x. Flash Control and Access
      xi. RAM Control and Access
      xii. File System
      xiii. Code Access and Merge Module
      xiv. Pin Variables
      xv. External Pin Control and Access
      xvi. Variable Access Module
   B. Operating System Commands and BASIC Features
4. The programmed computer: StickOS on CPUStick
5. Initial code load
6. Running StickOS on CPUStick
7. Cloning
8. Upgrading
9. Usage examples
10. Building StickOS from source code
11. Other modifications
12. Reference to User's Guide

1. Introduction to the Preferred Embodiment

Figure 1:
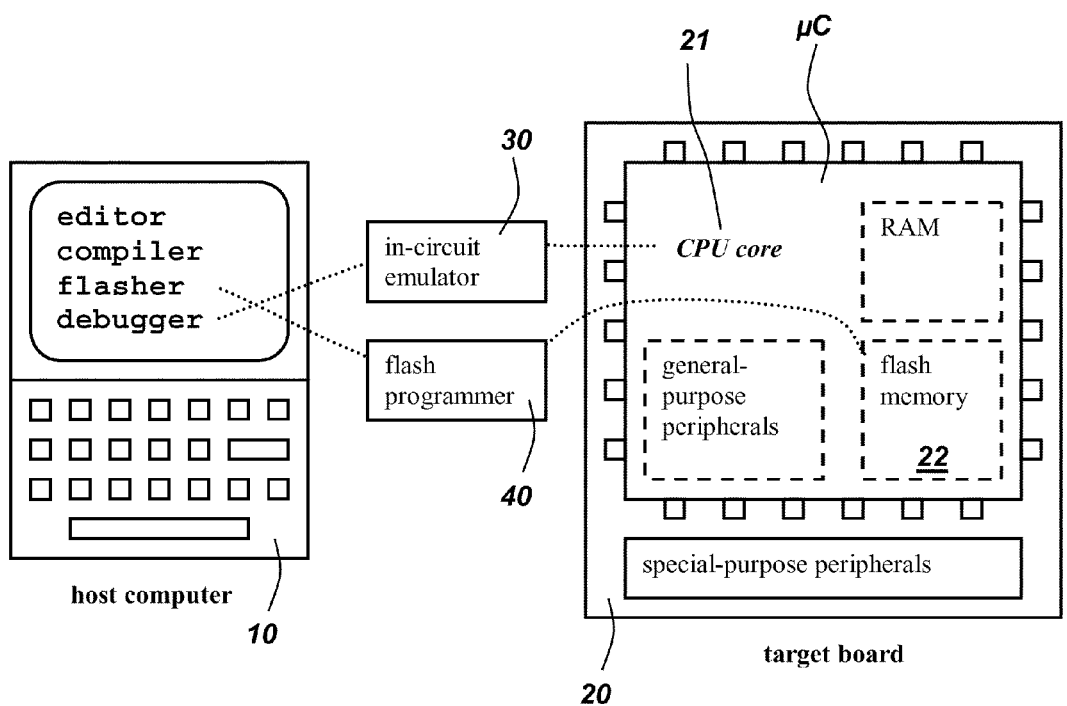
FIG. 1 is a conceptual representation of a prior-art development environment for microcontroller-based embedded systems.
Figure 2:
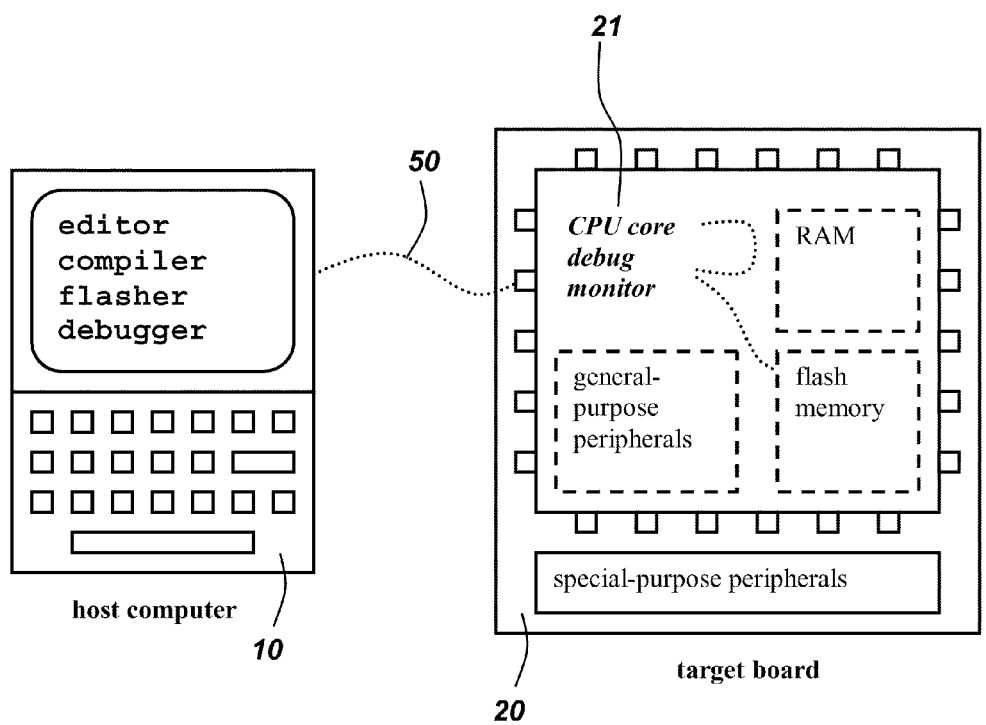
FIG. 2 is a conceptual representation of a second prior-art development environment for microcontroller-based embedded systems.

Referring now to the drawings in which like reference characters indicate like elements throughout, there is shown in FIG. 3 a conceptual overview of a preferred embodiment of the invention which can be contrasted with the prior art depicted by FIGS. 1 and 2. A microcontroller-resident software development environment DE is programmed into a system-on-a-chip (SoC, SiP, MCM) type microcontroller chip μC located on a target board 20' or 20". The microcontroller-resident software development environment DE, which includes an editor, a compiler, a flasher, and a debugger, is part of an operating system called StickOS which runs on the microcontroller chip μC. The microcontroller chip μC is connected to a terminal 60 of the host computer 10 via a serial (or data) connection 70.

In one embodiment of the invention, the microcontroller chip μC is a Freescale MCF52221 Coldfire® Integrated Microcontroller (part designation MCF52221CAE66) running at e.g., 48 MHz and having a CPU core 21, on-chip flash memory 22, on-chip RAM 23, on-chip general-purpose peripherals 24, and I/O (input/output) pins 25. The terminal 60 is a terminal emulator (such as Windows' Hyper Terminal, or PuTTY from http://www.putty.org/) running on a personal computer. The serial connection 70 includes an on-chip USB interface of the Freescale MCF52221 Coldfire® microcontroller chip μC which connects to a USB port on the host computer 10 via a USB cable. However, it is envisioned that other microcontrollers (such as an NXP LPC2141/42/44/46/48) may be employed in place of the Freescale microcontroller, a dumb terminal or a web browser may be used in place of the terminal emulator, and other communications interfaces (such as wireless interfaces, LAN interfaces and RS232 interfaces) may be used in place of the USB interface. Special-purpose peripherals 26 (such as an accelerometer) may additionally be integrated onto the target board 20' or 20". Moreover, while the preferred embodiment uses a custom target board 20' or 20" called CPUStick hereinafter, in another embodiment the target board is the Freescale M52221DEMO (MCF52221 Demonstration Board) development board, which includes the MCF52221 Coldfire® Integrated Microcontroller and other special-purpose peripherals helpful for program development.

As used herein, the phrase "microcontroller chip" is meant to include any microcontroller housed in a single, unitary integrated-circuit package (i.e., of the type commonly known as a "chip" or an "IC"). Inside the package housing, the microcontroller itself may be fabricated as or from 1) a single silicon chip (SoC), 2) a system-in-package (SiP), or 3) a multi-chip-module (MCM). The word "microcontroller" signifies an integrated-circuit computer system including at least one on-chip CPU core 21, on-chip flash (or other non-volatile memory) 22, on-chip RAM 23, and at least one on-chip general-purpose peripheral 24 (e.g., for performing communication functions). The phrase "on-chip" signifies "within the integrated-circuit package". The phrase "system-on-a-chip computer" thus includes computers with microcontroller chips of the three types described above (SoC, SiP, MCM) which include, within the microcontroller package, at least the aforementioned system components 21-24. Additionally, as is conventional in integrated-circuit and computer engineering, certain secondary system components such as resistors, capacitors, LEDs, jumpers, connectors, crystals, voltage regulators, and external peripherals will often be located off-chip and such location shall not detract from the "system-on-a-chip" characterization of the computer. Lastly, as used herein, "pins" are not meant to be limited to physical pins, but shall include other electrical termination, lead, and/or electrode structures (such as bumps, pads, etc.)

2. The Custom Target Board: CPUStick

A custom CPUStick target board 20' of a first preferred embodiment is shown in FIG. 4. The target board 20' includes a small (e.g., double-sided) printed circuit board 200 measuring approximately 25 mm×38 mm (1"×1.5"), about the size of a standard USB flash memory stick. Surface mounted to the front face of the target board 20' is the MCF52221 microcontroller chip μC (part designation: MCF52221CAE66), a soft power switch 210 (sw1, normally-open, non-latching, closes momentarily when depressed), a USB mini-B (or other sized) connector 220 (functioning as a connector for the on-chip USB interface of the microcontroller chip μC and, when connected to a host computer, as a possible source of power for the CPUStick via jumper J9 in FIG. 5C), and optional LEDs e1, e2 for signaling the operational status of the CPUStick. Headers J1, J2 for providing optional external power to the CPUStick, and headers J3-J7 for providing access to the external I/O pins of the microcontroller chip μC are provided near the periphery of the board, as shown. Though not shown in FIG. 4, the rear face of the target board 20' is populated with a voltage regulator U3, a filter capacitor C3 for the voltage regulator, and the power jumper J9 for supplying 5 V USB power to the voltage regulator. Optionally, the rear face of the board is also populated with a surface-mounted accelerometer (Freescale MMA7260 series) and/or a CR-2 lithium battery holder (to provide operational portability for the CPUStick, e.g., when power from the USB interface is not available). When components are surface-mounted to both sides of the printed circuit board 200, a preferred reflow soldering technique which can be employed for double-sided mounting is disclosed in U.S. Pat. No. 4,998,342 to Bonnell et al., herein incorporated by reference in its entirety.

FIGS. 5A to 5D show the electrical schematic for the CPUStick target board 20' of FIG. 4. The printed circuit connections are made using conductive traces, through vias, and standard circuit layout techniques. (A preferred technique for laying out the circuit is using the DipTrace Professional PCB-Design Tool with the Electra auto-router.) However, it is envisioned that multilayered wiring techniques and FPC wiring techniques on flexible circuits could also be employed. Typical values for the circuit components shown in FIGS. 5A to 5D are recited in Table 1. In the preferred embodiment of FIG. 4, the pull-up resistors R2, R3 shown in FIG. 5A have been replaced by the optional LEDs e2, e1 (such as Avago Technologies manufacturer part number HSMR-C170), respectively, shown in FIG. 4. In a modification, each resistor R2, R3 shown in FIG. 5A could be replaced by a series combination of an LED and a resistor (e.g., to limit current flow through the LEDs). In another preferred embodiment, the MMA7260 accelerometer and its associated resistors (R4, R5, R6), capacitors (C4, C5, C6, C7), and the exclusive conductive traces used by those components are omitted from the custom target board 20' (e.g., in the case where the accelerometer function is not needed) to provide a general purpose CPUStick.

TABLE 1

Figure 5:
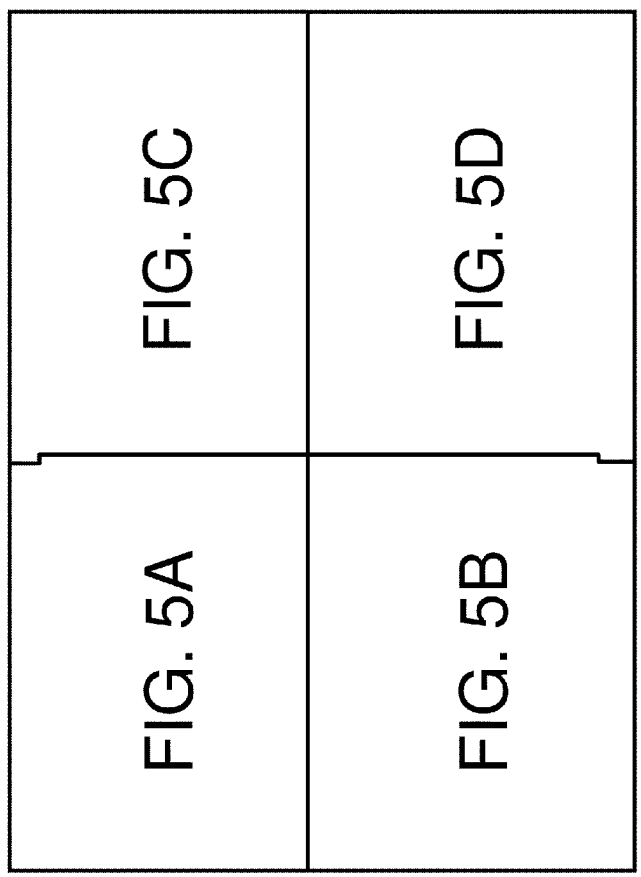
FIG. 5 shows the manner in which FIGS. 5A to 5D together cooperate to show the overall schematic arrangement of the target board of FIG. 4.
Figure 5A:
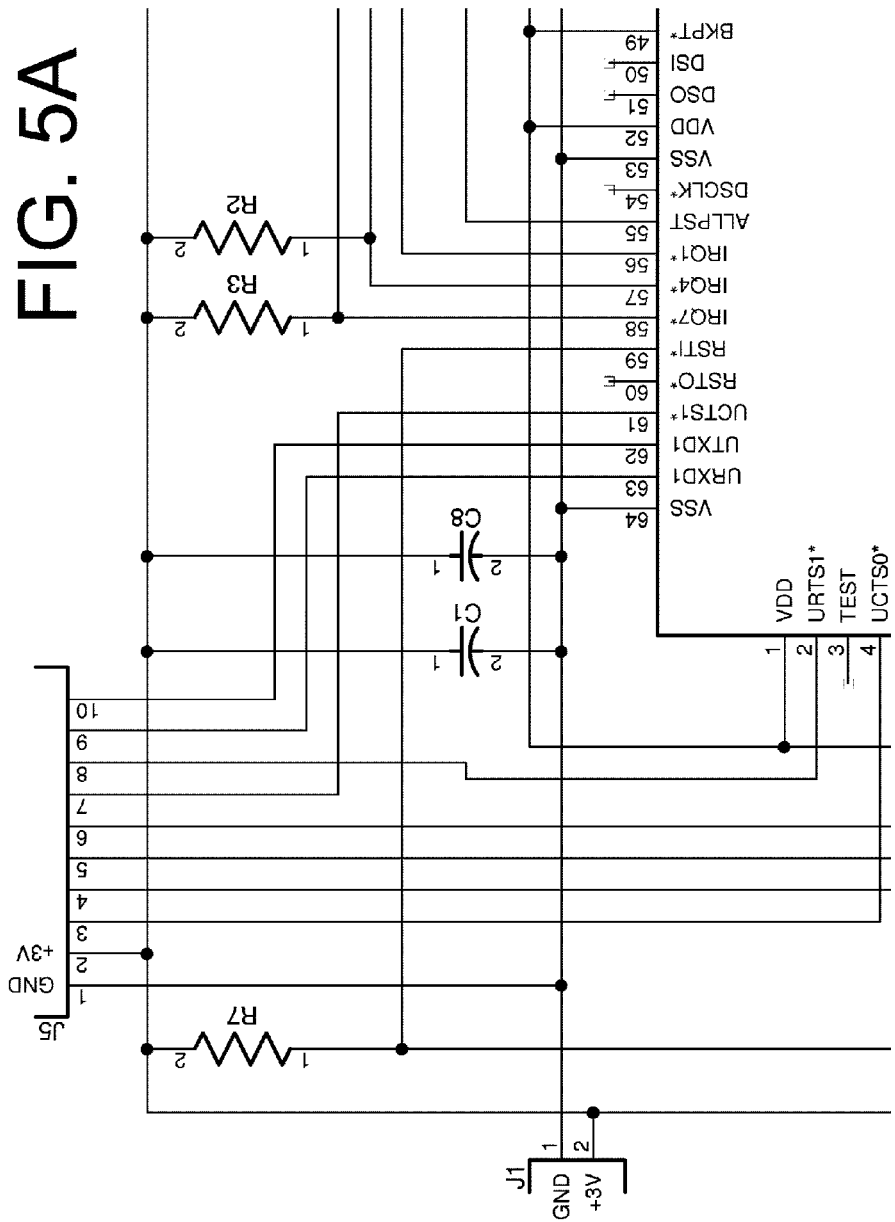
FIGS. 5A to 5D are each partial schematic representations of the target board shown in FIG. 4.
Figure 5B:
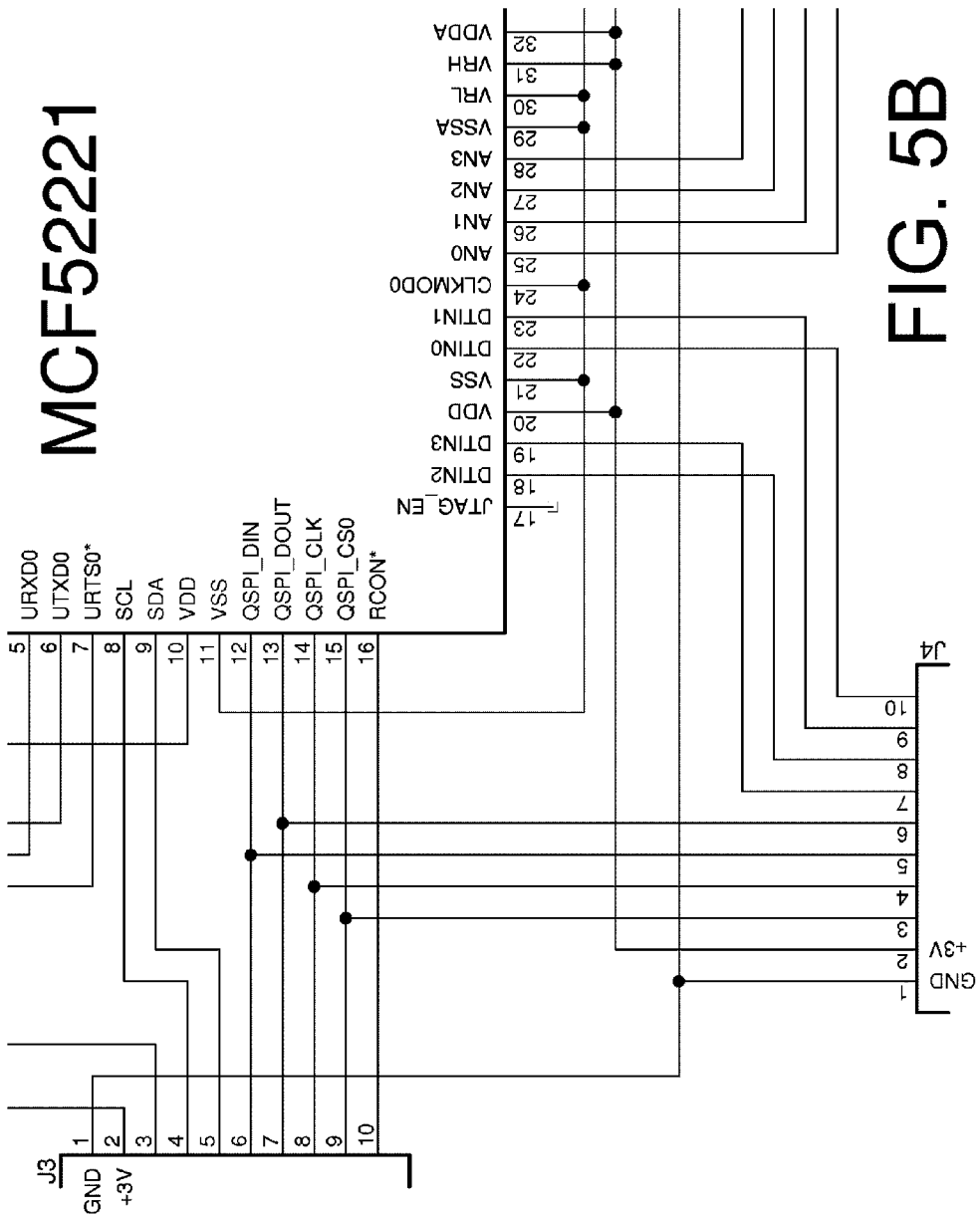
Figure 5C:
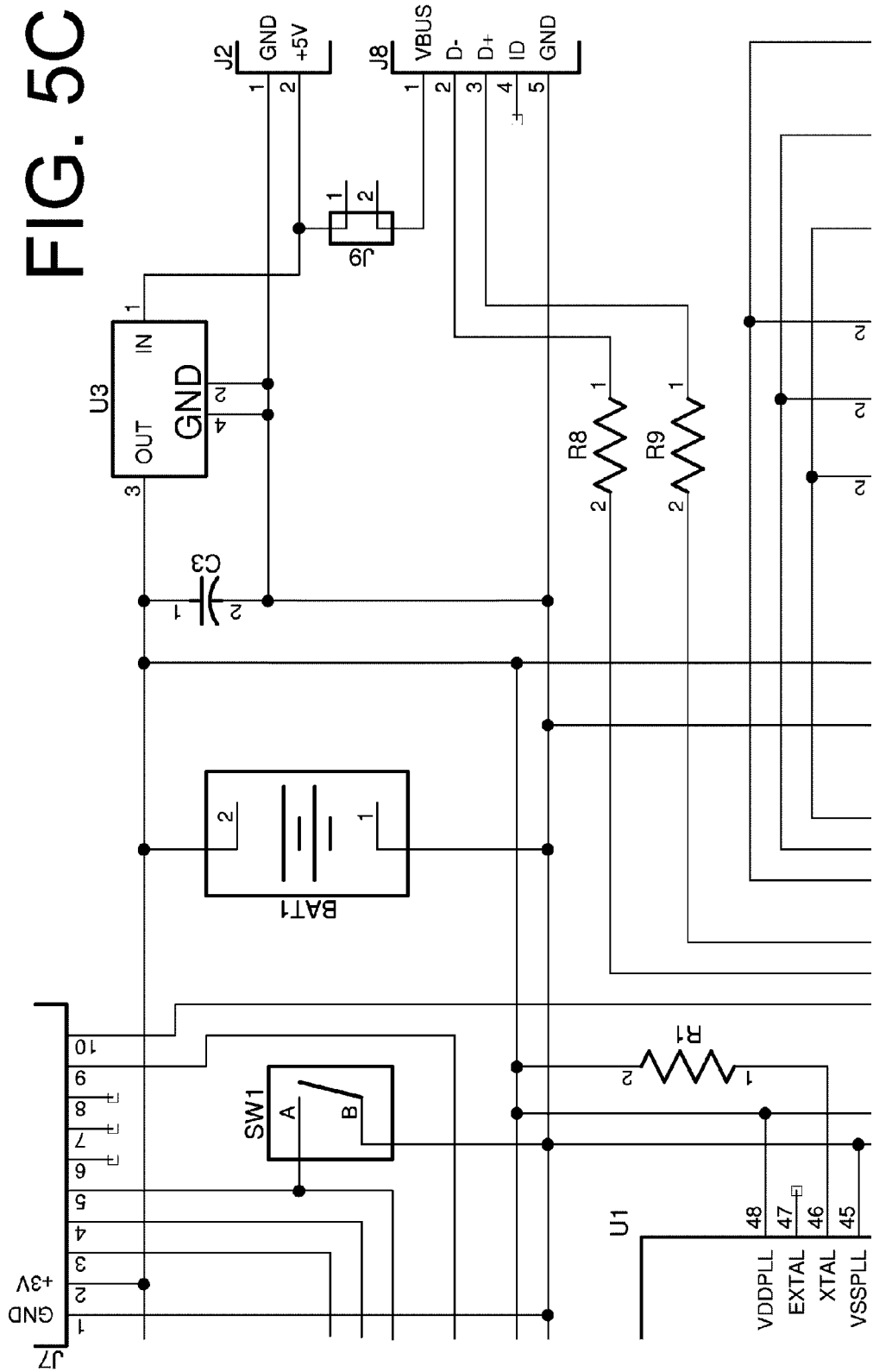
Figure 5D:
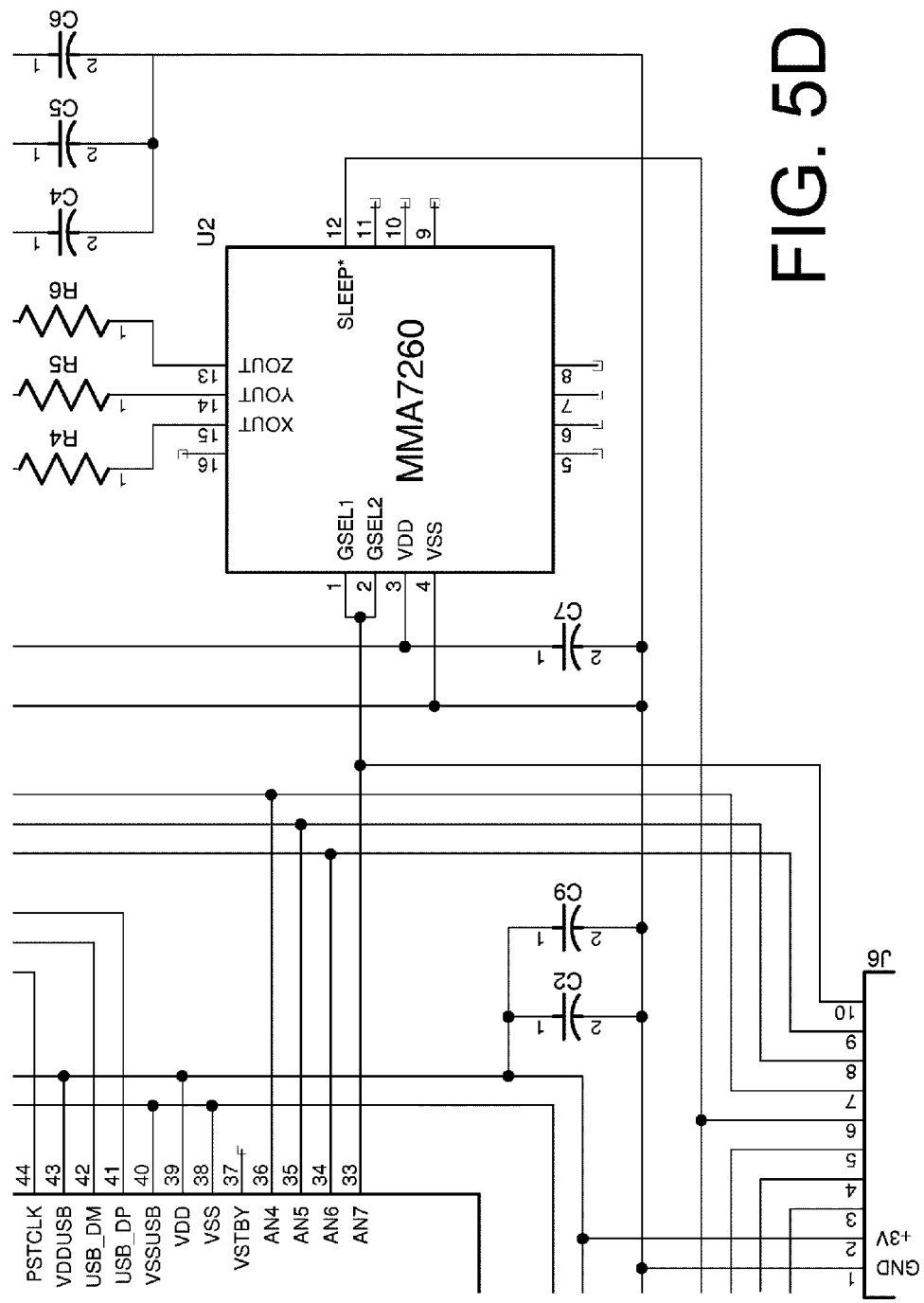

FIG. 5 CPUStick Circuit Components

| Component | Description | Value |
|---|---|---|
| Battery Holder (for CR-2 lithium battery) | BAT1 | |
| Capacitor (CAP_0805) | C1, C2, C4, C5, C6, C7, C8, C9 | 0.1 μF |
| Capacitor (CAP_0805) | C3 | 10 μF |
| Power Header (3.3 V) | J1 | |
| Power Header (5 V) | J2 | |
| Header (Pin or Socket Connector) | J3, J4, J5, J6, J7 | |
| USB Mini-B Connector | J8 | |
| USB Power Jumper | J9 | |
| Resistor (RES_0805) | R1, R2, R3, R4, R5, R6, R7 | 1000 Ω |
| Resistor (RES_0805) | R8, R9 | 33 Ω |
| Pushbutton Switch | SW1 | |
| Microcontroller (MCF52221, System-on-a-Chip) | U1 | |
| Accelerometer (MMA7260 Series) | U2 | |
| Voltage Regulator (LM2937-3.3) | U3 | 3.3 V |

A custom CPUStick target board 20" of a second preferred embodiment is shown in FIG. 6. The target board 20" includes a small double-sided printed circuit board 200' measuring approximately 0.9"×1.75". Surface mounted to the front face of the board is the MCF52221 microcontroller chip μC (part designation: MCF52221CAE66), a soft power switch 210 (or sleep switch, sw1), a USB mini-B connector 220 (functioning as a connector for the on-chip USB interface of the microcontroller chip μC and, when connected to a host computer, as a source of power for the CPUStick), and LEDs e1, e2 for signaling the operational status of the CPUStick. Jumpers J1, J2 can be short-circuited to power the target board 20" from the VBUS line of the USB mini-B connector 220 (J4). Initial system programming header J3 and I/O headers J5 and J6 (with a combined total of 38 pins on 0.1" centers) provide access to the external I/O pins of the microcontroller chip μC at positions near the periphery of the target board 20", as shown. In a modification, J3 may be mounted on the top (front side) of the board and J5 and J6 on the bottom (back side), allowing J3 to be connected to an initial system programming cable (e.g., a ribbon cable), and J5 and J6 to be connected to a parent printed circuit board (for either soldering or wire-wrapping) or parent solderless breadboard, below the CPUStick. Additionally, although not shown in FIG. 6, two test pads TP1, TP2 (functioning as test points for a test probe, one of which shows that the system clock is running, and the other of which shows when the processor has halted because of an error) are provided on the rear face of the target board 20" (e.g., as shown in FIG. 8C) and are connected to the microcontroller chip μC. Optionally, the rear face of the board 20" is populated with a CR-2 lithium battery holder BAT1 (to provide operational portability for the CPUStick, e.g., when power from the USB interface is not available). Advantageously, the custom CPUStick target board 20" of the second preferred embodiment only requires surface mounting of components on a single side of the target board 20".

FIGS. 7A to 7D show the electrical schematic for the CPUStick target board 20" of FIG. 6. Fabrication of the target board 20" is carried out in the same manner as described with reference to the target board 20' of FIG. 4. Typical values for the circuit components shown in FIGS. 7A to 7D are recited in Table 2. The light emitting diodes e1, e2 (such as Avago Technologies manufacturer part number HSMR-C170) shown in FIG. 6 are depicted as the diodes E1, E2 in FIG. 7C.

TABLE 2

Figure 7:
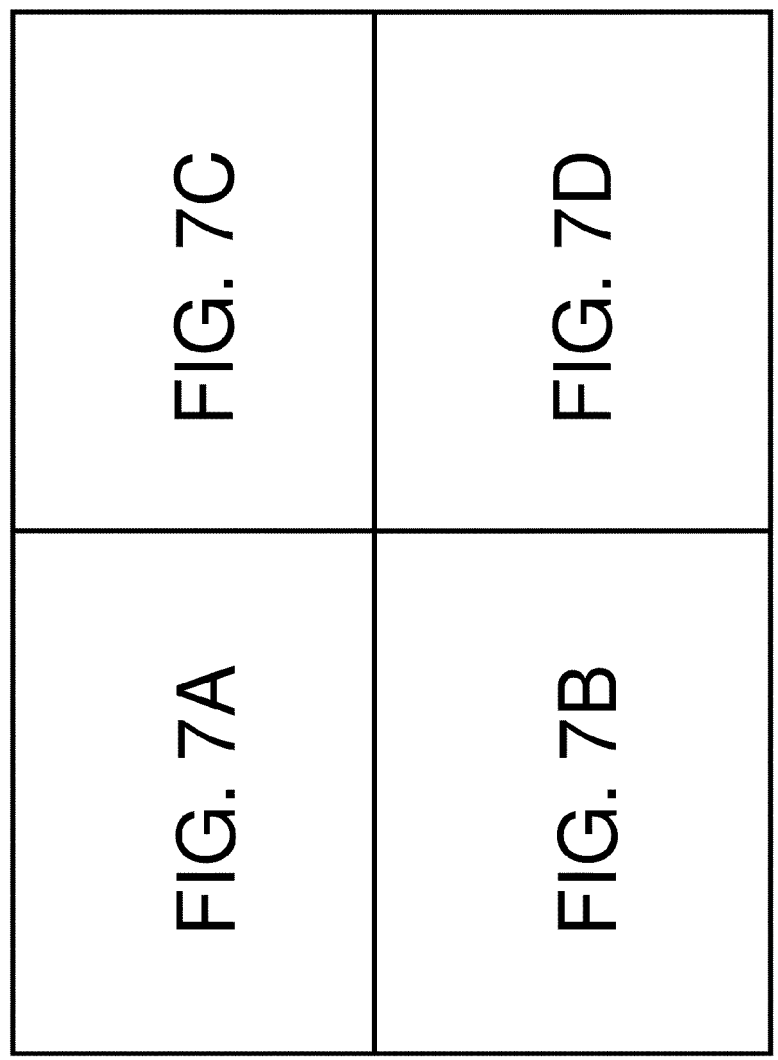
FIG. 7 shows the manner in which FIGS. 7A to 7D together cooperate to show the overall schematic arrangement of the target board of FIG. 6.
Figure 7A:
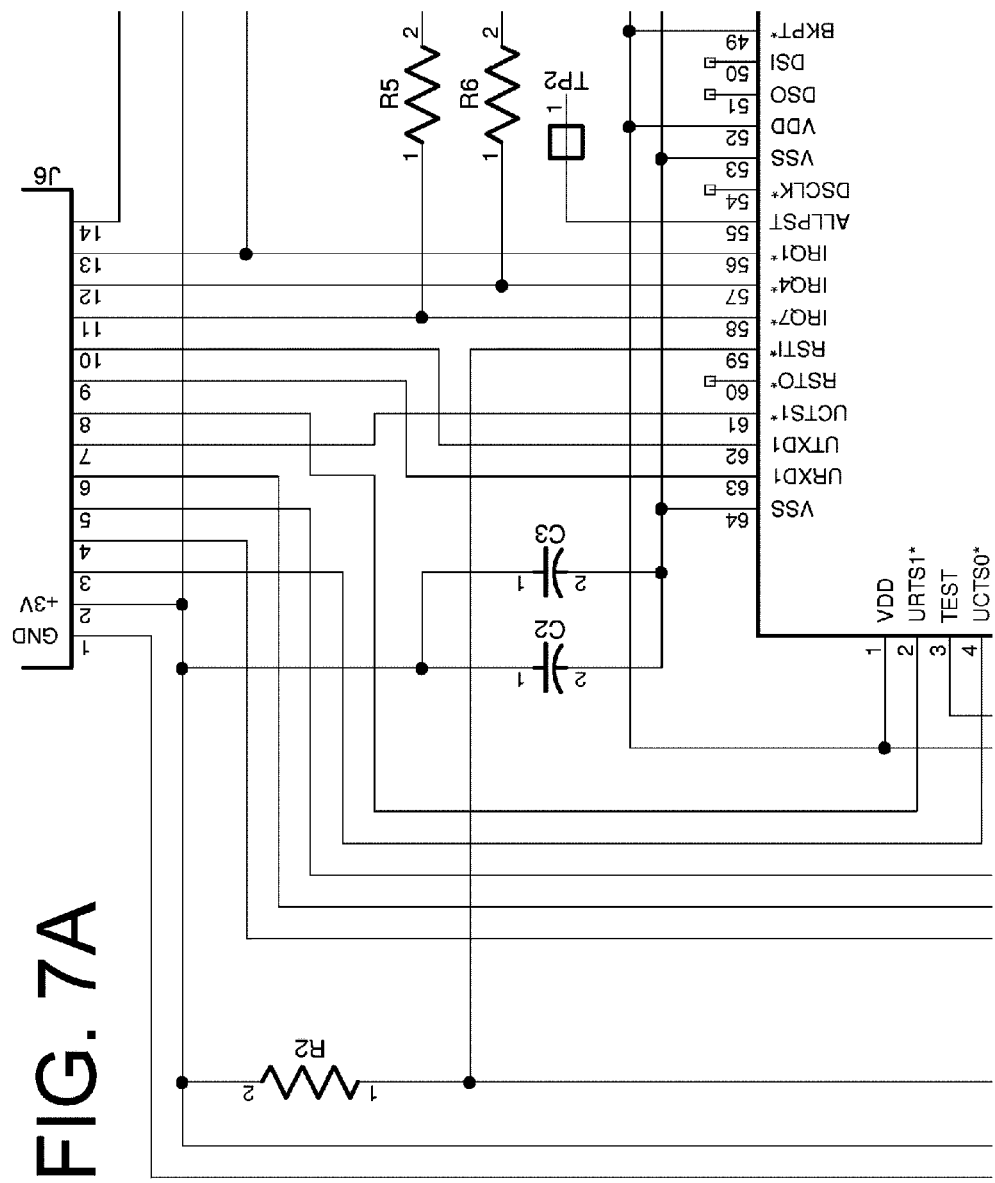
FIGS. 7A to 7D are each partial schematic representations of the target board shown in FIG. 6.
Figure 7B:
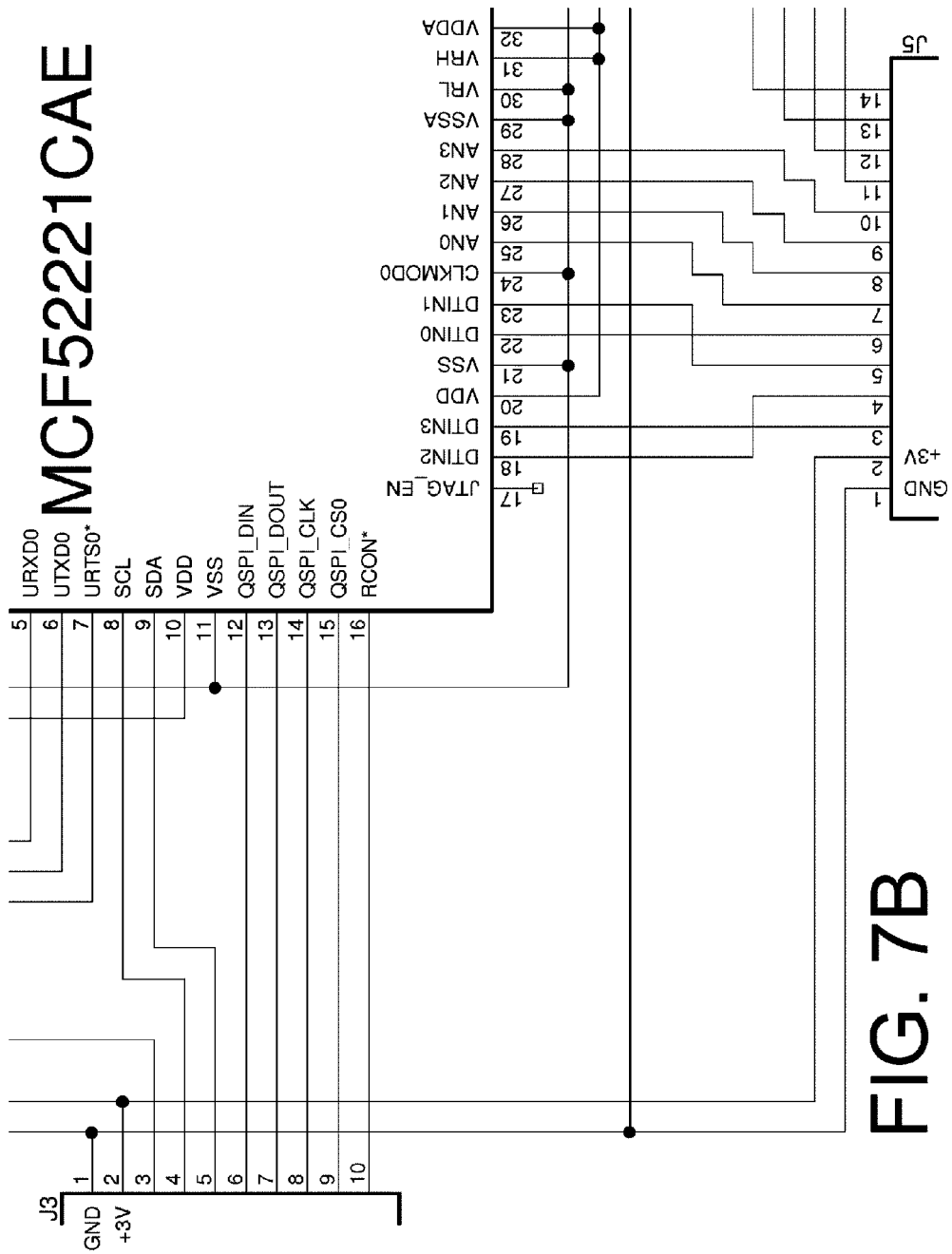
Figure 7C:
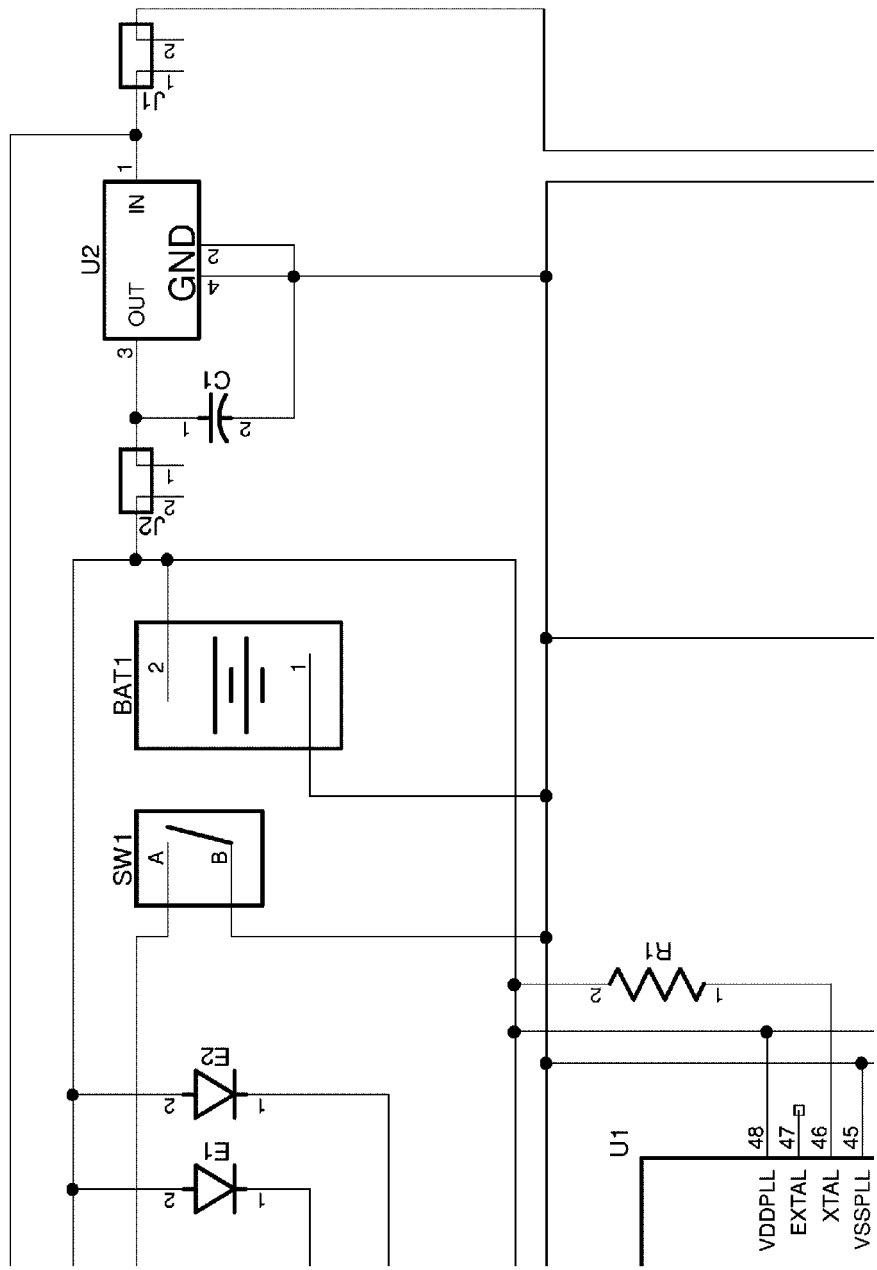
Figure 7D:
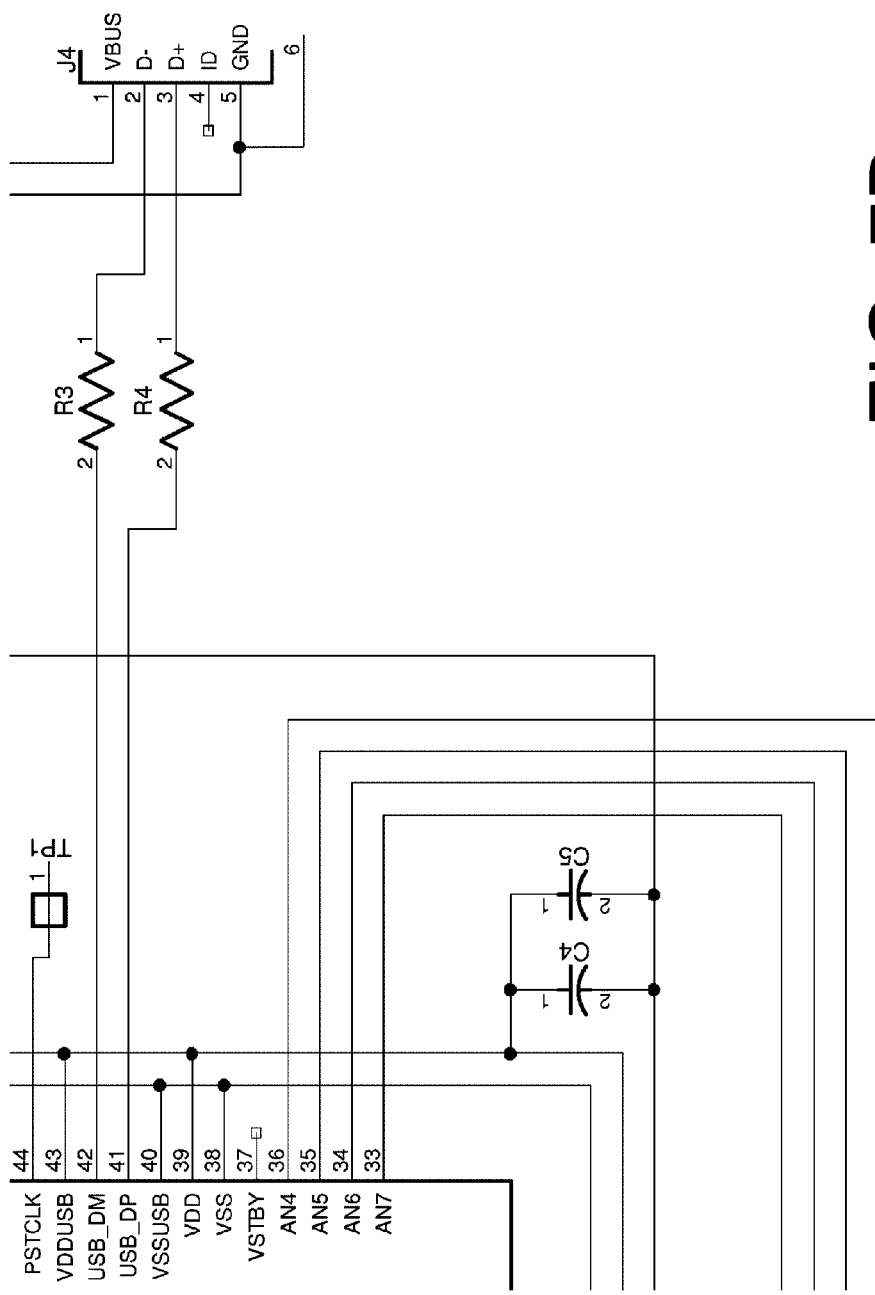

FIG. 7 CPUStick Circuit Components

| Component | Description | Value |
|---|---|---|
| Battery Holder (for CR-2 lithium battery) | BAT1 | |
| Capacitor (CAP_0805) | C1 | 10 μF |
| Capacitor (CAP_0805) | C2, C3, C4, C5 | 0.1 μF |
| LED (DIODE_0805) | E1, E2 | |
| Power Jumpers | J1, J2 | |
| ISP-Header | J3 | |
| USB Mini-B Connector | J4 | |
| I/O-Headers | J5, J6 | |
| Resistor (RES_0805) | R1, R2 | 4700 Ω |
| Resistor (RES_0805) | R3, R4 | 33 Ω |
| Resistor (RES_0805) | R5, R6 | 47 Ω |
| Pushbutton Switch | SW1 | |
| Test pads | TP1, TP2 | |
| Microcontroller (MCF52221, System-on-a-Chip) | U1 | |
| Voltage Regulator (LM2937-3.3) | U2 | 3.3 V |

Figure 8A:
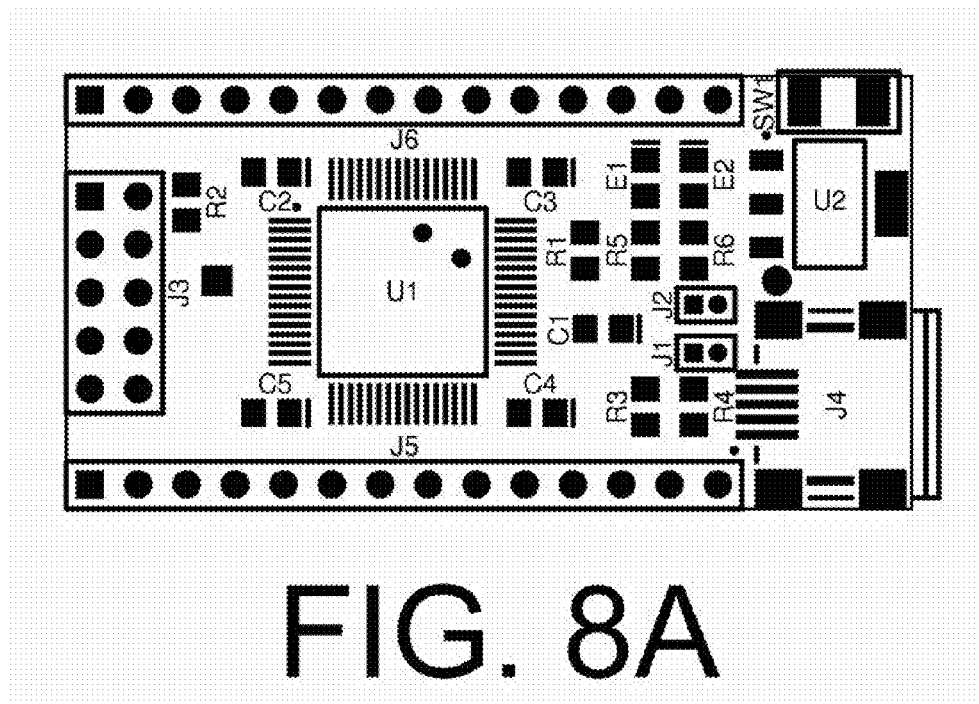
Figure 8B:
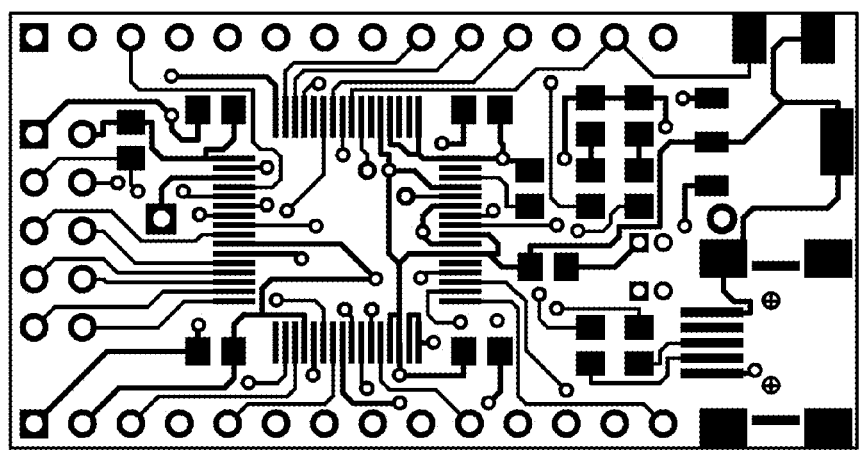
Figure 8C:
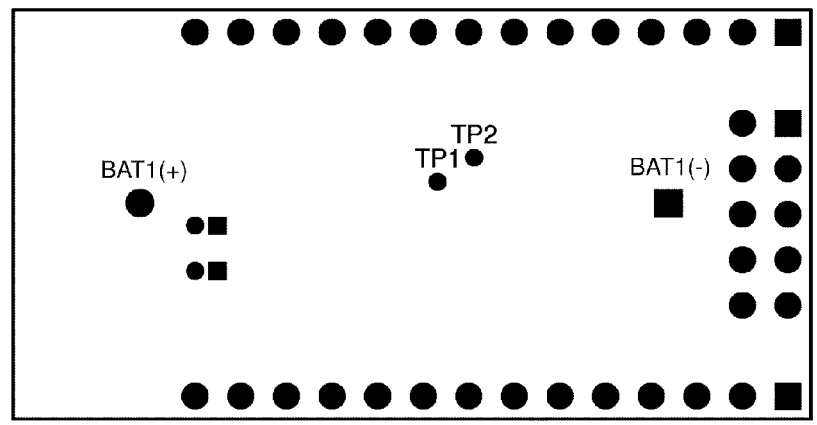
Figure 8D:
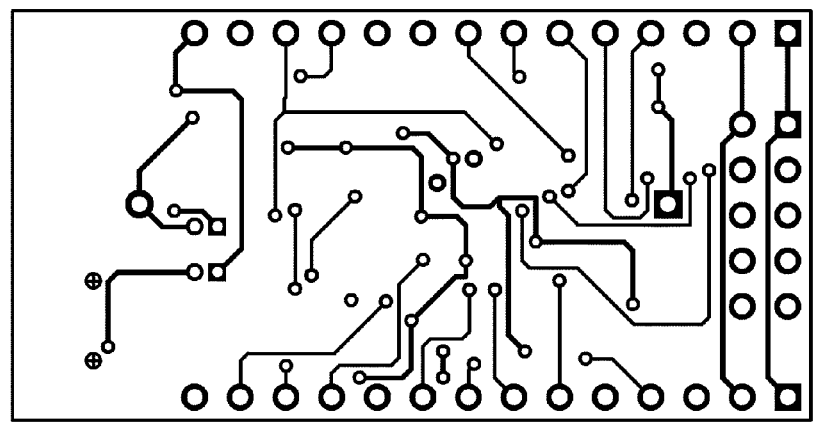

FIGS. 8A to 8D show the component layout and conductive traces for the CPUStick target board 20" of FIG. 6. FIG. 8A shows the component layout for the front side of the target board 20". In FIG. 8A, mounting locations for components are shown by rectangular markings on the target board (with the positive terminal locations for capacitors and LEDs being indicated by an additional line next to the respective mounting pad, and the "pin 1" locations for the components U1, U2, J4 being shown by the respective dots), and components are shown by their descriptive abbreviations from Table 2 and/or by their physical outlines. Preferably, the capacitors employed in FIG. 8A are non-polarized. FIG. 8B shows the mounting pads and the conductive traces for the front side of the target board 20". In FIG. 8B, mounting pads for components are shown by rectangular markings on the target board, conductive traces are shown by linear markings on the target board, plated-through holes are shown by annular markings with circular inner peripheries on the target board (with the plated through holes for "pin 1" locations having square outer peripheries), and alignment holes for locating pins of the USB mini-B connector J4 (220) are shown by circles with included cross-hairs. FIG. 8C shows the component pin layout (including the pin layout for the optional CR-2 battery holder) and the test pad locations TP1, TP2 for the back side of the target board 20", with pin locations being shown by circular markings, or by square markings in the case of "pin 1". FIG. 8D shows the conductive traces and plated through-holes for the back side of the target board 20".

For the CPUStick target board 20" shown in FIGS. 6, 7A to 7D, and 8A to 8D, the power jumpers J1 and J2 and the optional CR-2 battery holder BAT1 determine where the CPUStick will draw its power from, as shown in Table 3. The +5 V header is pin 14 on I/O header J6. The +3 V header can be pin 2 on any of the headers J3, J5, J6. The ground signal for CPUStick can be supplied by pin 1 on any of the headers J3, J5, J6, or by pin 5 on USB mini-B connector J4. (The "pin 6" on the USB mini-B connector represents a grounding strap between pin 5 and the metallic USB connector case.) All digital and analog circuitry within the CPUStick runs at +3.3V.

TABLE 3

CPUStick Power Configurations

| Power Jumper J1 | Power Jumper J2 | Optional CR-2 battery holder BAT1 | CPUStick Power |
|---|---|---|---|
| Installed | Installed | — | from USB |
| — | Installed | — | from +5 V header |
| — | — | Installed | from CR-2 |
| — | — | — | from +3 V header |

3. The Stand-Alone Operating System: StickOS

StickOS is a microcontroller-resident stand-alone operating system (or microcontroller firmware) which functions as both a BASIC programming/software development environment and a flasher for the microcontroller chip μC. StickOS is entirely stored in the microcontroller's on-chip flash memory, and includes an editor, compiler, flasher, and interactive debugger. Additionally, StickOS is designed to run (or execute) entirely within the microcontroller's on-chip memory, without the need of additional memory external to the microcontroller chip. In StickOS, external pins on the microcontroller chip are mapped to special "pin variables" for manipulation or examination, and selected internal peripherals of the microcontroller chip (e.g., timers and UARTs) are managed by BASIC control statements and BASIC interrupt handlers.

Conceptually, the StickOS architecture includes a trusted layer which runs on the CPU core and which includes development environment software (e.g., the editor, compiler, interactive debugger, etc.), and an application layer which runs on the trusted layer and which is adapted to run a user's target program. Using layered functionality in this way, the stability of the development environment software at the heart of StickOS can be protected from the unintended consequences of errant user programs.

By its very nature, StickOS supports in-circuit emulation when it is running in any StickOS-capable microcontroller chip. By connecting the microcontroller chip to an external terminal using a USB connection (or other suitable communications interface), full remote control can be exercised over the target embedded microcontroller from the external terminal.

A ColdFire .S19 binary image file of the entire StickOS operating system is included in the computer program listing appendix submitted by EFS-Web with this patent document. (The .S19 file is an ASCII representation of the object code that includes checksums for distribution. This file format is also known as the Motorola S-record format, and is described at http://en.wikipedia.org/wiki/519, and also in Appendix C of the MC68000 Family Programmer's Reference Manual, the contents of which is incorporated by reference herein.) Additionally, a plain-text source code listing of the StickOS operating system, written in C, is also included in the computer program listing appendix submitted by EFS-Web with this patent document.

FIG. 9 is a diagrammatic component overview of the software architecture and functions of the StickOS operating system 300. Generally, the FTDI transport 302 connects to the host computer transport via USB and allows the user at the host computer terminal emulator (60 in FIG. 3) to interact with the StickOS development environment running on the target board 20' or 20" via a command-line interface. The line editor (or text editor) 304 allows the user to edit and enter the current command line and recall previous ones. The command interpreter 306 interprets and executes StickOS commands The bytecode compiler 308 compiles StickOS program statements, line-by-line, into bytecode as each statement is entered by the user. The bytecode de-compiler 310 is the inverse of the bytecode compiler 308, and translates compiled bytecode back into textual program statements, for viewing by the user. The bytecode execution and debug engine 312 both executes (interprets) compiled bytecode, and supports additional features to allow easy program debugging. The timer control module 314 provides access to microcontroller chip's built-in timer functionality during bytecode execution, and permits up to four virtual timers to be derived from the microcontroller chip timer functionality. Similarly, the UART control module 316 provides access to microcontroller chip UART functionality during bytecode execution. The interrupt service module (ISM) 318 works in conjunction with the bytecode execution and debug engine 312 in the trusted layer and is responsible for a) detecting (through the timer control 314 and the UART control 316) when an interrupt event has occurred and b) calling into the application layer to execute (or, more precisely, have executed) the program statements which the user's target program has requested be executed when the interrupt event has occurred. The flash (or other non-volatile memory) control and access module 320 provides control of and access to (e.g., paired) banks of the microcontroller chip's on-chip flash memory 22. The RAM control and access module 322 provides control of and access to the microcontroller chip's on-chip RAM 23. The file system module 324 allows the user to store additional named programs, beside a currently selected target program, in flash memory. The code access (and merge) module 326 loads and stores bytecode to/from the on-chip flash (or other non-volatile memory) 22 and the on-chip RAM 23, and merges the bytecode stored in the flash and RAM for editing, execution, debug, or storage in the on-chip flash (or other non-volatile memory) 22. The external pin control and access module 328 permits the general-purpose I/O pins 25 of the microcontroller chip µC to be specially configured as input or output pins, and accessed as such. Finally, the variable access module 330 provides access to named program variables (RAM variables, flash variables, and pin variables) during bytecode execution, and uses e.g., the external pin control and access module 328 to map special "pin variables" to their corresponding external I/O pins 25 on the microcontroller chip.

As used herein, the term "module" is not meant to be limited to code implementations in which the specified operating system functions are written as modular packages that might be easily separated from each other (although in the preferred embodiment, the modules can be such). Rather, as used herein, a "module" signifies only a part, portion, or component of the operating system which performs a particularly specified function. As used herein, an "operating system" is a software component of a computer system which makes hardware resources available to an application, and which initiates, controls or schedules the execution of the application.

The pseudocode examples that follow in the text of this patent document are shown for educational purposes only, as an aid in explaining the accompanying StickOS modules, algorithms, and techniques. They are not presented to correspond literally to the structures or algorithms of the StickOS source code, or even any specific programming language. The authoritative structures and algorithms of the StickOS source code, presented in the C programming language, can be found in the electronic computer program listing appendix submitted by EFS-Web with this patent document. (As an aid to browsing the source code, the StickOS processor startup and initialization begins in the file startup.c; from there, StickOS module initialization continues in the file main.c; from there, the main command loop of StickOS runs in the file cpustick.c.)

A. Operating System Architecture

Further details regarding the individual components of the StickOS operating system architecture are provided as follows:

i. FTDI Transport 302

StickOS exposes its functionality from the target board through a USB interface built into the microcontroller chip µC, emulating a well-known FTDI Serial Port function. A host computer that detects the FTDI Serial Port function will automatically create a virtual COM port (VCP) representing the other endpoint of the USB Serial Port. The user can then run a general purpose (e.g., dumb) terminal emulator (60 in FIG. 3) to communicate (bidirectionally) with the virtual COM port and interface directly with StickOS through the FTDI transport 302. Source code symbolic information (i.e., in the form of source code lines, variable names, and variable contents) is transferred over the FTDI transport 302 to StickOS when program lines are entered by the user via the line editor 304, from StickOS when a program is listed after being de-compiled, to and from StickOS when a variable is printed at debug time, and to StickOS when a variable is modified at debug time.

When the CPUStick is connected to the USB port of a host computer 10 via the FTDI transport 302, "print" statement output is displayed as text on the user terminal 60. Print statements can be used to print integer expressions or strings, or various combinations of both. Note that when the CPUStick is disconnected from the host computer's USB port, print statement output is simply discarded.

Because StickOS emulates the well-known FTDI Serial Port function, the need for any special driver software to be loaded on the host computer 10 is typically eliminated since the host computer 10 will likely already know how to communicate with this function. However, even the loading a transport driver (i.e., a development-environment independent driver) does not alter the fact that in StickOS, the edit, compile, flash, and debug functionality are running on the target board 20' or 20" (albeit controlled by the user at the host computer 10 e.g., through a dumb but necessary development-environment independent transport mechanism 60, 70).

The FTDI transport 302 is implemented, for example, in the files ftdi.c and usb.c included in the sourcesv101.txt file in the computer program listing appendix.

ii. Line Editor 304

The line editor 304 allows the user to enter and edit command lines (e.g., including source code symbolic information) at a terminal 60 for interacting with StickOS over the FTDI transport 302 using standard ANSI terminal escape sequences for cursor control. In addition to being able to manipulate the current line being entered, the line editor 304 also contains a small history buffer that allows the user to recall previously entered lines (using the "↑" up-arrow and "↓" down-arrow cursor keys). This is particularly useful when the user enters a line in error that is rejected by StickOS—the user can recall the line and edit just enough to fix the error, rather than having to retype the entire line. The line editor 304 provides ANSI and VT100-type terminal support.

Once the user enters a command line at the user terminal, the command line is first given to the command interpreter 306. If a valid command is found and parsed in the entered command line, the command is executed. Otherwise, the line is given to the bytecode compiler 308. If a valid program statement is found and parsed in the entered command line, its bytecode is compiled and stored; otherwise, an error is reported to the user. (In StickOS, system "commands" and program "statements" can thus be distinguished in that only "statements" are compiled into bytecode.)

Once a program statement's bytecode is compiled, if the statement was preceded by a program line number, the compiled bytecode is passed to the code access (and merge) module 326 to be stored in the on-chip RAM 23, potentially replacing an old program line with the same line number. If the statement was not preceded by a line number, the compiled bytecode is passed directly to the bytecode execution and debug engine 312 for immediate execution in "immediate mode".

The line editor 304 is implemented, for example, in the file ftdi.c included in the sourcesv101.txt file in the computer program listing appendix.

iii. Command Interpreter 306

The command interpreter 306 examines the first word of the command line as received from the line editor 304. If a valid command is found, it then branches to command-specific parsing code; otherwise (if a valid program statement is also not found), an error is reported to the user. The command-specific parsing code parses off additional command-specific parameters, and then executes the command. Eventual command execution accesses the functionality of the other StickOS modules. The bytecode execution and debug engine module 312 is accessed to run or continue program, stop program, autorun program, and single-step program execution (debug). The file system module 324 is accessed to list named programs, save named program, load named program, and purge named program. The code access and merge module 326 is accessed to list program lines, delete program lines, save program lines (merge RAM and flash lines to flash), and clear programs. The variable access module 330 is accessed to clear program variables and trace program execution (debug). The command interpreter 306 is also capable of effecting a system reset of the microcontroller.

A listing of StickOS commands is provided in Subsection B, Operating System Commands and BASIC Features, of this detailed description.

The command interpreter 306 is implemented, for example, in the file basic.c included in the sourcesv101.txt file in the computer program listing appendix.

iv. Bytecode

To protect the StickOS microcontroller-resident development environment software from an errant user program, the user's target program is compiled to, stored in, and executed as an interpreted bytecode. Using an interpreted bytecode to represent the user's target program in StickOS increases code density (thus increasing the effective amount of flash memory available for program storage by making each byte of flash do more), increases safety (since it is virtually impossible to create harmful execution sequences), and increases operating system usability (since all program lines are necessarily syntax-checked as they are entered and compiled; that is, intra-line errors are caught immediately), at a slight execution cost as compared to natively compiled processor code.

More particularly, the use of interpreted bytecode for executing the user's target program provides a protection barrier between the trusted layer of StickOS (which includes the development environment software) and the application layer (which includes the user's bytecode target program). Bytecode interpretation assures that the user's target program cannot perform any unauthorized (i.e., un-interpreted) harmful operations that might otherwise affect the stability of the development environment. This allows the development environment (and all other software components in the trusted layer) to always be running, and always be available to the user, so that an errant user target program (in the application layer) can be fixed. This is the equivalent of a "virtualization layer" within the CPU core itself. (In an alternative embodiment, the user's target program can be compiled to native processor code, and processor privilege levels or compilation restrictions can be used to provide the necessary virtualization/safety/trusted layer, if needed.)

Bytecode interpretation in StickOS typically involves both a validation and an execution step. Before the actual bytecode execution occurs, a bytecode validation step is performed by the bytecode execution engine to ensure that a valid (operable and safe) operation is being requested which can be passed on from the bytecode execution engine to the remainder of the StickOS trusted layer. In general, this validation occurs before the bytecode statement can have side-effects which might impact the rest of StickOS. If validation fails, stop( ) is generally called to halt program execution before any harm can be done. Once validation is successful, the operation is effected, and safely passed on to the remainder of StickOS.

This bytecode validation acts as a runtime protection barrier between the bytecode in the application layer and StickOS trusted layer. Examples of when stop( ) is called in response to the bytecode validation step performed by the bytecode execution engine include:

1. expression too complicated (e.g., too much nesting)
2. read without data
3. divide by 0
4. reference undefined variable
5. array index out of range
6. modification of a read-only (pin) variable
7. out of variable space
8. invalid (re)dimension of a variable The StickOS bytecode is effectively a machine language for a virtual machine defined and executed by StickOS itself. The user target program safely "runs in" a virtual application execution environment presented by the StickOS bytecode execution engine, which implements the virtual machine. When StickOS compiles user source code input from the terminal 60, it compiles to the virtual machine language; when StickOS runs the user's target program stored in on-chip memory 22, 23, it interprets the same virtual machine language. The StickOS compiler and interpreter essentially work together to give a practical mix of the both the performance benefits of compilation and the inherent safety of interpretation.

Fundamentally speaking, the user always enters source code and the CPU always executes machine code; interpretation and compilation methods are required to bridge the gap between what the user enters and what the CPU executes. In the case of the full interpreter, the program the user enters is stored unchanged (or simply tokenized by lexical analysis), and is later fully (and slowly) interpreted at runtime. In the case of the full compiler, the program the user enters is fully parsed, compiled, and stored as native machine code, which is later directly executed (unchanged, i.e., without protection) by the CPU at runtime. The bytecode approach, on the other hand, performs a portion of the parse and compilation task (to an intermediate bytecode) when the program is entered and the remainder of the interpretation task (from the intermediate bytecode) at runtime.

Java™ is a popular example of a language that is compiled to an intermediate bytecode, and then executed by a virtual machine. In a traditional bytecode compiler, the entire (completed) program is compiled at once. Errors, such as mismatched if-then-elseif-else-endif statements, for example, abort the compilation (since branch addresses cannot be computed). In StickOS, on the other hand, the lines of the program are compiled individually, line-by-line as they are entered, and the source code entered by the user is actually discarded immediately after successful compilation to save RAM and flash memory space. This means that StickOS must manage inter-line coupling (such as the matching of if-then-elseif-else-endif statements) and catch inter-line errors at runtime, rather than at compile time; modified "full interpreter" methods are used to accomplish this.

Bytecode is implemented, for example, in the files code.c, parse.c, and run.c included in the sourcesv101.txt file in the computer program listing appendix.

v. Bytecode Compiler 308

Every valid line of code (i.e., every valid program statement) that is entered into StickOS via the line editor 304 is immediately (and individually) compiled to bytecode by the bytecode compiler 308 and then stored as bytecode in the on-chip RAM 23. That is, the bytecode compiler automatically compiles each individual program line of source code symbolic information as it is input by the user from the user terminal 60 into a bytecode-compiled target program line which is then stored in the on-chip RAM 23, to be executed in immediate mode or used in a multi-line user target program. (By "automatic" compiling, it is meant that no "compile" command need be issued by the user.) In fact, the line of code entered by the user is discarded as soon as compilation is successful. When the user thereafter lists the program, he is not seeing the text he entered (e.g., the representation of a source code file), but rather, he is seeing a de-compiled listing of the bytecode that was compiled and stored from the text that he entered.

The line-by-line bytecode compilation is effective to check all user program lines for intra-line ("within the line") errors as they are entered. Bytecode compilation also changes all complex (infix) expressions into a simple list of (postfix) stack-based-virtual-machine operators, that can be executed quickly and safely at runtime. Additionally, during bytecode compilation, all of the (time consuming) keyword, variable, and constant parsing is performed prior to runtime.

When a program statement is entered by the user at the command line, the bytecode compiler 308 examines the first word of the statement (e.g., the first word after any line number). If a valid statement is found, it then branches to statement-specific parsing code; otherwise an error is reported to the user. The statement-specific parsing code parses off additional statement-specific parameters.

The parsed first word of the statement is always directly translated into a bytecode; the additional parameters may be either directly translated or further parsed through special-purpose routines designed to parse constants, parse simple variable names, parse expressions, parse array variable names and indices, and recursively parse statements.

When parsing expressions, an infix (also called "algebraic") expression with constants, operators, variable names, parentheses, and implied precedence and associativity rules is converted into a list of operators to be executed quickly and safely at runtime by a simple integer stack-based virtual machine. This is accomplished using well known methods of infix operator to postfix operator conversions, with parenthetical sub-expressions being parsed recursively, using a lexical search to find the matching (closing) parenthesis of the parenthetical sub-expression. It is noted that StickOS BASIC expressions are very similar to C expressions, and follow similar precedence and evaluation order rules.

When parsing array variable names and indices, a variable name (which is often already part of an expression) is simply parsed, followed by a recursive parse of the expression within the following pair of braces [ ], specifying the array variable element index. A lexical search is used to find the matching (closing) brace of the array index expression.

Consider, for example, the following program line:
30 print "result is", (a[7]+b)*(c+123)
To interpret this at runtime would require significant processing. In addition to parsing the variables and operators and constants, it would need to be known to first evaluate the left half of the expression, and then the right half, and then multiply the results together. Evaluating parenthesis and determining operator precedence is a complex (and time consuming) task.

When this line is compiled to bytecode, it looks like this (with actual bytecodes being shown in capital letters for exemplary purposes only):
   integer 30 (line number)
   PRINT
   STRING: "result is"
   EXPRESSION: INTEGER 7, INDEXED_VARIABLE a, VARIABLE b, PLUS, VARIABLE c, INTEGER 123, PLUS, TIMES Notice that the expression is compiled to traditional postfix (also called "reverse polish") notation, allowing trivial (and fast) execution by a stack-based virtual machine, simply executing from left to right.

The bytecode compiler 308 is implemented, for example, in the file parse.c included in the sourcesv101.txt file in the computer program listing appendix.

vi. Bytecode De-Compiler 310

De-compiling the compiled bytecode (such as when the user issues a command from the terminal 60 to list the program) is basically a straightforward inverse of the compiling process.

The bytecode de-compiler 310 examines the first bytecode of the compiled statement. It then branches to statement-specific unparsing code. The statement-specific unparsing code examines additional bytecodes of the compiled statement.

Any directly translated bytecodes are directly translated back to text. Any additional bytecodes that were parsed through special-purpose routines are also "unparsed" through special-purpose routines designed to unparse constants, unparse simple variable names, unparse expressions, unparse array variable names and indices, and recursively unparse statements. These routines are logical inverses of the compilation routines described above.

When unparsing expressions, the expression is executed, but rather than using the normal integer stack-based virtual machine, an alternate virtual machine is used that pushes and pops text strings to build back the original expression text. Though postfix operator to infix operator conversion methods are not quite as well known as the converse, they are known, and the details of such are publicly available (see e.g., http://www.cs.siue.edu/ddooly/spring03/cs340/node55.html; see also the "unparse" functions included in the parse.c file in the sourcesv101.txt file in the computer program listing appendix). Parenthetical sub-expressions, enclosed in parentheses ( ) for textual representation below, are unparsed relying solely on operator precedence comparisons.

When unparsing array variable names and indices, a variable name (which is often already part of an expression) is simply unparsed, followed by a recursive unparse of the array variable element index expression, which are enclosed in braces [ ] for the textual representation.

Consider, for example, the following bytecode:
integer 30 (line number)
PRINT
STRING: "result is"
EXPRESSION: INTEGER 7, INDEXED_VARIABLE a, VARIABLE b, PLUS, VARIABLE c, INTEGER 123, PLUS, TIMES Unparsing the first three bytecodes is straight-forward. Unparsing the expression is accomplished as follows:
1. unparse "7" and push it on the stack
2. unparse "a" and pop the top entry off the stack; push "a[7]" back on the stack
3. unparse "b" and push it on the stack
4. unparse "+" and pop the top two entries off the stack; push "a[7]+b" back on the stack
5. unparse "c" and push it on the stack
6. unparse "123" and push it on the stack
7. unparse "+" and pop the top two entries off the stack; push "c+123" back on the stack
8. unparse "*" and pop the top two entries off the stack; since the implied precedence of each popped entry (containing "+"'s) is less than the implied precedence of "*", each popped entry must be re-parenthesized; push "(a[7]+b)*(c+123)" back on the stack
9. pop the result off the stack When de-compilation is finished, the result is the original line:
30 print "result is", (a[7]+b)*(c+123)

The bytecode de-compiler 310 is implemented, for example, in the file parse.c included in the sourcesv101.txt file in the computer program listing appendix.

vii. Bytecode Execution Engine

Bytecode execution is handled by the bytecode execution and debug engine 312. This engine simply reads a list of bytecodes, switches on the bytecodes, and performs a simple task for each bytecode. The net result is that the user's complex program, made up of multiple program statements of compiled bytecode, is executed.

Bytecodes are executed in a hierarchy, with statement bytecodes logically containing expression bytecodes. Consider the compiled bytecode in the "print" example above. The top-level switch would cause the "print" statement bytecode handler to run, and then when the contained expression was being parsed, the expression bytecode handler would be run, built on a simple integer stack-based virtual machine. These might look like:

```
void
execute_statement(
    IN bytecodes
)
{
    switch (first bytecode) {
        case ...:
            break;
        case print:
            while (more bytecodes) {
                if (next bytecode == string) {
                    print string;
                }else if (next bytecode == expression) {
                    value = execute_expression(bytecodes);
                    print value;
                }
            }
            break;
        case ...:
            break;
    }
}
int
execute_expression(
    IN bytecodes
)
{
    int value;
    while (more bytecodes) {
        switch (next bytecode) {
            case ...:
                break;
            case integer:
                push(integer);
                break;
            case variable:
                push(variable_get(variable));
                break;
            case plus:
                push(pop( )+pop( ));
                break;
            case times:
                push(pop( )*pop( ));
                break;
            case ...:
                break;
```

-continued

```
            }
        }
        value = pop( );
        return value;
}
```

Note the simplicity of the expression bytecode handler, due to the postfix (a.k.a., "reverse polish") notation of the compiled bytecode and the integer stack-based virtual machine—all parenthesis, implied precedences, etc., in the expressions disappear. This makes expression execution fast and safe—since the work was all done at compile time.

The main run_continue( ) loop of the bytecode execution engine where programs are actually run looks like this:

```
void
run_continue(
    IN continue_line_number    /* 0 -> run from start; */
                               /* non-0 -> continue stopped run */
)
{
    if (continue_line_number) {
        line_number = continue_line_number;
    } else {
        line_number = 0;
        variable_clear( );
    }
    do {
        line = code_find_next_line(line_ number);
        line_number = line.line_ number;
        execute_statement(line.bytecode);
        if (stopped || step_mode) {
            break;
        }
        /* interrupt servicing (see below) */
    } while (program end not reached);
}
```

Notice that execution of the program can optionally be continued from a different line number than where execution stopped, with variables changed or unchanged, by means of the interactive debugger.

The "stop" statement (or a failed assertion, or any runtime error, such as updating a read-only variable) simply sets the "stopped" variable to true:

```
void
stop( )
{
    stopped=true;
}
```

Handling conditional statements (for example "if-then" statements, or "while" or "for-next" loops) is quite different in a line-by-line (i.e., incrementally) compiled environment than in a "fully compiled" environment. This is because when the conditional statement is compiled, it isn't known where the statement will "branch to" if the condition is or is not taken—new lines can always be added and existing lines can be removed from the program after the line has been compiled and before the program is executed.

For this reason, StickOS reverts to a modified "fully interpreted" model when it comes to conditional parts (i.e., the "true" or "false") of conditional statements. Each time a conditional statement is entered (during bytecode execution), a new "scope" is pushed onto a stack, and along with that scope, the value of the condition is maintained. Each time a conditional statement is exited (again during bytecode execution), the old "scope" is popped off of the stack. When any statement is executed, it can therefore be known exactly how many conditional scopes there currently are, and whether any of them are "false". If they are false, it is necessary to "do nothing" rather than what the statement actually specifies, and thus "fall through" to the bottom of the "false" conditional statement with a minimum of effort.

Note that in the case of an "if-then-elseif-else-endif" statement, if none of the conditional statements have yet been true, it is necessary to keep evaluating "elseif" conditions, potentially changing the condition of the current scope. And if none of the conditions have yet been true by the time the "else" is reached, the "else" (implied) condition must necessarily be forced true.

StickOS provides access to the microcontroller's built-in timer(s) 24*b* with a statement like:
40 configure timer 1 for 1000 ms
When this statement's bytecode is executed by the bytecode execution and debug engine 312, a virtual timer derived from the built-in timer 24*b* (FIG. 14) of the microcontroller chip μC is configured to expire every 1000 ms. (StickOS configures the built-in timer 24*b* in the MCF52221 microcontroller chip μC to expire every millisecond, and counts milliseconds in the on-chip virtual timers based on expiration signals derived from the built-in timer 24*b*.)

StickOS provides access to the microcontroller's built-in UARTs 24*c* with a statement like:
20 configure uart 0 for 9600 baud 7 data even parity
When this statement's bytecode is executed, a built-in UART 24*c* (FIG. 14) of the microcontroller chip μC is configured for the corresponding data format.

The user can enable "autorun" mode with the "autorun on" command, which sets autorun_mode to true, or disable it with the "autorun off" command, which sets autorun_mode to false. The autorun variable is stored in flash memory. When autorun is enabled, the bytecode execution and debug engine 312 immediately starts running the current (stored) program when StickOS boots. This mode is typical of an embedded system during use.

The bytecode execution engine is implemented, for example, in the file run.c included in the sourcesv101.txt file in the computer program listing appendix.

viii. Interrupt Service Module 318 and Interrupt Handler

Almost all embedded systems use "interrupts" to notify the control program of "asynchronous" events (i.e., meaning asynchronous to the control program instruction stream). Ideally, the control program should first set up an "interrupt handler" to specify what actions are to be taken when the asynchronous event occurs. Then, the embedded system peripherals and operating system themselves should detect the event and:

1. stop the normal flow of control program execution,
2. invoke the "interrupt handler" to promptly service the interrupt, and
3. resume the normal flow of control program execution from where it left off.

Interrupt servicing in StickOS is performed in the main run_continue( ) loop, at the location indicated above. It simply involves testing for pending interrupt conditions (one at a time, in run_isr_pending[ ]), and if they are pending, pushing an unconditional scope onto the stack, changing the program line number to an otherwise illegal value (−1), and then executing the bytecode for the interrupt handler (from run_isr_bytecode[ ]). That bytecode can optionally perform a gosub (recursively changing the line number), or not. Then, when the bytecode for line number −1 has finished executing (meaning program flow has returned from the gosub, or there was only a single non-gosub statement in the interrupt handler bytecode), the unconditional scope is popped.

More specifically, the StickOS interrupt service module 318 contains "trampoline code" TC (FIG. 14) that allows StickOS to interrupt the normal deterministic execution of a BASIC target program (control program) upon detection of an asynchronous event, push the BASIC program's execution context on a stack, and then vector BASIC program execution to a predetermined BASIC "interrupt handler". The BASIC interrupt handler then executes in the context of the original BASIC program, potentially invoking BASIC subroutines. When the interrupt handler completes, the "trampoline code" TC then pops the BASIC program's original execution context, allowing it to resume its predetermined execution from where it was interrupted.

It should be noted that the "trampoline code" TC is responsible for propagating an asynchronous event detected by StickOS (such as may be originated either from a hardware interrupt or from polling of software or hardware resources) to the BASIC target program itself, so that the BASIC target program can achieve a fast response to the asynchronous event as is typically needed in an embedded system. This should not be confused with StickOS (or any operating system) simply servicing an interrupt for its own internal purposes (such as servicing a clock tick or UART interrupt). The trampoline code TC is fundamentally responsible for propagating the asynchronous event to a BASIC (i.e., application level) interrupt handler, contained in the BASIC target program itself, for service. (As used herein, "trampoline code" is code which propagates an asynchronous event detected by an operating system to a user's target program.)

The interrupt servicing, and its associated trampoline code as executed in the main run_continue( ) loop, looks like:

```
/* interrupt servicing (inserted in run_continue( ), above) */
/* if we're not already running an isr... */
if (! isr) {
    for (i = 0; i < MAX_INTS; i++) {
        /* if there is an isr to run... */
        if (run_isr_pending[i] && ! run_isr_masked[i] &&
            run_isr_bytecode[i]) {
            /* open a new temporary (unconditional) scope */
            scopes[max_scopes].line_number = line_number;
            scopes[max_scopes].type = open_isr;
            scopes[max_scopes].condition = true;
            max_scopes++;
            /* run the isr */
            isr = true;
            line_number = −1;
            execute_statement(run_isr_bytecode[i]);
            run_isr_pending[i] = false;
            break;
        }
    }
}
/* if we're returning from our isr... */
if (line_number == −1) {
    line_number = scopes[max_scopes−1].line_number;
    max_scopes--;
    isr = false;
}
```

Note that interrupts can also be "masked" (held off temporarily) by setting run_isr_masked[interrupt_number] to true, and can be disabled (discarded) by setting run_isr_bytecode [interrupt_number] to NULL.

The interrupt service module 318 runs in the trusted layer in conjunction with the bytecode execution and debug engine 312. The interrupt service module 318 has two primary sections: an on-chip event detecting section 318a and an interrupt delivery section 318b (FIG. 14). The on-chip event detecting section 318a is responsible for detecting (by means of the timer control 314 and the UART control 316) the occurrence of an asynchronous on-chip event (i.e., "on-chip" meaning within the microcontroller chip μC) which is used to cause an interrupt of the normal flow of BASIC statements in the user's target program. The interrupt delivery section 318b is responsible for calling (through the trampoline code) into the application layer (by means of the bytecode execution and debug engine 312) to execute an interrupt handler (i.e., those BASIC statement(s) that the user's target program has requested be executed when the interrupt occurs). In other words, the interrupt service module 318 decides that the normal flow of BASIC statements needs to be temporarily suspended, so that the bytecode execution and debug module 312 can run the interrupt handler statements associated with the interrupt in the user's target program. (As used herein, an "application-level interrupt handler" is an interrupt handler having one or more statements which is/are executed as a part of the application layer.)

In a preferred embodiment of the invention, the asynchronous on-chip event is either the expiration of one of the microcontroller chip's built-in timers 24b (or the expiration of an on-chip virtual timer triggered thereby) or a transition in the presence of data in one of the transmit and receive buffers of one of the microcontroller chip's built-in UARTs 24c. (By a "transition" in the presence of data, it is meant, for example, that data becomes present in a previously empty receive buffer or data becomes absent from a previously occupied transmit buffer.) The interrupt service module 318 detects these events through the timer control 314 and the UART control 316.

StickOS supports up to four virtual or internal interval timers (0 through 3), derived from the built-in timer 24b of the MCF52221 microcontroller chip μC, for use by the user's target program. Timer interrupts are delivered when the specified time interval has elapsed since the previous interrupt was delivered. Timer interrupt intervals are configured with the statement:

configure timer n for m ms

This configures timer n to interrupt every m milliseconds. The timer interrupt can then be enabled, and the statement(s) to execute when it is delivered be specified, with the statement:

on timer n statement

If the statement to be executed is a "gosub subname", then all of the statements in the corresponding subroutine are executed when the timer interrupt is delivered; otherwise, just the single statement is executed. The timer interrupt can later be completely ignored (i.e., discarded) with the statement:

off timer n

The timer interrupt can also be temporarily masked (i.e., held off but not discarded) and unmasked (i.e., so that any pending interrupts are delivered) with the respective statements:

mask timer n
unmask timer n

StickOS supports up to 2 UARTs (0 and 1). UARTs can be configured for a specific serial communication protocol and then used to transmit or receive serial data. UARTs can also be configured to generate interrupts when they receive or transmit a character (or more specifically, when the UART receive buffers are or become not empty, or when the UART transmit buffers are or become empty). UART serial communication protocols are configured with the statement:

configure uart n for b baud d data (even|odd|no) parity
configure uart n for b baud d data (even|odd|no) parity loopback (For the syntax of StickOS commands, statements, and expressions, see Section B herein, Operating System Commands and BASIC Features.) This configures UART n for b baud operation, with d data bits and the specified parity; 2 stop bits are always transmitted and 1 stop bit is received. If the optional "loopback" parameter is specified, the UART is configured to loop all transmit data back into its own receiver, for testing purposes. (Note that once the UART is configured, pin variables should be bound to the specified UART's transmit and receive pins for the purpose of examining read data and generating write data. Pin variables are more fully discussed in Subsection xiv., Pin Variables, of this detailed description.) The UART receive or transmit interrupt can be enabled, and the statement(s) to execute when it is delivered be specified, with the statement:

on uart n (input|output) statement

If the statement to be executed is a "gosub subname", then all of the statements in the corresponding subroutine are executed when the UART interrupt is delivered; otherwise, just the single statement is executed. (Note that an initial UART transmit interrupt is generated when the transmit interrupt is enabled and the UART transmit buffers are empty.) The UART receive or transmit interrupt can later be completely ignored (i.e., discarded) with the statement:

off uart n (input|output)

The UART receive or transmit interrupt can be temporarily masked (i.e., held off but not discarded) and unmasked (i.e., so that any pending interrupts are delivered) with the respective statements:

mask uart n (input|output)
unmask uart n (input|output)

For example, after configuring a virtual timer (e.g., "40 configure timer 1 for 1000 ms"), the user can enable a timer interrupt with the statement:

50 on timer 1 print "second"

or the statement:

50 on timer 1 gosub doit

The timer interrupt is then delivered to the StickOS bytecode execution engine's main run_continue( ) loop via the interrupt servicing mechanism described above. In both of these cases, whenever the particular on-chip event occurs, the specified statement(s) will be executed.

Similarly, after configuring a UART ("60 configure uart 0 for 300 baud 8 data no parity loopback"), the user can enable UART interrupts with the statement:

70 on uart 0 input gosub receive or the statement:

80 on uart 0 output gosub transmit

The UART receive (as in line 70) or transmit (as in line 80) interrupt is then delivered to the StickOS bytecode execution engine's main run_continue( ) loop via the interrupt servicing mechanism described above. In both of these cases, whenever the particular on-chip event occurs (e.g., in the receive buffer or the transmit buffer of the UART), the specified statement(s) will be executed.

The user statements which enable the interrupts also specify the "interrupt handlers". For example, the interrupt handler can be a print statement (print "second", in the timer interrupt example) or a statement which calls a sub-routine (gosub receive, in the UART interrupt example).

A simple StickOS BASIC program with interrupt handing is shown below:

10 dim ticks
15 configure timer 0 for 10 ms
20 on timer 0 let ticks=ticks+1
30 sleep 1000
40 print ticks When the user types "run" to execute the current program, the bytecode execution and debug engine 312 starts reading lines from the code access (and merge) module 326. The first line just declares a variable named "ticks", as a 4 byte integer. The next two lines then configure "timer 0" to interrupt the program every ten milliseconds, and specify the "interrupt handler" statements to run whenever the timer fires (let ticks=ticks+1). The next line just delays the program execution for 1000 milliseconds. During this delay time, the "timer 0" interrupt will fire 100 times. Each time it does, the bytecode execution engine will suspend the execution of the "sleep 1000" statement and then execute "let ticks=ticks+1", which is the "interrupt handler" for timer 0. Once the interrupt handler has run, execution will return to the remainder of the "sleep 1000". Finally at the end of the program, the variable ticks is printed:

100

Although interrupts in StickOS have been described with respect to events produced by on-chip timers and UARTs, it is envisioned that other on-chip events (such as an input pin level change) could also be detected by the interrupt service module 318 and serve as the basis for application-level interrupt handling.

The interrupt service module 318 and interrupt handler are implemented, for example, in the file run.c included in the sourcesv101.txt file in the computer program listing appendix.

ix. Interactive Debugger

In StickOS, a full suite of interactive debugging tools is provided in the bytecode execution and debug engine 312 to facilitate program development through the use of insertable breakpoints, single-stepping, and execution tracing. Moreover, the user can edit a stopped program and then continue execution (edit and continue), optionally from a different line number than where the program stopped. Additionally, StickOS provides an immediate mode to allow a user to both examine (using a print statement) and modify (using a let statement, if necessary) program variables and external I/O pins on the microcontroller chip (through the use of pin variables).

More particularly, the user can insert one or more "stop" statements in the program to function as breakpoints for debugging. When the bytecode execution and debug engine 312 encounters one of these stop statements, the program execution simply stops at the end of the current statement. When program execution is stopped, the user can examine (or modify) variables, etc., using the command-line interface, and potentially even edit the program, and then subsequently resume program execution (at the beginning of the next statement) using the "cont" command Similarly, the user can insert one or more "assert <expression>" statements in the program to stop program execution during debug. When the bytecode execution and debug engine 312 encounters one of these assertion statements, the <expression> is evaluated and if the result is false, program execution stops at the end of the current statement.

The user can enable "single-step" mode with the "step on" command, which sets step_mode to true, or disable it with the "step off" command, which sets step_mode to false. When single-stepping is enabled, it is just as if there was an implied "stop" command at the end of every line of bytecode, and the program will stop execution after every statement. Pressing <Enter> (essentially entering what would otherwise be a blank command) while single-stepping is enabled is the same as the "cont" command. To display the status of the single-step mode for the BASIC program, use the command "step" (i.e., without the "on" or "off" switch).

The user can enable "execution tracing" mode with the "trace on" command, which sets trace_mode to true, or disable it with the "trace off" command, which sets trace_mode to false. When execution tracing is enabled, any variable "set" references will simply print the line number, variable name, and newly set value, and the program will display all variable modifications while running.

Finally, the user can use "immediate mode" to both examine (using a print statement) and/or modify (using a let statement) program variables and/or external I/O pins. Specifically, at any time when a program is stopped, BASIC program statements can be entered at the command line with no line number and they will be individually run from the application layer and (after being validated by the bytecode execution and debug engine 312) executed immediately; this is called "immediate mode". This allows the user to display the values of variables, with an immediate mode statement like:
print <expression>

StickOS also allows the user to modify the value of variables, with an immediate mode statement like:
let <variable>=<expression>

Note that if an immediate mode statement references a pin variable, the live CPUStick pin can be examined or manipulated, providing a very powerful debugging technique for the embedded system itself.

A first debug example is provided below:
10 dim a
20 let a=0
30 print 3/a
40 print 4/a
50 print a If this program is run, it will stop with an error at line 30 after dividing by 0. If the "cont" command was thereafter entered, execution would continue at line 40, and the same error would be generated, and execution would stop again. However, if a "cont 50" command was entered instead, execution would continue at line 50 with no errors and with the printed output:
0

However, after the error notification in line 30, the user might realize the divide-by-zero coding errors, delete lines 30 and 40 ("delete 30", "delete 40"), and then use the "cont" command to have the program complete successfully, e.g.:
0

A second debug example is provided below:
10 dim i
20 for i=1 to 1000000
30 next
40 print i When the user runs this program, the conditional for-next loop in lines 20 and 30 will take a while to run. If the user wishes to stop program execution before the for-next loop completes, he may simply press Ctrl-C. Subsequently, the user may enter (in immediate mode):
print i
And the debugger would respond something like:
250000
Now, if the user didn't want to have to wait for i to get to 1000000, he could then modify (edit) the value of the i variable and continue the program:
let i=1000000
cont
And the program would immediately print:
1000000

As such, the interactive debugging features of StickOS are capable of altering program execution by means of any or all of:

1. continuing from a different line from where the program left off, or
2. modifying the program source code and then continuing the modified program execution (e.g., "edit and continue"), or
3. altering data (such as the value of a program variable) that is tested conditionally during program execution.

In StickOS, the interactive debugger is additionally configured to map the source code symbolic information to (and from) the CPU states. Source code symbolic information is defined as any source code lines, variable names, and variable contents (since this implies knowing the type of the variable—whether byte or integer, for example). The CPU states referred to in this context are the states of the virtual machine defined by StickOS—since these states are all that is accessible to the BASIC program. These states include: the states of BASIC variables (RAM, flash, output pin states); external pin states (input pin states) reflected in input pin variables; and peripheral states (e.g., timers and UARTs) reflected in pin variables and interrupt states (interrupts pending).

A third debug example for illustrating this function is provided below:
>list
  10 dim a, b
  20 let a=3
  30 for b=0 to 3
  40 print b, a/b
  50 next
end
>run
0 divide by 0
0
STOP at line 40!
>print a,b
3 0
>let b=2
>cont 40
2 1
3 1
>

When the user enters "print a,b" at the terminal 60, the interactive debugger maps the source could symbolic information entered by the user (i.e., the variable names "a" and "b") to the CPU states (i.e., the states of those BASIC variables where they exist in RAM). Once it finds the states (i.e., values) of the variables in RAM, it formats their binary representations as (4-byte) integers and sends them back to the terminal 60 for display via the FTDI transport 302.

The interactive debugger is implemented, for example, in the files basic.c, run.c, and vars.c included in the sourcesv101.txt file in the computer program listing appendix.

x. Flash Control and Access 320

Embedded microcontrollers typically have a limited amount of flash memory (e.g., the Freescale MCF52221 microcontroller chip μC has 128 k bytes of flash). It will be understood that the StickOS operating system itself (including all of the modules 302-330 described in conjunction with FIG. 9) occupies a portion of the flash memory 22 (for example, the first 64 k bytes). Beyond that, the bytecode of the current "base program" entered and saved by the user to be executed by StickOS is stored in flash memory. The values of all program flash variables or parameters that are required to be persistent across program executions and/or StickOS resets are also stored in flash memory (e.g., user target program variables/parameters, and user-selected StickOS modes such as "autorun on" or "autoreset off"). Finally, up to three named programs (additional programs) can be stored in the flash memory 22.

Conventionally, the updating flash memory is at least a two step process. First, the flash memory (or a portion of it) must be erased (typically setting all its bits to 1, corresponding to a two's-compliment integer value of –1), and once it has been erased, it may then be re-programmed (clearing selected bits to 0, as appropriate), often in multiple steps again.

If the system were to lose power between these steps, the flash memory would have lost some or all of its contents permanently, when the intent was just to update it. To protect against this, critical StickOS flash memory updates use a "dual page with generation number" scheme. Two pages (or copies) of the data considered to be critical that can be updated in the flash memory (e.g., the current user target program, and associated flash variables/parameters/modes) are maintained in the banks of the flash memory 22 by the flash control and access module 320: a most recent page (the current page) and a second-most-recent page (the alternate page). The "last" 32 bit integer (i.e., last spatially, as well as last step updated in time) of each page is reserved to contain a "generation number" describing the age of the page's data contents. The "current page" (i.e., the flash memory page whose data is read and used) is determined by looking at the generation numbers of both pages comparing them to find which memory page has the most-recent generation number and therefore the most-recent data, as follows:

```
page /* returns current page */
get_current_flash_page(
  IN page1,
  IN page2
  )
{
  if ((page1.generation + 1) > (page2.generation + 1)) {
    /* page1 is current; page2 is alternate */
    return page1;
  } else {
    /* page2 is current; page1 is alternate */
    return page2;
  }
}
```

The "+1" ensures that an erased page (whose generation number is –1) always has the oldest possible generation number, and the 32 bit size of the generation number is selected such that the generation number cannot overflow in the flash memory's lifetime (typically on the order of 10,000 to 1,000,000 writes).

When it is desired to update (critical) data stored in flash memory, the alternate page (i.e., the page that is not current) is erased and re-programmed with the updated data, and then (as the last step of the update) the alternate page's generation number is set to the current page's generation number+1, thereby promoting the alternate (i.e., newly programmed) page to be the new current page. This provides a safe update mechanism even in the presence of power failures or other errors prior to write completion.

In StickOS, the flash control and access module 320 also provides the flasher functions which were previously performed by external flash programmers (such as flash programmer 40 in FIG. 1). As used herein, the term "flash memory" refers to any form of re-writable non-volatile memory, and not to a particular memory technology.

The flash control and access module 320 is implemented, for example, in the files code.c, flash.c, and vars.c included in the sourcesv101.txt file in the computer program listing appendix.

xi. RAM Control and Access 322

Embedded microcontrollers typically have a limited amount of RAM (e.g., the Freescale MCF52221 microcontroller chip μC has 16 k bytes of RAM). It will be understood that the StickOS operating system itself utilizes a portion of the RAM as private RAM. Beyond that, the current "delta program", which is the bytecode of the running set of deltas (changes) to the current "base program" that the user has made since the last time the current program was saved, is stored in RAM to avoid having to update flash memory for every delta (change). The values of all named program RAM variables are also stored in RAM. Finally, a "variable list" is stored in RAM that lists the names of all program variables, as well as their usage and location, such as whether they are in RAM or flash memory or are special "pin variables", and exactly where (memory address) they are located or to what pin (and how) they are bound.

The RAM control and access module 322 is used to access both the "delta program" stored in RAM and BASIC program variables stored in RAM. The module allows program lines to be added to or deleted from the delta program, and then allows the lines of the delta program to be enumerated, for merge with the current base program stored in flash. The module also allows BASIC program variables to be allocated when a RAM variable is first declared, and queried or set when a RAM variable is accessed during expression evaluation or updated during RAM variable assignment.

The RAM control and access module 322 is implemented, for example, in the files code.c and vars.c included in the sourcesv101.txt file in the computer program listing appendix.

xii. File System 324

In the preferred embodiment of the invention, the file system 324 in StickOS allows a user to load and store up to three named BASIC programs (i.e., in addition to the current BASIC program which is (or can be) saved in flash and run without an associated file name) using a flash catalog with a set of three "name slots". In a modified version of the preferred embodiment, the file system 324 is a "dual page with generation number" flash catalog with a set of name slots coupled with a set of flash program storage locations in a corresponding (current or alternate) flash memory page, as shown in FIG. 10. To list the named programs stored in the file system with the "dir" command, the text (if any) in each slot of the flash catalog (or in each slot of the current page of the flash catalog in the modified preferred embodiment) is displayed.

To save a named program in the file system, the flash catalog (or the current page of the flash catalog in the modified preferred embodiment) is first searched to see if the named program already occupies one of the name slots; if it does not, an empty slot is allocated for the named program (if no empty slot exists, the program cannot be stored so an error is issued). The program storage location corresponding to the slot thus occupied by or allocated for the named flash program is then erased and re-programmed with the program to be stored. The flash catalog is then updated so as to include, in the slot previously occupied by or now allocated for the named flash program, the program's name (using e.g., in the modified preferred embodiment the "dual page with generation number" algorithm described above, with the last 32 bit integer of each catalog copy being reserved to contain a generation number).

Additionally, in the preferred embodiment of the invention, the current user target program is stored unnamed in the flash memory 22 by issuing the "save" command without an associated file name. A copy of the current user target program may also be saved as a named program in the file system using a "save <name>" command To load a named program from the file system so that it becomes the current program in the CPUStick, the flash catalog (or the current page of the flash catalog in the modified preferred embodiment) is searched to see if the named program exists in one of the name slots; if it does, the program is loaded as the current program (if the named program does not exist, an error is issued). The "run" command may then be used to run the current program in the CPUStick, optionally beginning execution at a specified line number.

To purge a named program from the file system, the flash catalog (or the current page of the flash catalog in the modified preferred embodiment) is searched to see if the named program exists in one of the name slots; if it does, the flash catalog is updated (e.g., using the "dual page with generation number" algorithm described above) to remove the old program's name (if the named program does not exist, an error is issued).

The file system 324 is implemented, for example, in the file code.c included in the sourcesv101.txt file in the computer program listing appendix.

xiii. Code Access and Merge Module 326

StickOS makes use of both RAM and flash memory to store the compiled bytecode of a program. As is well-know, RAM can rewritten at will; however, flash memory can only be written a finite number of times (typically 10,000 to 1,000,000 times) before failure.

To allow the user the ability to engage in long development cycles, it is required that the flash memory not be rewritten for every single change (or "delta") that the user makes to the target board control program. In StickOS, this is accomplished by storing a (larger and more static) "base program" in a current page of flash memory, and then storing a (smaller and more dynamic) "delta program" in RAM. The user edits the "delta program" at will. Note that the user can not only "add" lines to the base program by adding them to the delta program, but he can also delete them by adding a line to the delta program that indicates that the base program line has been deleted (for example, by adding a new line to the delta program which includes only the base program line number, without a subsequent program statement). When retrieving code lines for execution, the base program and delta program are seamlessly merged by the code access (and merge) module 326 to present the image of a single coherent program. The routine that does this looks like:

```
line /* the line following previous_line */
code_find_next_line(
    IN previous_line
)
{
    do {
        find next line following previous_line in RAM;
        find next line following previous_line in flash memory;
        if (no following lines in RAM or flash memory) {
            return NULL;
        }
```

-continued

```
        if (no following lines in RAM) {
            use following line from flash memory;
        } else if (no following lines in flash memory) {
            use following line from RAM;
        } else if (following line number in flash memory <
                following line number in RAM) {
            use following line from flash memory;
        } else {
            use following line from RAM;
        }
    } while (following line does not indicate a deleted line);
    return following line;
}
```

When the user exceeds a threshold of deltas or changes to the current program, the "base program" (in the current page of flash memory) and "delta program" are automatically merged and written to the alternate page of flash memory, at the cost of only a single flash memory write. (In the presently preferred embodiment, this threshold is a delta program size of 2048 bytes of compiled bytecode.) The "delta program" in RAM is then cleared and the alternate page of flash memory is promoted to become the current page of flash memory, and the process can begin again. Prior to exceeding this threshold, the user may use the "undo" command to undo the delta program changes (as stored in RAM) to the BASIC program since the last time it was stored in flash memory.

As an example, the user's base program may initially be stored as shown in FIG. 11, with just lines 10, 20, and 30 stored in the current bank of flash memory. Then the user may then add lines 40, 50, and 60 to the delta program stored in RAM, and then delete line 20, as shown in FIG. 12. The user can then run and test the merged program in this state, and make sure it works correctly. If he lists the program, he will see the merged result:

>list
   10 dim a
   30 let a=0
   40 while a<10 do
   50 let a=a+1
   60 endwhile
end
>

To accomplish this, the code access (and merge) module 326 traces through both the delta program and current base program, from lowest to highest line number, and allows lines in the delta program to take precedence over those in the base program. All lines are returned to the caller in order, independent of whether they were found in RAM or flash memory. Finally, the user can (manually) merge and resave the delta program to the base program with the "save" command, at the cost of only a single flash memory write (per location), resulting in the storage configuration shown in FIG. 13. Subsequently, then editing by the user can continue again.

The code access (and merge) module 326 is implemented, for example, in the file code.c included in the sourcesv101.txt file in the computer program listing appendix.

xiv. Pin Variables

Normally when a variable is declared, it is necessary to specify the size of the variable in bytes, since the assumption is the variable is stored in RAM and it is thus necessary to allocate "space" for it in RAM. In StickOS, however, the user can optionally specify that the variable should be stored (persistently) in non-volatile flash memory ("flash variables"), or that the variable shouldn't be stored in memory at all, but rather should be bound to a pin on the microcontroller chip μC through an associated I/O register of the microcontroller chip μC. Variables in StickOS which are bound to microcontroller chip pins are called "pin variables." When a pin variable is declared, it is merely necessary to specify which I/O pin the variable is bound to and what function the pin is being configured for. Then, whenever the program tries to "read" the pin variable (through the variable_get( ) function), the I/O register associated with the pin is sampled, and whenever the user tries to "write" to the pin, the I/O register associated with the pin is updated.

Pin variables are an important feature of StickOS. They allow the user (the program writer) to bind what look and act like regular language variables directly to the microcontroller chip external I/O pins. Pin variables consume no actual memory storage space (RAM or flash), other than their bookkeeping entries in the "variable list", since their "value" is "stored" on-chip in a register associated with the external I/O pin itself. Examining one of these variables in the program reflects the state of the actual I/O pin; manipulating one of these variables in the program (assuming the I/O pin is configured for an output function) changes the state of the actual I/O pin. This pin variable binding allowing the program writer to use all of the existing programming language constructs to access and manipulate the microcontroller chip's external I/O pins.

Many or most of the unused external pins on the MCF52221 microcontroller chip μC can serve as general purpose I/O (GPIO) pins. General purpose I/O pins can function as, for example, digital input/output pins, analog input pins, and analog (PWM) output pins. For example, the MCF52221 microcontroller chip's analog input pins AN0-AN7 can serve as GPIO pins and thus can alternately be configured to function as digital input/output pins or analog input pins. StickOS provides external control for twenty-nine I/O pins 25 on the MCF52221 microcontroller chip μC through the use of pin variables.

The actual act of configuring the microcontroller chip's external I/O pins is done by the external pin control and access module 328 in response to the bytecode execution (and debug) engine 312 executing the BASIC program lines such as these:
20 dim thermocouple as pin an0 for analog input
30 dim relay as pin an1 for digital output
Line 20 declares a variable named "thermocouple", binds it to pin AN0 on the MCF52221 microcontroller chip μC, and configures (or re-configures) the pin AN0 (which itself has a primary analog input function and a quaternary GPIO function) as an analog input pin. (Note that analog inputs and outputs are represented, in the associated I/O registers, by integers in the range of 0 to 32767, where 0 represents a 0V input or output and 32767 represents a 3.3V input or output.) Line 30 declares a variable named "relay", binds it to pin AN1 on the MCF52221 microcontroller chip μC, and configures (or re-configures) the pin AN1 (which also has a primary analog input function and a quaternary GPIO function) as a digital output pin. (Note that in StickOS, all of the microcontroller chip's I/O pins are safely assumed and configured to be "digital input" pins until they are explicitly configured, in order to prevent any possible damage to the hardware.)

After a UART is configured, pin variables should be bound to the specified UART's transmit and receive pins with one or more of the following statements:
    dim varrx as pin urxdn for uart input
    dim vartx as pin utxdn for uart output
This binds the varrx variable to the specified UART's receive data pin, and the vartx variable to the specified UART's transmit data pin. From then on, receive data can be examined by reading the varrx variable, and transmit data can be generated by writing the vartx variable.

Pin variables are implemented, for example, in the file vars.c included in the sourcesv101.txt file in the computer program listing appendix.

xv. External Pin Control and Access 328

The external pin control and access module 328 is used to configure the external I/O pins of the microcontroller chip (as digital input/output, uart, or analog input or output) when a pin variable is first declared. It is also used to query the current state of the external I/O pins of the microcontroller chip when a pin variable is accessed during expression evaluation, and to set the current state of the external I/O pins of the microcontroller chip when a pin variable is updated during pin variable assignment.

The external pin control and access module 328 is implemented, for example, in the files adc.c and vars.c included in the sourcesv101.txt file in the computer program listing appendix.

xvi. Variable Access Module 330

The variable access module 330 maintains a variable list of all of the variables defined by the current (running) program. Each variable list entry includes: the variable name; the type of variable—RAM, flash, or pin; the size of the variable (whether byte or integer, and how many array elements); and the location of the variable (RAM and flash variables have a memory address, while pin variables have a pin number and pin type).

In StickOS, "RAM variables" are conventional variables which are stored in RAM, are volatile (e.g., they are reset to 0 at the start of program execution), and can be updated at will. "Flash variables" are similar to RAM variables, except they are stored in flash memory instead of RAM. This means they are non-volatile (they keep their value between program executions, and even across power cycles and resets), but (because they are stored in flash) they have a "finite life" and can only be updated typically on the order of 10,000 to 1,000,000 writes before causing a system failure. For this reason, they should be updated rarely, in response to rare events, such as user configuration changes. Flash variables are updated with the "dual page with generation number" algorithm described above. "Pin variables", as described above, allow the user (the program writer) to bind what look and act like regular language variables directly to the microcontroller chip external I/O pins.

Variables are declared through a "dim" (dimension) statement. When this statement is executed by the bytecode execution engine, a routine in the variable module is called to declare and/or configure the variable:

```
void
variable_declare(
    IN char *name,
    IN enum type,
    IN int element_size,
    IN int element_count, /* 1 for simple variables; n for arrays */
    IN int pin_number, /* only used if type == pin */
    IN enum pin_type /* only used if type == pin */
    )
{
    entry = new variable_list_entry;
    entry.name = name;
    entry.type = type;
```

```
        entry.element_size = element_size;
        entry.element_count = element_count;
        if (type == RAM) {
            entry.location = allocate storage from RAM;
        } else if (type == flash) {
            entry.location = allocate storage from flash;
        } else if (type == pin) {
            entry.pin_number = pin_number;
            entry.pin_type = pin_type;
            switch (pin_type) {
                case digital_output:
                    configure MCU pin pin_number for digital output;
                    break;
                case digital_input:
                    configure MCU pin pin_number for digital input;
                    break;
                case analog_output:
                    configure MCU pin pin_number for analog output;
                    break;
                case analog_input:
                    configure MCU pin pin_number for analog input;
                    break;
                case uart_output:
                    configure MCU pin pin_number for uart output;
                    break;
                case uart_input:
                    configure MCU pin pin_number for uart input;
                    break;
            }
        }
    }
```

All variables may be cleared through the routine:

```
void
variable clear( )
{
    clear variable list;
    clear variable storage;
}
```

In StickOS, RAM variables are dimensioned by the user as follows:
dim <var>[[n]]
dim <var>[[n]] as (byte|integer)

Flash variables are dimensioned as follows:
dim <varflash>[[n]] as flash

Pin variables are dimensioned as follows:
dim <varpin> as pin <pinname> for (analog|digital|uart) (input|output)

If a pin is configured for analog input, then subsequently reading the variable varpin will return the analog voltage level integer indication in the range 0 . . . 32767, corresponding to 0V . . . 3.3V of the input pin (e.g., the value of the variable varpin will increase by 4, up to 32767, for each approximately 0.4 mV increase in the pin voltage). It is illegal to attempt to write to an analog input pin variable (i.e., it is read-only).

In a modification to the preferred embodiment, if a pin is configured for analog output, then writing varpin with an integer value in the range 0 . . . 32767 will set the analog output (PWM actually) pin to a corresponding analog voltage level in the range of 0V . . . 3.3V, and reading the variable varpin will return the analog voltage level integer indication in the range 0 . . . 32767, corresponding to 0V . . . 3.3V of the output pin.

If a pin is configured for digital input, then subsequently reading the variable varpin will return the value 0 if the digital input pin is currently at a low level (e.g., below about 1.15 V), or 1 if the digital input pin is currently at a high level (e.g., above about 2.3 V). It is illegal to attempt to write to a digital input pin variable (i.e., it is read-only).

If a pin is configured for digital output, then writing varpin with a 0 value will set the digital output pin to a low level (e.g., below about 0.5 V), and writing it with a non-0 value will set the digital output pin to a high level (e.g., above about 2.8 V). Similarly, reading the variable varpin will return the value 0 if the digital output pin is currently at a low level, or 1 if the digital output pin is currently at a high level.

Variables are queried as part of expression evaluation. When the expression is evaluated by the bytecode execution engine (312), a routine in the variable module is called to query the variable:

```
int /* value */
variable_get(
    IN char *name,
    IN int element_number /* 0 for simple variables; i for arrays */
)
{
    entry = look up variable name;
    if (! entry) {
        print "undefined variable";
        stop( );
        return 0;
    }
    if (entry.type == RAM) {
        if (entry.size == byte) {
            return *(byte *)(ram_page+entry.location+
                    element_number*entry.size);
        } else if (entry.size == int) {
            return *(int *)(ram_page+entry.location+
                    element_number*entry.size);
        }
    } else if (entry.type == flash) {
        current_flash_page = get_current_flash_page(page1, page2);
        return *(int *)(current_flash_page+entry.location+
                element_number*entry.size);
    } else if (entry.type == pin) {
        switch (entry.pin_type) {
            case digital_output:
                return digital output value of pin pin_number;
            case digital_input:
                return digital input value of pin pin_number;
            case analog_output:
                return analog output value of pin pin_number;
            case analog_input:
                return analog input value of pin pin_number;
            case uart_output:
                return transmit register value of pin pin_number;
            case uart_input:
                return uart receive register value of pin pin_number;
        }
    }
}
```

Variables are updated as part of a "let" statement. When the statement is executed by the bytecode execution engine (312), a routine in the variable module is called to update the variable:

```
void
variable_set(
    IN char *name,
    IN int element_number, /* 0 for simple variables; i for arrays */
    IN int value
)
{
    entry = look up variable name;
    if (! entry) {
        print "undefined variable";
        stop( );
        return 0;
    }
    if (trace_mode) {
        print line_number, "let", name, "=", value;
    }
```

37
-continued

```
if (entry.type == RAM) {
    if (entry.size == byte) {
        *(byte *)(ram_page+entry.location+
            element_number*entry.size) = value;
    } else if (entry.size == integer) {
        *(integer *)(ram_page+entry.location+
            element_number*entry.size) = value;
    }
} else if (entry.type == flash) {
    /* N.B. dual page with generation number flash memory update */
    current_flash_page = get_current_flash_page(page1, page2);
    alternate_flash_page = current_flash_page == page1 ?
        page2 : page1;
    erase(alternate_flash_page);
    *(int *)(alternate_flash_page+entry.location+
        element_number*entry.size) = value;
    copy all other bytes from current_flash_page to
        alternate_flash_page;
    alternate_flash_page.generation =
        current_flash_page.generation+1;
} else if (entry.type == pin) {
    switch (entry.pin_type) {
        case digital_input:
        case analog_input:
        case uart_input:
            print "read only variable";
            stop( );
            return;
        case digital_output:
            set digital output pin pin_number = value;
            break;
        case analog_output:
            set analog output pin pin_number = value;
            break;
        case uart_output:
            set uart transmit register of pin pin_number = value;
            break;
    }
}
```

The variable access module 330 is implemented, for example, in the file vars.c included in the sourcesv101.txt file in the computer program listing appendix.

B. Operating System Commands and BASIC Features

1) StickOS includes on-line help accessed by typing "help" at the command prompt symbol, with additional information being provided on particular topics.
>help about
>help commands
>help modes
>help statements
>help blocks
>help devices
>help expressions
>help variables
>help pins
>help board
>help clone 2) StickOS includes the following operating system commands, with angle brackets ("<", ">") indicating associated user input, and with optional command switches being indicated by braces ("[", "]"):

| | |
|---|---|
| clear [flash] | clear ram [and flash] variables |
| clone [run] | clone flash to slave CPUStick [and run] |
| cont [<line>] | continue program from stop |

38
-continued

| | |
|---|---|
| delete [<line>][-][<line>] | delete program lines |
| dir | list saved programs |
| edit <line> | edit program line |
| help [<topic>] | online help |
| list [<line>][-][<line>] | list program lines |
| load <name> | load saved program |
| memory | print memory usage |
| new | erase code ram and flash memories |
| purge <name> | purge saved program |
| renumber [<line>] | renumber program lines (and save) |
| reset | reset the CPUStick! |
| run [<line>] | run program |
| save [<name>] | save code ram to flash memory |
| undo | undo code changes since last save |
| upgrade | upgrade StickOS firmware! |
| uptime | print time since last reset |

3) StickOS can be run in the following modes, with optional and alternative mode switches being indicated by braces ("[", "]") and vertical bars ("|"), respectively:

| | |
|---|---|
| autoreset [on\|off] | autoreset (on wake) mode |
| autorun [on\|off] | autorun (on reset) mode |
| echo [on\|off] | terminal echo mode |
| indent [on\|off] | listing indent mode |
| prompt [on\|off] | terminal prompt mode |
| step [on\|off] | debugger single-step mode |
| trace [on\|off] | debugger trace mode |

4) StickOS supports the following BASIC programming statements, with angle brackets ("<", ">") indicating associated user input, and with optional and alternative statement switches being indicated by outer braces ("[", "]") and vertical bars ("|") in parentheses ("(", ")"), respectively:

| | |
|---|---|
| [<line>] [<statement>] | enter program line into code ram |
| assert <expression> | break if expression is false |
| data <n> [, ...] | read-only data |
| dim <variable>[[n]] [as ...] [, ...] | dimension variables |
| end | end program |
| let <variable> = <expression> | assign variable |
| print ("<string>"\|<expression>) [, ...] | print strings/expressions |
| read <variable> [, ...] | read read-only data into variables |
| rem <remark> | remark |
| restore [<line>] | restore read-only data pointer |
| sleep <expression> | delay program execution (ms) |
| stop | insert breakpoint in code |

5) StickOS supports the following BASIC programming block statements, with angle brackets ("<", ">") indicating associated user input, and with optional statements being indicated by braces ("[", "]"):
a) If Then statements:
   if <expression> then
   [elseif <expression> then]
   [else]
   endif
b) For Next statements:
   for <variable>=<expression> to <expression> [step <expression>]
   [break [n]]
   next
c) While Endwhile statements:
   while <expression> do
   [break [n]]
   endwhile d) Gosub statements and subroutines:
  gosub <subname>
  sub <subname>
  [return]
  endsub In both the for-next and while-endwhile loops, the loop can be exited prematurely using the "break" statement.

6) StickOS supports the following device statements for timers, with angle brackets ("<", ">") indicating associated user input:

| configure timer <n> for <m> ms | |
|---|---|
| on timer <n> <statement> | on timer execute <statement> |
| off timer <n> | disable timer interrupt |
| mask timer <n> | mask (hold) timer interrupt |
| unmask timer <n> | unmask timer interrupt |

7) StickOS supports the following device statements for UARTs, with angle brackets ("<", ">") indicating associated user input, and with optional and alternative statement switches being indicated by braces ("[", "]") and vertical bars ("|") in parentheses ("(", ")"), respectively:

| configure uart <n> for <b> baud <d> data (even\|odd\|no) parity [loopback] | |
|---|---|
| on uart <n> (input\|output) <statement> | on uart execute <statement> |
| off uart <n> (input\|output) | disable uart interrupt |
| mask uart <n> (input\|output) | mask (hold) uart interrupt |
| unmask uart <n> (input\|output) | unmask uart interrupt |

8) StickOS supports the following operators for expressions, as in C, in order of increasing precedence, with angle brackets ("<", ">") indicating associated user input:

| \|\| ^^ && | logical or, xor, and |
|---|---|
| \| ^ & | bitwise or, xor, and |
| == != | equal, not equal |
| <= < >= > | inequalities |
| >> << | shift right, left |
| + - | plus, minus |
| * / % | times, divide, mod |
| ! ~ | logical not, bitwise not |
| ( ) | grouping |
| <variable> | simple variable |
| <variable>[<expression>] | array variable element |
| <n> | decimal constant |
| 0x<n> | hexadecimal constant |

4. The Programmed Computer: StickOS on CPUStick:

FIG. 14 is a hybrid hardware/software diagram showing the manner in which the CPUStick target board of FIG. 4 or FIG. 6 and the StickOS operating system of FIG. 9 interact to produce the microcontroller-resident software development environment system as conceptually shown in FIG. 3 according to one preferred embodiment of the invention. The CPUStick custom target board 20' or 20", described above, is a programmed stand-alone system-on-a-chip (SoC, SiP, or MCM) computer useful for embedded systems. As shown in FIG. 14, the target board 20' or 20" includes the microcontroller chip μC (such as the MCF52221, depicted by the double line border) having the on-chip CPU core 21, and on-chip memory including the on-chip programmable non-volatile (flash) memory 22 (having a first portion and a second portion) and the on-chip RAM 23. The microcontroller chip μC further includes the on-chip peripherals including e.g., an on-chip serial communications interface 24a, on-chip built-in timers 24b, and on-chip UARTs 24c. The on-chip communications interface 24a is adapted to be connected to a user terminal 60 of a host computer 10 via a (e.g., USB) serial connection 70 and preferably configured to bidirectionally receive and transmit source code symbolic information input by the user from and output from the microcontroller to the terminal 60. The on-chip communications interface 24a is additionally configured to receive operating system commands to control the StickOS operating system and to transmit operating system status and response information (i.e., display output). The on-chip timers (i.e., the built-in timer 24b and/or the corresponding virtual timers) are used, upon expiration, to trigger application-level interrupts in the user's target program. Similarly, the on-chip UARTs 24c, which include transmit and receive buffers, are used to trigger application-level interrupts in the user's target program upon a transition in the presence of data in one of the transmit and receive buffers.

The microcontroller chip μC further includes external I/O pins 25 which are adapted to interface between the microcontroller chip μC and a system in which the microcontroller chip is to be embedded. Each I/O pin 25 has one or more associated I/O registers 25a. The I/O registers 25a are provided in the microcontroller chip μC and are functionally connected to the I/O pins 25 in such a way as to be capable of detecting or reading (for each I/O pin 25) the current pin state, and also capable of storing output pin data.

The StickOS operating system 300 is wholly resident in the microcontroller μC and is configured to run on the CPU core 21 entirely from within the on-chip memory 22, 23, without need of additional (external) memory. The StickOS operating system 300 functions as the firmware for the CPUStick target board 20' or 20" and includes (as shown by the thick outline) a trusted layer which runs on the CPU core 21 and which includes development environment software. The trusted layer is wholly programmed into a first portion (0-63 k) of the microcontroller's on-chip programmable non-volatile memory 22 and includes, for example, the text (or line) editor (304), the bytecode compiler (308), the bytecode execution engine (312), the interactive debugger, the timer control module 314, the UART control module 316, the interrupt service module 318, the non-volatile memory controller (320), the code access (and merge) module (326), the pin controller (328), the variable access module (330), and upgrading means. (As used herein, the terms "pin controller" and "non-volatile memory controller" refer to those portions of StickOS that provide both control of and controlled access to the I/O pins and the non-volatile memory, respectively, i.e., the external pin control and access module 328 and the flash control and access module 320.)

The text (or line) editor (304) is configured to permit the user to enter and manipulate lines of source code symbolic information via the user terminal 60. The text (or line) editor also interacts with the remainder of the StickOS operating system to permit the user to enter and manipulate an operating system command line at the operating system command prompt (">").

The bytecode compiler (308), or compiling means, is configured to automatically compile the source code symbolic information input by a user through the user terminal 60 into a target program stored in the on-chip memory 22, 23. More particularly, the bytecode compiler (308) is configured to individually compile, on a line-by-line basis, the program lines of source code symbolic information, automatically as they are input by a user through the user terminal 60, into a target program to be stored in the on-chip memory 22, 23. Initially, the bytecode compiler (308) compiles the source code symbolic information input by the user, line-by-line, to a delta portion of the target program which is stored in the on-chip RAM 23.

The bytecode compiler (308) is also configured to automatically individually error check, on a line-by-line basis, the program lines of source code symbolic information input by the user through the user terminal 60, and to immediately report an error to the user via the on-chip serial communications interface 24a when the user inputs a program line that does not contain a valid program statement.

The bytecode execution engine (which is part of the bytecode execution and debug engine 312) is preferably configured to a) execute the compiled bytecode program statements as part of the target program and b) execute an individual compiled bytecode program statement immediately, apart from any target program, when the compiled bytecode program statement is not preceded by a program line number.

The interactive debugger (which is part of the bytecode execution and debug engine 312), or debugging means, is configured to allow interactive debugging of the target program. In StickOS, CPU states are exposed to the trusted layer, and the interactive debugger is configured to map the source code symbolic information to (and from) the CPU states. The interactive debugger is also configured to provide insertable breakpoints in the target program, to provide single-stepping operation of the target program, to provide execution tracing of the target program, and to modify the values of program variables and alter a sequence of execution of the target program during debug.

The timer control module 314 (shown also in FIG. 9) is responsible for configuring virtual timers in response to a "configure timer" statement executed by the bytecode execution and debug engine 312, as well as detecting the on-chip events associated with virtual timer interrupts, on behalf of and for use by the interrupt service module 318, that were previously enabled with a "on timer" statement.

The UART control module 316 (also shown in FIG. 9) is responsible for configuring UART data format in response to a "configure uart" statement executed by the bytecode execution and debug engine 312, as well as detecting the on-chip events associated with UART interrupts, on behalf of and for use by the interrupt service module 318, that were previously enabled with a "on uart" statement.

The interrupt service module 318 (which functions as an asynchronous event detecting means and an interrupt delivery means) is part of the trusted layer and includes an on-chip event detection section (or detector) 318a and an interrupt delivery section 318b. The on-chip event detector 318a is configured to detect (on the basis of signals delivered from the timer control module 314 and the UART control module 316) an asynchronous on-chip event specified in the target program during execution of the target program. The interrupt delivery section 318b includes trampoline code TC which is configured to invoke, in response to the event detected by the on-chip event detector 318a, an application-level interrupt handler 332 which handles an interrupt specified for the event by executing a specific portion of the target program. The asynchronous on-chip event may be the expiration of an on-chip timer (e.g., built-in timer 24b or virtual timers) or a transition in the presence of data in the transmit or receive buffers of a UART 24c.

As shown in FIG. 14, the trusted layer of the StickOS operating system is configured to run the user's target program in an application layer. Generally speaking, any StickOS code written in C is considered to be part of the trusted layer, while any user code compiled into bytecode by StickOS is considered to run in (and be part of) the application layer. (Technically, the application layer includes all the constraints placed on a valid target program by the trusted layer, together with any current target program which is being developed or running within these constraints. In the preferred embodiment it will be understood that these constraints are placed on a valid target program e.g., by the bytecode compiler 308 and the bytecode execution and debug engine 312.) The application layer includes an interrupt handler 332, or interrupt handling means, which is configured to respond to the event detected by the on-chip event detection section 318a of the interrupt service module 318 and handle an interrupt specified for the event by executing a specific portion of the target program. The interrupt delivery section 318b of the interrupt service module 318 is configured to immediately service the interrupt (with the "on" statement), or it can alternately be configured to mask the interrupt for later servicing (with the "mask" statement), or it can otherwise be configured to selectively disable interrupts (with the "off" statement) during execution of the target program.

The non-volatile memory controller (320), or saving means, is configured to save the target program to the on-chip programmable non-volatile memory 22, and to store persistent program parameters in the on-chip programmable non-volatile memory 22. In the preferred embodiment, the target program and the persistent program parameters are stored to the second portion (e.g., 64-127 k) of the on-chip programmable non-volatile memory 22.

The code access (and merge) module (326) is configured to merge the delta portion of the target program stored in the on-chip RAM 23 with the base portion of the target program stored in the on-chip programmable non-volatile memory 22 during execution of the target program (if the delta portion of the target program was present in RAM when the "run" command was given) or prior to execution of the target program (if the target program was entirely saved to the on-chip programmable non-volatile memory 22, using a "save" command, prior to execution). The code access (and merge) module (326) is also configured to store the merged delta and base portions of the target program in the on-chip programmable non-volatile memory 22 when an attribute (such as the size, in bytes of bytecode) of the delta portion of the target program exceeds a predetermined threshold (such as 2048 bytes).

Preferably, the pin controller (328), or pin configuring means, selectively configures at least one of the external I/O pins 25 of the microcontroller chip μC to be either an input pin or an output pin. Most preferably, the pin controller (328) selectively (and individually) configures plural (e.g., several or many of the) external I/O pins 25 of the microcontroller chip μC to be either input pins or output pins. For example, at least one I/O pin 25 of the microcontroller chip μC is selected to function an input pin or an output pin, and the selected I/O pin is designated to carry signals which are either analog, digital, or uart in type. It should be noted that not all of the I/O pins 25 on the microcontroller chip μC need be controlled or controllable by the pin controller 328, although such a configuration would also be permitted.

The trusted layer of StickOS further includes a variable access module (330), or pin variable defining means, preferably configured to define at least one pin variable for use in the target program. The pin variable is bound to one of the external I/O pins 25 of the microcontroller chip through one of the I/O registers 25a. The variable access module (330) is configured so that manipulation (e.g., by a user target program or in immediate mode) of one of the pin variables bound to one of the I/O pins 25 configured as an output pin will cause a state of the output pin to change correspondingly, and examination (e.g., by a user target program or in immediate mode) of one of the pin variables bound to one of the I/O pins 25 configured as an input pin will cause a state of the input pin to be detected accordingly. The variable access module (330) also preferably functions as a flash variable defining means which defines at least one flash variable, for use in the target program, which is stored in the on-chip programmable non-volatile memory 22 rather than in the on-chip RAM 23.

The StickOS operating system 300 further includes, in the preferred embodiment, upgrading means for self-upgrading the StickOS operating system on the CPUStick target board 20' or 20". By "self-upgrading" it is meant that once an "upgrade" command is received, the upgrade processing is performed entirely in the microcontroller chip µC itself, with only the aid of the user terminal 60 functionality (e.g., host terminal emulator and clipboard) and the serial connection 70 for supplying the upgraded operating system, or firmware, to the microcontroller chip µC, and without the additional need of any off-chip memory or off-chip processor control. The upgrading means includes a small upgrade control program UCP stored in the first portion of the programmable non-volatile memory 22. The small control program UCP is adapted to be copied to the on-chip RAM 23 of the microcontroller chip µC and to be executed therefrom upon receipt of the "upgrade" command by the command interpreter (306), in order to reprogram the first portion of the on-chip programmable non-volatile memory 22 with the new version of the StickOS operating system.

More particularly (and as will be more fully set forth in the Section entitled, "8. Upgrading"), when the StickOS command interpreter (306) receives an "upgrade" command from the user terminal 60 over the serial connection 70, StickOS responds by first erasing the second portion (e.g., 64-127 k) of the on-chip programmable non-volatile memory 22 (e.g., the portion where all the user program data is normally stored). Next, StickOS is configured to receive (over the serial connection 70) and store (in the just erased second portion of the on-chip programmable non-volatile memory 22) the new version of the operating system. Finally, StickOS copies the small upgrade control program UCP from the first portion of the on-chip programmable non-volatile memory 22 to the on-chip RAM 23 and causes the small upgrade control program UCP to execute from the on-chip RAM 23 and take control of the microcontroller functionality. Thereafter, the small upgrade control program UCP continues the upgrade process (from RAM) by erasing the original StickOS operating system from the first portion of the on-chip programmable non-volatile memory 22 and copying the new (upgraded) version of the operating system from the second portion of the on-chip programmable non-volatile memory 22 (back) to the first portion of the on-chip programmable non-volatile memory 22. After this, the second portion of the on-chip programmable non-volatile memory 22 is erased and the programmed system-on-a-chip CPUStick computer 20' or 20" is reset e.g., by the small upgrade control program UCP asserting bit 7 in the Reset Control Register of the MCF52221 microcontroller chip µC with the C statement: MCF_RCM_RCR=MCF_RCM_RCR_SOFTRST. It should be noted, however that the final steps of a) erasing the second portion of the on-chip programmable non-volatile memory 22 and b) resetting the CPUStick 20' or 20" need not be performed by the small upgrade control program UCP and need not be performed in any particular relative order. Rather, in a modification of the preferred embodiment, the step b) might be performed before the step a) by the user initiating a system reset of the CPUStick (e.g., via the RSTI* pin of the MCF52221 microcontroller with SW1 depressed to prevent autorun), after which step a) could be performed by the new (upgraded) version of StickOS either via an explicit user command (e.g., "new" or "purge") or via detecting that the second portion of the on-chip programmable non-volatile memory 22 contains data other than valid user program data.

5. Initial Code Load

The process of initially loading the StickOS operating system onto the CPUStick custom target board 20' of FIG. 4 or the CPUStick custom target board 20" of FIG. 6 is described below, in two steps.

Initially, StickOS is loaded onto the M52221DEMO demonstration board (Freescale Semiconductor M52221DEMO: MCF52221 Demonstration Board). After Stick OS is loaded onto the M52221DEMO demonstration board, it is then cloned from the M52221DEMO demonstration board to the CPUStick custom target board 20' of FIG. 4 or the CPUStick custom target board 20" of FIG. 6.

For information on the M52221DEMO demonstration board, see http://www.freescale.com/webapp/sps/site/prod_summary.jsp?code=M52221DEMO&nodeId=0162468rH-3YTLC00M98145. The demo board includes Freescale's CodeWarrior Development Tools (Freescale CodeWarrior Development Studio for ColdFire Architectures, Special Edition, Version 7.0). The M52221DEMO User Guide, doc-0396-010, Rev A, available from http://www.freescale.com/files/32bit/doc/user_guide/M52221DEMO_UG.doc?fpsp=1, is incorporated herein by reference in its entirety, as is the schematic for the M52221DEMO AXM-0396 board as published by Axiom Manufacturing, Drawing No. DOC-0396-030, rev. C, available at http://www.axman.com/files/M52221DEMO_SCH_C.pdf. The Quick Start Guide for the M52221DEMO board which shows all the default jumper locations, available at http://www.axman.com/files/M52221DEMO_QSG_1.1.doc, is also incorporated by reference in its entirety. (Note that the only change StickOS requires from the M52221DEMO board default jumper locations is the installation of the CLKO jumper, which grounds the MCF52221 CLKMOD0 pin, which in turn enables the internal 8 MHz relaxation oscillator on reset. The CPUStick of FIG. 4 and FIG. 6 also ground this pin. The DPPD, DMPD, and 5V_SEL jumpers should remain uninstalled (the default) since StickOS operates the MCF52221 USB port in "device mode".) Finally, when considering M52221DEMO board configurable jumper and cut-trace settings, please refer to the aforementioned M52221DEMO board schematic, and use the settings shown in CPUStick schematic of FIGS. 7A to 7D as a guide for how to set them.

To load StickOS onto the M52221DEMO demonstration board, install the CLK0 jumper on the demonstration board and follow the instructions (a) through (f) below (the instructions (b) through (f) of which are adapted from the CodeWarrior Development Tools' on-line help, which is herein incorporated by reference; see the section entitled "Flash Programmer" for additional information):

(a) Adhering to all applicable copyright law (see the copyright notice included at the beginning of this specification), copy the binary image file of the StickOS operating system named StickOSMCF52221v101elfS19.txt plain-text file as included in the computer program listing appendix submitted by EFS-web with this patent document and save the copyrighted StickOS binary image file, renaming it as an .S19 file with its original file name StickOS.MCF52221.v1.01.elf.S19.

(b) From the IDE main menu bar in CodeWarrior, select Tools>Flash Programmer The Flash Programmer window shown in FIG. 15 appears.

(c) If the Target Configuration panel is not visible, select it from the list at the left. The panel moves to the front of the Flash Programmer window.

(d) Verify Target Configuration settings (Default Project and Default Target), and load the appropriate settings for the MCF52221 with the Load Settings button (using the appropriate .XML file for the 52221 processor located in the Coldfire folder).

(e) Erase the destination Flash-memory sectors by selecting, from the pane list at the left of the Flash Programmer window, Erase/Blank Check. The Erase/Blank Check panel moves to the front of the window, as shown in FIG. 16. In the panel's list box, select all sectors by checking the All Sectors checkbox, and then click the Erase button—the Flash programmer erases the sectors.

(f) Flash the .S19 binary image file of the entire StickOS operating system by selecting Program/Verify from the pane list at the left of the Flash Programmer window so that the Program/Verify Flash panel of FIG. 17 appears. Click the Browse button to select the saved StickOS.S19 binary image file, and then click the Program button. The Flash programmer then programs the StickOS operating system into the target sectors of Flash memory. To start StickOS running on the M52221DEMO demonstration board after programming is complete, power off and then power on again the M52221DEMO demonstration board. LED4 will begin to blink slowly to show that StickOS is now running on the M52221DEMO demonstration board.

To clone StickOS from the M52221DEMO demonstration board to the CPUStick custom target board 20' of FIG. 4 or the CPUStick custom target board 20" of FIG. 6, follow the instructions (g) through (k) below.

(g) Cross connect the microcontroller chip I/O pins on the M52221DEMO demonstration board listed in the left-hand column of Table 4 (as the master) with the corresponding (as designated in the right-hand column of Table 4) microcontroller chip I/O pins on the CPUStick (as the slave), with a ribbon cable or other suitable wiring. Corresponding header pins on the demonstration board (e.g., J1 in the M52221DEMO User Guide) and the CPUStick (e.g., J3 in the CPUStick schematics) may be connected instead of the microcontroller pins themselves to facilitate the making of the microcontroller chip I/O pin cross-connections.

TABLE 4

Cloning Cable Pin Connections

| Master (e.g., M52221DEMO) Pin | Slave (e.g., CPUStick) Pin |
| --- | --- |
| QSPI_CLK (MCU Pin 14, J1 Pin 21) | QSPI_CLK (MCU Pin 14, J3 Pin 8) |
| QSPI_DIN (MCU Pin 12, J1 Pin 19) | QSPI_DOUT (MCU Pin 13, J3 Pin 7) |
| QSPI_DOUT (MCU Pin 13, J1 Pin 17) | QSPI_DIN (MCU Pin 12, J3 Pin 6) |
| QSPI_CS0 (MCU Pin 15, J1 Pin 23) | RCON* (MCU Pin 16, J3 Pin 10) |
| SCL (MCU Pin 8, J1 Pin 26) | RSTI* (MCU Pin 59, J3 Pin 3) |
| VSS (e.g., MCU Pin 11, J1 Pin 3) | VSS (e.g., MCU Pin 11, J3 Pin 1) |
| VDD (e.g., MCU Pin 10, J1 Pin 1) | VDD (e.g., MCU Pin 10, J3 Pin 2) |

(h) Connect the mini-AB USB port on the M52221DEMO demonstration board to a USB port on a computer system that supports an FTDI Serial port (e.g., a personal computer running Windows XP).

(i) On Windows XP computer systems connected to the Internet, the appropriate FTDI VCP driver will be automatically installed. Otherwise, a suitable driver can be downloaded from http://www.ftdichip.com/Drivers/VCP.htm and installed manually. Once the driver is loaded, a new virtual COM port will be present on the computer system (e.g., a new COM port will be visible under "Ports" in the Device Manager).

(j) On Windows XP computer systems, use the Hyper Terminal program (or equivalent software) to connect to the new virtual COM port (specifying a connection name and the newly created COM port number, e.g., COM3); the baud rate and the data characteristics in Port Settings are ignored. Press <Enter> and the StickOS command prompt appears, as shown in FIG. 18.

(k) At the command prompt, type "clone" (without quotes), or "clone run" e.g., if the CPUStick is being used with its optional battery BAT1. After a few moments, the StickOS operating system running on the M52221DEMO demonstration board will respond with an indication that the cloning process is done. When the cloning process has been completed, disconnect the CPUStick from the M52221DEMO demonstration board. This ends the initial program load process, and the CPUStick is now ready to be used.

6. Running StickOS on CPUStick

In order to use the CPUStick to write, debug, and run software and to execute StickOS commands, it is merely necessary to run StickOS and connect the CPUStick to a user terminal 60. StickOS will run immediately whenever the CPUStick is reset (e.g., during initial power-up e.g., as when being connected to a USB port on a host computer, or when awakened from sleep if the autoreset mode is on). The CPUStick can also be reset with the "reset" command. Similarly, if the "clone run" command was used in step (k), the CPUStick was automatically reset and StickOS was immediately run on the CPUStick when the cloning process was finished.

To connect the CPUStick to a user terminal 60, it is merely necessary to follow the instructions (l) through (n) below:

(l) Connect the USB port on the CPUStick to a USB port on a computer system that supports an FTDI Serial port, (e.g., a personal computer running Windows XP).

(m) On Windows XP computer systems connected to the Internet, the appropriate FTDI VCP driver will be automatically installed. Otherwise, a suitable driver can be downloaded from http://www.ftdichip.com/Drivers/VCP.htm and installed manually. Once the driver is loaded, a new virtual COM port will be present on the computer system (e.g., a new COM port will be visible under "Ports" in the Device Manager).

(n) On Windows XP computer systems, use the Hyper Terminal program (or equivalent software) to connect to the new virtual COM port (specifying a connection name and the newly created COM port); the baud rate and the data characteristics in Port Settings are ignored. Press <Enter> and the StickOS command prompt appears, as shown in FIG. 18. Programs can now be entered, debugged, and run (and StickOS commands can now be executed) on the CPUStick. Note: if the USB connection is lost during a HyperTerminal session (such as when the CPUStick is unplugged and re-plugged from the USB cable), press the "Disconnect" button in the Hyper Terminal window followed by the "Call" button to reconnect Hyper Terminal.

When the StickOS in the CPUStick is running, LED e1 (connected to digital output pin irq7* of the MCF52221 microcontroller chip) will blink slowly; when the user's BASIC program in the CPUStick is running, LED e1 will blink quickly. LED e2 is under BASIC program control, being connected to digital output pin irq4* of the MCF52221 microcontroller chip.

When the sleep switch sw1 connected to pin irq1* of the MCF52221 microcontroller chip is depressed (closed), the IRQ1* pin of the MCF52221 microcontroller chip is connected to ground, and the CPUStick enters a low-power sleep mode with (most of) the external pins on the micro-controller chip being tri-stated (e.g., to the extent possible) until the sleep switch is depressed again. Holding switch "sw1" depressed during power-on prevents the StickOS from auto-running the BASIC program, even if the autorun mode is set to "on". If autoreset mode is set in StickOS, the CPUStick automatically resets itself when it is awakened from a sleep (as opposed to continuing running the current saved BASIC program from where it left off).

7. Cloning

In the fields of embedded systems, programming education, and data acquisition and control, it will often be desirable to clone the software of one programmed CPUStick to another unprogrammed one (or to one to be overwritten/updated), for multiplied function and distribution. As in the case where it was desired to clone StickOS from the programmed M52221DEMO demonstration board to the initial CPUStick, the cloning process is simple and straight forward as a result of StickOS's built-in clone function.

To clone all the programs (including any user programs) of one CPUStick programmed with StickOS to another CPUStick, cross connect the microcontroller chip I/O pins on the programmed CPUStick listed in Table 5 (as the master) with the corresponding designated microcontroller chip I/O pins on the other CPUStick (as the slave) with a ribbon cable or other suitable wiring. Corresponding header pins on the programmed CPUStick (e.g., J3 in the CPUStick schematics) and the other CPUStick may be connected instead of the microcontroller pins themselves to facilitate the making of the microcontroller chip I/O pin cross-connections. After the CPUSticks have been thus connected to each other, run StickOS on the pre-programmed CPUStick, and, from a user terminal 60 connected to the USB port of the pre-programmed CPUStick, execute the "clone" command (or the "clone run" command) as in paragraph (k) above.

TABLE 5

| Cloning Cable Pin Connections | |
| --- | --- |
| Master (e.g., CPUStick) Pin | Slave (e.g., CPUStick) Pin |
| QSPI_CLK (MCU Pin 14, J3 Pin 8) | QSPI_CLK (MCU Pin 14, J3 Pin 8) |
| QSPI_DIN (MCU Pin 12, J3 Pin 6) | QSPI_DOUT (MCU Pin 13, J3 Pin 7) |
| QSPI_DOUT (MCU Pin 13, J3 Pin 7) | QSPI_DIN (MCU Pin 12, J3 Pin 6) |
| QSPI_CS0 (MCU Pin 15, J3 Pin 9) | RCON* (MCU Pin 16, J3 Pin 10) |
| SCL (MCU Pin 8, J3 Pin 4) | RSTI* (MCU Pin 59, J3 Pin 3) |

TABLE 5-continued

| Cloning Cable Pin Connections | |
| --- | --- |
| Master (e.g., CPUStick) Pin | Slave (e.g., CPUStick) Pin |
| VSS (e.g., MCU Pin 11, J3 Pin 1) | VSS (e.g., MCU Pin 11, J3 Pin 1) |
| VDD (e.g., MCU Pin 10, J3 Pin 2) | VDD (e.g., MCU Pin 10, J3 Pin 2) |

8. Upgrading

A CPUStick's StickOS operating system/firmware (e.g., the BASIC development environment itself) can be upgraded to a new version of StickOS from a user terminal or terminal emulator (e.g., Hyper Terminal on a host computer) with the following command.
>upgrade Upon receipt of an "upgrade" command, StickOS responds with the prompt:
paste S19 upgrade file now . . . .

Next, the .S19 file having the upgraded version StickOS should be copied to the host computer's clipboard and then pasted into the Hyper Terminal window. StickOS will respond with an expanding series of dots. When upgrade is nearly complete (about two minutes), StickOS will display:
paste done!
programming flash . . . .
wait for CPUStick LED e1 to blink!

When the CPUStick LED e1 begins to blink, flash programming is complete. The CPUStick can then be disconnected from the Hyper Terminal (e.g., by disconnecting the USB cable). Note that once flash programming begins, a failed (or interrupted) upgrade procedure can only be recovered via a re-clone from a working CPUStick. Note too that the upgrade procedure wipes out all BASIC programs and parameters from flash memory.

The upgrading procedure employed by StickOS functions as follows. Initially the on-chip flash memory 22 (128 kB) is laid out as follows:
First portion: 0-63 k=StickOS (e.g., trusted layer)
Second portion: 64-127 k=stored user programs, flash parameters, etc.

When the user types "upgrade", the second portion of the flash memory 22 (64-127 k), including all user programs, is erased. StickOS then displays the message:
paste S19 upgrade file now . . . .

When the user pastes the .S19 file, it is then downloaded (as object code through the serial connection 70) into the second portion of the flash memory 22 of the microcontroller chip µC. When the paste is finished, the flash memory 22 looks like:
0-63 k=StickOS (running)
64-127 k=StickOS upgrade (not running, just stored)

At this point, StickOS displays the message:
paste done!
programming flash . . . .
wait for CPUStick LED e1 to blink!

This now starts the only critical period of the upgrade process. If power is lost during the next few seconds, the CPUStick can become unbootable, and would have to be recovered by being re-cloned from another CPUStick. During this critical period, a small control program (or upgrade control program UCP; see FIG. 14) is copied from the first portion of the flash memory 22 to the microcontroller's on-chip RAM 23 and executes from the microcontroller's on-chip RAM 23. (By "small", it is meant that the program is small enough to reside in and execute from the on-chip RAM 23. Ordinarily, StickOS executes from the flash memory 22, and in fact, from the first portion of the flash memory, e.g., 0-63 k. Additionally, in this context, the words "control program" are intended to signify "control routine" or "control function" as well as "control program", with the small upgrade control program copied by StickOS actually being a C function that is called flash_upgrade_begin( ).) The small (RAM) control program is responsible for first erasing the first portion of the flash memory 22. It then copies the contents of the second portion of the flash memory (64 k-127 k) back to the first portion of the flash memory (0-63 k), and then erases the second portion of the flash memory 22. Once that is done (e.g., 2-3 seconds), the program resets the CPUStick and the CPUStick starts running the StickOS upgrade, and the LED e1 starts to blink.

While in the preferred embodiment, the word "upgrade" is used at the command line to invoke the upgrade functionality, it will be understood that the "upgrade" command (i.e., that command which invokes the upgrade functionality) could employ any other word, abbreviation, or mnemonic (i.e., in place of the word "upgrade") to signify to the command interpreter 306 that the "upgrade" functionality should be invoked.

The flash upgrading for StickOS uses five functions which are referenced by basic.c when the upgrade command is issued (flash_upgrade( ), flash_upgrade_begin(void), flash_upgrade_end(void), gethex(char p), and get2hex (char p)). The specific upgrade algorithms are implemented, for example, in the file flash.c included in the sourcesv101.txt file in the computer program listing appendix.

9. Usage Examples

One example of using programmed CPUStick is shown in FIG. 19. In this example, it is desired to control the temperature profile of a toaster oven 80 as a function of time to facilitate reflow soldering in the toaster oven. The steps of using the programmed CPUStick are as follows:

1. Wire the external I/O pins of the CPUStick 20" to the embedded circuit:
   (a) wire CPUStick pin an0 to the output of an op-amp (LM358) 82 connected to a thermocouple 84 (e.g., a Type K thermocouple, to be read through the 100× op-amp, with the A/D integer values at pin an0 representing increments of ⅒th millivolts; see http://srdata.nist.gov/its90/type_k/0to300.html), and
   (b) wire CPUStick pin an1 to the input of a solid-state relay control (Teledyne STH24D25) 86 connected to an a.c. power source 88;
2. Connect a host computer (e.g., a personal computer running Windows XP) to the USB interface on the CPUStick 20";
3. Let the host computer automatically install the FTDI Serial Port transport drivers;
4. Open a Hyper Terminal console window and connect to the CPUStick, specifying the new COM port; press <Enter> for a command prompt;
5. Configure the CPUStick external I/O pins an0 and an1 as appropriate. (This is accomplished by lines 20 and 30 in the control program. See the MCF52223 ColdFire Integrated Microcontroller Reference Manual, Rev.3, incorporated by reference herein in its entirety, for additional information. Note that the MCF52223 ColdFire Integrated Microcontroller Reference Manual also supports the MCF52221 microcontroller.) Specifically:
   (a) configure pin an0 as an analog input, and
   (b) configure pin an1 as a digital output;
6. Write and debug a BASIC control program, live on the CPUStick (see FIG. 20);
7. Type "save";
8. Type "autorun on";
9. Type "autoreset on";
10. Turn the toaster oven full on (so that the solid-state relay can control it);
11. Type "reset"; and
12. Disconnect the host computer from the USB interface on the CPUStick. Once the CPUStick is disconnected from the USB host computer, it may be run stand-alone from external power or the optional bottom-side CR-2 battery holder.

The BASIC control program shown in FIG. 20 is reproduced for convenience below:

```
10 dim target, secs
20 dim thermocouple as pin an0 for analog input
30 dim relay as pin an1 for digital output
40 data 5124, 90, 7460, 105, 8940, 20, -1, -1
50 configure timer 0 for 1000 ms
60 on timer 0 gosub adjust
70 while target!=-1 do
80 sleep secs*1000
90 read target, secs
100 endwhile
110 let relay=0
120 end
130 sub adjust
140 if thermocouple>=target then
150 let relay=0
160 else
170 let relay=1
180 endif
190 endsub
```

Line 10 of the program declares two simple RAM variables for use in the program. Line 20 of the program declares an analog input "pin variable" bound to pin an0, to read the thermocouple 84; line 30 of the program declares a digital output "pin variable" bound to pin an1, to control the solid state relay 86. It will thus be apparent from program lines 20 and 30 that a single program statement is used for each selected I/O pin 25 (an0, an1) on the microcontroller chip μC, to declare the pin variable (thermocouple, relay), to configure the selected function (input/output) and designate the signal type (analog/digital/uart) of the I/O pin, and to bind the pin variable to the I/O pin through at least one of the microcontroller chip I/O registers. Line 40 uses a "data" statement to declare a read-only data list which defines the temperature target and delay time pairs for the temperature profile ramp. Lines 50 and 60 configure a timer interrupt to call the "adjust" subroutine (as the interrupt handler) asynchronously, every second, while the program runs. Lines 70 through 100 set the "target" temperature profile while the program runs. (The "read" statement in line 90 consumes two pieces of read-only data from the list declared in line 40 each time the statement is executed.) Lines 110 and 120 end the program with the solid state relay control 86 turned off. Lines 130 through 190 use the declared pin variables to simply turn the solid state relay control off (by manipulating the pin variable "relay" bound to pin an1 configured as an output pin) if it is determined (by examining the pin variable "thermocouple" bound to pin an0 configured as an input pin) that the target temperature has been achieved, or leave it on otherwise. Note that if terse code were the goal, lines 60 and 130 through 190 could have all been replaced with the single statement:
>60 on timer 0 let relay=thermocouple<target Typing "save" saves the program to non-volatile flash memory, "autorun on" sets the program to run automatically when the CPUStick is powered up, and "autoreset on" sets the CPUStick to automatically reset itself when it is awakened from a sleep (as opposed to continuing running the saved BASIC program from where it left off). Finally, "reset" resets the CPUStick as if it was just powered up.

The program is now run and the toaster oven is used e.g., to reflow solder the components of additional CPUStick target boards. The target program of FIG. 19 running on the CPUStick 20" causes the toaster oven temperature to controlled to 125° C. for 90 seconds (5.124 mV thermocouple output×100 op-amp gain=0.5124 V≈5124 from pin an0 and from read-only data in line 40), followed by an increase to 183° C. for 105 seconds, and followed lastly by an increase to 220° C. for 20 seconds.

In a second example of using the programmed CPUStick, the following BASIC program is used to generate a 1 Hz square wave on the "dtin0" pin of the MCF52221 microcontroller chip:
>10 dim square as pin dtin0 for digital output
>20 while 1 do
>30 let square=!square
>40 sleep 500
>50 endwhile
>run
<Ctrl-C>
STOP at line 40!
>
(Pressing <Ctrl-C> Stops the Program.)

Line 10 configures the "dtin0" pin for digital output, and creates a variable named "square" whose updates are reflected at that pin. Line 20 starts an infinite loop (typically CPUStick programs continue to run indefinitely). Line 30 inverts the state of the dtin0 pin from its previous state—note that you can examine as well as manipulate the (digital or analog) output pins. Line 40 just delays the program execution for one half second. And finally line 50 ends the infinite loop.

To run the program in a slightly more demonstrative way, the command "trace on" can be used to enable execution tracing which will show every variable update, as it occurs, on the user terminal 60:
>trace on
>run
30 let square=1
30 let square=0
30 let square=1
30 let square=0
<Ctrl-C>
STOP at line 40!
>

Note that almost all StickOS commands that can be run in a program can also be run in "immediate mode", at the command prompt (without entering a line number). For example, after having run the above program, the "square" variable (and the dtin0 pin) remain configured, so the following immediate mode commands can be entered:
>print "square is now", square
square is now 0
>let square=!square
>print "square is now", square
square is now 1
>

This demonstrates how variables (and pins) can be examined or manipulated at the command prompt during program debug.

In a third example, the programmed CPUStick can perform serial UART I/O. The following BASIC program configures a UART for loopback mode, transmits two characters and then asserts it receives them correctly:
>new
>10 configure uart 0 for 9600 baud 7 data even parity loopback
>20 dim tx as pin utxd0 for uart output
>30 dim rx as pin urxd0 for uart input
>40 let tx=48
>50 let tx=49
>60 while tx do
>70 endwhile
>80 assert rx==48
>90 assert rx==49
>100 assert rx==0
>110 print "ok!"
>run
   40 let tx=48
   50 let tx=49
ok!
>
(Note that tracing is still enabled from the previous example.) Line 10 configures UART 0 for 9600 baud loopback operation. Lines 20 and 30 configure the "utxd0" and "urxd0" pins for UART output and input, and creates two variable named "tx" and "rx" bound to those pins. Line 40 transmits a character ('0', ascii 48) out the UART and line 50 transmits another ('1', ascii 49). Line 60 waits until all characters are transmitted (when "tx" reads back 0). Line 80 and 90 then receive two characters from the UART and assert they are what was transmitted. Line 100 then asserts there are no more characters received ("rx" reads back 0).

The UART can also be controlled using interrupts rather than polling. The following program shows this:
>trace off
>10 configure uart 0 for 9600 baud 7 data even parity loopback
>20 dim tx as pin utxd0 for uart output
>30 dim rx as pin urxd0 for uart input
>40 on uart 0 input go sub receive
>50 let tx=48
>60 let tx=49
>70 sleep 1000
>80 end
>90 sub receive
>100 print "received", rx
>110 endsub
>run
received 48
received 49
>

In a fourth example, the CPUStick can also be permanently connected to the USB host computer and used as a slave data acquisition/control device, all under USB host computer software control. To do this, the USB host computer software program would simply open the CPUStick virtual COM port and then write StickOS commands and/or statements to the COM port, and then read the results from the COM port. Consider, for this example, a weather station where it is desired to record data every minute, and report an hourly average. A target program could be run on the CPUStick as follows:

```
10 dim windspeed as pin an0 for analog input
20 dim i, sum
30 while 1 do
35 let sum=0
40 for i=1 to 60
50 let sum=sum+windspeed
60 sleep 60000
70 next
80 print "hourly windspeed average is", sum/60
90 endwhile
```

The host computer could command the program to be run on the CPUStick and then just read the output of the virtual COM port. A line would arrive every hour (satisfying the read API) and the average weather condition could then be stored or utilized.

Often it is useful to disable terminal echo and prompts when running in slave mode. To set the terminal echo and prompt modes, use the commands:

echo (on|off)
prompt (on|off)

To display the terminal echo and prompt modes, use the commands:

echo
prompt

In a fifth example, a program is being written on a CPUStick as shown in FIG. 21 to show the line-by-line error checking and compiling functionality of the bytecode compiler 308 which aids the user in eliminating syntax errors from a program as it is being written. The demonstrative program intended to be written is as follows:

```
10 dim i
20 for i=1 to 2*3
30 print i, i*2
40 next
```

Initially, the user enters (at line 10) a "dim" statement without a variable, which is not a valid program statement. The initially entered line is immediately rejected by StickOS, and an "error" message is reported to the user, together with an indication of the position of the error in the line (i.e., indicated by the hat symbol, "^", just below and to the right of the word "dim"). The user then correctly enters line 10, and the line is automatically (and individually) compiled by the bytecode compiler 308, and stored in the on-chip RAM 23. Next, the user enters an incorrectly spelled "for" statement of a for-next loop in line 20. Again, the user line is immediately rejected, together with an indication of the error position of the misspelled word. The user then re-enters line 20, but the correctly spelled for statement contains an invalid expression (i.e., "2*"). Since all expressions are compiled immediately upon being entered by the user, this causes a compilation error which is reported to the user, with the hat symbol again showing the error position. Line 20 is subsequently correctly entered, at which time it is immediately compiled and stored in the on-chip RAM 23. Then, the user enters an incorrect print statement (omitting the comma between the expressions). Again, the user line is immediately rejected by StickOS and subsequently corrected by the user, after which it is immediately compiled and stored. When line 40 is entered by the user, no mistakes are made, so that line is immediately compiled and stored. The user subsequently types "run", and the already-compiled program lines are immediately run from RAM, as shown in FIG. 21.

10. Building StickOS from Source Code

StickOS can be built from source code (e.g., as included in the sourcesv101.txt file included in the program listing appendix submitted with this patent document) following the steps 1 through 7 listed below. File boundaries in the sourcesv101.txt file are indicated with a line of asterisks and the file name for the lines that follow. Each named file in sourcesv101.txt should be stored as plain text so as to include the lines up to the next file boundary.

1. Install "Freescale CodeWarrior Development Studio for ColdFire Architectures, Special Edition, Version 7.0";
2. Create a new MCF52221 C project;
3. Select the INTERNAL_FLASH target;
4. Replace the project source (.c), include (.h header), and linker command (.lcf) files (including Startup Code) with the corresponding StickOS files in the sourcesv101.txt file of the computer program listing appendix,
   a. N.B. file boundaries in the sourcesv101.txt file are indicated with a line of asterisks and the file name for the lines that follow,
   b. N.B. "modules:" comments in the source files indicate the location of logical modules described in FIG. 9,
   c. N.B. preserve the project's 22 standard MCF52221 MCU "Coldfire C Header File" headers in the "headers" directory;
5. Replace the project libraries with direct references to the 4 MSL source files: ctype.c, mem.c, mem_funcs.c, and string.c;
6. Modify the project settings:
   a. in Language Settings→C/C++ Warnings, disable "Implicit Arithmetic Conversions" warnings,
   b. if desired, in Code Generation→ColdFire Processor, select "Register" Parameter Passing,
   c. if desired, in Code Generation→ColdFire Processor, select Use .sdata/.sbss for All data smaller than 1023 bytes,
   d. if desired, in Code Generation→Global Optimizations, select Optimize For: Faster Execution Speed,
   e. if desired, in Code Generation→Global Optimizations, select Level 4 Optimizations,
   f. in Linker→ColdFire Linker, set Entry Point to: _startup,
   g. in Linker→ColdFire Linker, set Force Active Symbols to: _vect, _cfm; and
7. Press the Make button, to generate a new .S19 file with the StickOS object code (and checksums for distribution).

11. Other Modifications

Those skilled in the art will realize that many modifications can be made to the preferred embodiments described above. For example, other microcontroller chips besides the Freescale MCF52221 Coldfire® Integrated Microcontroller can be employed in the CPUStick. To port StickOS for use with other microcontrollers (such as the NXP LPC2141/42/44/46/48), it is only necessary to adapt and rewrite the MCF52221-specific portions of the StickOS source code, including e.g., the processor initialization (and/or resetting), the USB interface (or, alternately, serial port), the built-in timer and uart control, and the pin interfaces. Any person skilled in the art working with another microcontroller would necessarily be required to achieve (and be capable of achieving) an understanding of e.g., the processor initialization (and/or resetting), the communications interface, the built-in peripheral control, and the pin interfaces for that microcontroller, and following the techniques and teachings described herein and in the computer program listing appendix submitted with this patent document be capable of adapting the StickOS source code for use with that other microcontroller and, from such, building a compatible version of StickOS for use with that other microcontroller. (Note that microcontrollers other than Freescale microcontrollers may not be supplied with CodeWarrior Development Studio, and they may not employ the .S19 file format for loading the object code into the microcontroller; they will, however use similar development software and similar object code file formats, which any person skilled in the art will be capable of using in accordance with the techniques and teachings set forth herein.)

The StickOS command-line user interface could have a security mechanism so that unauthorized users are unable to access the development environment and/or target program source code. The user would set a password in flash memory via a StickOS command, and from then on, the user would be prompted for the password when subsequently connecting to StickOS, before being allowed to enter further commands Rather than using a USB port on the target board, a serial port could be utilized: this would increase the configuration burden on the user, but would allow StickOS to run on non-USB capable microcontrollers. The FTDI/USB transport could be replaced with a serial UART transport; this would be the simplest transport that is supported by almost every MCU. If a host computer did not have a serial UART transport built in, an add-on USB device could supply the functionality. This would slightly increase the configuration burden on the user, but would allow StickOS to run on non-USB capable MCUs. The serial UART transport driver for StickOS would replace the existing FTDI Transport and USB device driver, and would provide a bidirectional transport equivalent to that of the FTDI bulk in/bulk out endpoints. The ftdi_send( ) routine would be changed to send to the serial UART transport, and the serial UART transport driver would call the ftdi.c ctrlc_cbfn( ), command_cbfn( ), and accumulate( ) functions when it received a character from the user, following the existing model in ftdi_bulk_transfer( ). Note that the CodeWarrior sample projects include a sample serial UART transport driver for most Freescale MCUs.

Rather than using a USB port on the target board, a wireless interface could be utilized, and relaying (remote logging in) from one StickOS to another could therefore be enabled and permitted. The FTDI/USB transport could be replaced with a wireless transport, to allow the user to interact with the CPUStick (or even a mesh of CPUSticks) wirelessly. The serial port driver for StickOS would replace the existing FTDI Transport and USB device driver as described above, with the wireless driver replacing the serial port driver.

The user interface could be optionally enhanced on the host computer (such as with a graphical user interface layered entirely on top of the StickOS command-line interface) with no change in actual edit, compile, flash, and debug functionality resident in the target microcontroller. The user interface would be a program running on the host computer that interacted graphically with the user on one side and interacted with the StickOS command-line user interface via the host computer's virtual COM port connected to the CPUStick on the other side.

Rather than compiling to intermediate code run by a byte-code interpreter, the StickOS compiler could compile to native code and use processor privilege levels or compilation restrictions to provide the necessary virtualization/safety/trusted layer—this increases performance at the potential cost of code density. Rather than compiling BASIC, the compiler could compile C or Java or any other programming language, and means other than entering statements without line numbers could be used to indicate that a particular statement should be executed in immediate mode.

Additional microcontroller functionality and peripherals could be controlled by StickOS, with suitable extensions to the programming language exposed to the user, such as: access to PWM and frequency generation peripherals, additional serial peripherals (SPI, I2C, etc.), access to USB or LAN functionality (independent of the resident transport functionality used for communication with the host computer), etc.

"Nested interrupts" at the application level could be supported, i.e., higher priority BASIC interrupts delivered in the middle of servicing a lower priority BASIC interrupt, rather than waiting for the lower priority interrupt to complete. This would involve keeping a stack of interrupt scopes, rather than a single one, in run.c.

StickOS could be enhanced to support (text) string variables, as well byte and integer variables. The maximum length of a string, just like an array, could be declared in the "dim" statement, and the space for the variable could be allocated (from RAM or flash) at that time. String variable assignments could allow the use of string operators (concatenation, substring, etc.) rather than arithmetic operators, and string variables could be printed with print statements. This could make it easier for the BASIC target program to interface with, for example, a user through a UART.

The microcontroller vendor could pre-load StickOS into on-chip flash at chip manufacturing and test time; subsequent reflow temperature profiles are not detrimental to the flash memory contents.

The StickOS command prompt could be changed (e.g., to "!>") to indicate that there are unsaved changes contained in the "delta program" in RAM, in order to remind the user that a "save" command is necessary to prevent those changes from being lost in the event of an MCU reset or power failure. Alternatively, StickOS could perform an autosave at the time of issuing the next command prompt (when the BASIC program is necessarily not running) if a predetermined amount of time has elapsed with unsaved changes since the last save.

Whereas simple digital input or output pin variables in StickOS are bound to exactly one microcontroller pin, and have a resulting value of 0 or 1, aggregate digital input or output pin variables could be bound to multiple microcontroller pins concurrently, with individual bits in the pin variable binary value bound to individual microcontroller pins, resulting in a value of 0 (for all pins at a logic 0 level) to $2^n-1$ (for all pins at a logic 1 level, aggregated over n pins). This would allow the target program to read or write multiple digital input or output pins concurrently with a single variable reference or variable assignment.

BASIC subroutines could be called with parameter lists, and could return result values, such as is standard practice in most programming languages. Caller parameters could be passed either by-value or by-reference, and could then be referenced within the subroutine using a local variable name. Return result values could be passed either through by-reference parameters, or through an explicit by-value return value.

Therefore, the present invention will encompass not only the preferred embodiments described above, but also any modifications thereof and other embodiments which will fall within the scope of the appended claims.

12. Reference to User's Guide

Further details regarding CPUStick and StickOS are provided in The CPUStick™ and StickOS™ User's Guide, version 1.01, which is incorporated by reference herein in its entirety. A copy of this User's Guide, as being published by the inventor on the filing date of this application at http://www.cpustick.com/downloads/cpustick.2p.pdf, is being submitted to the U.S. Patent and Trademark Office with this patent application.

I claim:

1. A programmed system-on-a-chip computer for embedded systems comprising:
   a) a microcontroller chip having:
      i) at least one on-chip CPU core,
      ii) on-chip memory including an on-chip programmable non-volatile memory and an on-chip RAM,
      iii) an on-chip communications interface adapted to be connected to a user terminal and configured to receive and transmit source code symbolic information,
      iv) I/O pins adapted to interface between the microcontroller chip and a system in which the microcontroller chip is to be embedded, and
      v) I/O registers connected to the I/O pins for reading current pin states and storing output pin data; and
   b) an operating system including a trusted layer which is wholly programmed into the on-chip programmable non-volatile memory and which is configured to run on the CPU core, the trusted layer including:
      A) a compiler configured to compile the source code symbolic information input by a user through the user terminal into a target program to be stored in the on-chip memory;
      B) a non-volatile memory controller configured to save the target program to the on-chip programmable non-volatile memory; and
      C) an interrupt service module including:
         I) an on-chip event detector which is configured to detect an asynchronous on-chip event specified in the target program during execution of the target program; and
         II) trampoline code which is configured to invoke, in response to the event detected by the on-chip event detector, an application-level interrupt handler which handles an interrupt specified for the event by executing a specific portion of the target program;
      wherein the trusted layer is configured to run the target program in an application layer, wherein the compiler is configured to initially compile the source code symbolic information input by the user to a delta portion of the target program which is stored in the on-chip RAM, and wherein the trusted layer further includes:
      D) a code access module which is configured to merge the delta portion of the target program stored in the on-chip RAM with a base portion of the target program stored in the on-chip programmable non-volatile memory;
      E) a pin controller for selectively configuring at least one of the I/O pins of the microcontroller chip, wherein each I/O pin configured by the pin controller is configured as one of an input pin and an output pin; and
      F) a variable access module configured to define at least one pin variable, wherein each pin variable defined by the variable access module is bound to one of the I/O pins configured by the pin controller through one of the I/O registers, wherein the variable access module is configured in such a manner that manipulation of each pin variable bound to one of the I/O pins configured as an output pin by the pin controller will cause a state of the output pin to change correspondingly, and examination of each pin variable bound to one of the I/O pins configured as an input pin by the pin controller will cause a state of the input pin to be detected.

2. The programmed computer as recited in claim 1, wherein the microcontroller chip further includes a timer, and the on-chip event is an expiration of the timer.

3. The programmed computer as recited in claim 1, wherein the microcontroller chip further includes a UART with transmit and receive buffers, and the on-chip event is a transition in the presence of data in one of the transmit and receive buffers.

4. The programmed computer as recited in claim 1, wherein the interrupt service module is configured to selectively mask the interrupt for later servicing.

5. The programmed computer as recited in claim 1, wherein the compiler is configured to individually compile, on a line-by-line basis, program lines of the source code symbolic information input by the user through the user terminal into the target program.

6. The programmed computer as recited in claim 1, wherein the code access module is additionally configured to merge the delta portion of the target program stored in the on-chip RAM with the base portion of the target program stored in the on-chip programmable non-volatile memory prior to execution of the target program.

7. The programmed computer as recited in claim 1, wherein the target program comprises a plurality of compiled bytecode program statements, and wherein the trusted layer further includes:
   G) a bytecode execution engine configured to a) execute the compiled bytecode program statements as part of the target program and b) execute an individual compiled bytecode program statement immediately, apart from any target program.

8. The programmed computer as recited in claim 1, wherein the trusted layer further includes:
   G) a variable access module configured to define at least one flash variable, for use in the target program, which is stored in the on-chip programmable non-volatile memory rather than in the on-chip RAM.

9. The programmed computer as recited in claim 1, wherein the trusted layer further includes:
   G) a command interpreter configured to receive an "upgrade" command; and
   H) a small upgrade control program which is adapted to be copied to the on-chip RAM of the microcontroller chip and executed therefrom upon receipt of the "upgrade" command by the command interpreter, in order to reprogram the on-chip programmable non-volatile memory with a new version of the operating system.

10. The programmed computer as recited in claim 1, wherein the trusted layer further includes:
    G) a text editor configured to permit the user to enter and manipulate lines of source code symbolic information.

11. A programmed system-on-a-chip computer for embedded systems comprising:
    a) a microcontroller chip having:
       i) at least one on-chip CPU core,
       ii) on-chip memory including an on-chip programmable non-volatile memory and an on-chip RAM,
       iii) an on-chip serial communications interface adapted to be connected to a user terminal and configured to bidirectionally receive and transmit source code symbolic information, and in particular, to receive program lines of source code symbolic information input by a user through the user terminal, wherein the source code symbolic information which the on-chip serial communications interface is configured to receive and transmit includes source code lines, variable names, and variable contents, and iv) I/O pins adapted to interface between the microcontroller chip and a system in which the microcontroller chip is to be embedded; and
b) an operating system including a trusted layer which is wholly programmed into the on-chip programmable non-volatile memory and which is configured to run on the CPU core without need of external memory, the trusted layer including:
  A) a compiler configured to automatically and individually compile, on a line-by-line basis, the program lines of source code symbolic information input by the user through the user terminal into a target program,
    I) wherein the compiler is configured to error-check and compile each individual program line of source code symbolic information input by the user in which a valid program statement is found, and to perform such compilation immediately, as each such program line is entered by the user, without any compile command being issued by the user, and
    II) wherein the compiler is further configured to immediately report an error to the user via the on-chip communications interface when the user enters a program line of source code symbolic information that is found not to comprise a valid program statement;
  B) a non-volatile memory controller configured to save the target program to the on-chip programmable non-volatile memory; and
  C) an interactive debugger operatively configured to enable interactive debugging of the target program and capable of altering program execution of the target program by at least one of I) continuing execution of the target program from a line different than where execution of the target program left off, II) continuing execution of the target program after the target program is modified, and III) continuing execution of the target program after data that is tested conditionally during program execution is altered; and
    wherein the trusted layer is configured to run the target program in an application layer.

12. The programmed computer as recited in claim 11, wherein CPU states are exposed to the trusted layer of the operating system, and the interactive debugger is configured to map the source code symbolic information to the CPU states.

13. The programmed computer as recited in claim 11, wherein the interactive debugger is configured to provide insertable breakpoints in the target program, to provide single-stepping operation of the target program, and to provide execution tracing of the target program.

14. The programmed computer as recited in claim 11, wherein the interactive debugger is configured to alter program execution by all of I) continuing execution of the target program from a line different than where execution of the target program left off, II) continuing execution of the target program after the target program is modified, and III) continuing execution of the target program after data that is tested conditionally during program execution is altered.

15. The programmed computer as recited in claim 11, wherein the microcontroller chip further includes:
  v) I/O registers connected to the I/O pins for reading current pin states and storing output pin data;
and wherein the trusted layer further includes:
  D) a pin controller for selectively configuring at least one of the I/O pins of the microcontroller chip, wherein each I/O pin configured by the pin controller is configured as one of an input pin and an output pin; and
  E) a variable access module configured to define at least one pin variable, wherein each pin variable defined by the variable access module is bound to one of the I/O pins configured by the pin controller through one of the I/O registers, wherein the variable access module is configured in such a manner that manipulation of each pin variable bound to one of the I/O pins configured as an output pin by the pin controller will cause a state of the output pin to change correspondingly, and examination of each pin variable bound to one of the I/O pins configured as an input pin by the pin controller will cause a state of the input pin to be detected.

16. The programmed computer as recited in claim 11, wherein the trusted layer further includes:
  D) a variable access module configured to define at least one flash variable, for use in the target program, which is stored in the on-chip programmable non-volatile memory rather than in the on-chip RAM.

17. The programmed computer as recited in claim 11, wherein the target program comprises a plurality of compiled bytecode program statements, and wherein the trusted layer further includes:
  D) a bytecode execution engine configured to execute the compiled bytecode program statements.

18. The programmed computer as recited in claim 17, wherein the compiler is configured to initially compile the source code symbolic information input by the user to a delta portion of the target program which is stored in the on-chip RAM, and wherein the trusted layer further includes:
  E) a code access module which is configured to merge the delta portion of the target program stored in the on-chip RAM with a base portion of the target program stored in the on-chip programmable non-volatile memory prior to execution of the target program.

19. The programmed computer as recited in claim 11, wherein the trusted layer further includes:
  D) a text editor configured to permit the user to enter and manipulate lines of source code symbolic information.

20. The programmed computer as recited in claim 11, wherein the trusted layer further includes:
  D) a command interpreter configured to receive an "upgrade" command; and
  E) a small upgrade control program which is adapted to be copied to the on-chip RAM of the microcontroller chip and executed therefrom upon receipt of the "upgrade" command by the command interpreter, in order to reprogram the on-chip programmable non-volatile memory with a new version of the operating system.

21. The programmed computer as recited in claim 17, further comprising a bytecode de-compiler which is configured to translate the compiled bytecode program statements into textual program statements.

22. A programmed microcontroller for embedded systems comprising:
a) a microcontroller chip having:
  i) at least one on-chip CPU core,
  ii) on-chip memory including an on-chip programmable non-volatile memory and an on-chip RAM,
  iii) an on-chip communications interface adapted to be connected to a user terminal and configured to receive and transmit source code symbolic information, and in particular, to receive program lines of source code symbolic information input by a user through the user terminal, wherein the source code symbolic information which the on-chip serial communications interface is configured to receive and transmit includes source code lines, variable names, and variable contents, and iv) I/O pins adapted to interface between the microcontroller chip and a system in which the microcontroller chip is to be embedded; and b) an operating system including a trusted layer which is wholly programmed into the on-chip programmable non-volatile memory and which is configured to run on the CPU core, the trusted layer including:

A) a compiler configured to automatically and individually compile, on a line-by-line basis, the program lines of source code symbolic information input by the user through the user terminal into a target program comprising a plurality of compiled bytecode program statements, I) wherein the compiler is configured to error-check and compile each individual program line of source code symbolic information input by the user in which a valid program statement is found, and to perform such compilation immediately, as each such program line is entered by the user, without any compile command being issued by the user, and II) wherein the compiler is further configured to immediately report an error to the user via the on-chip communications interface when the user enters a program line of source code symbolic information that is found not to comprise a valid program statement;

B) a non-volatile memory controller configured to save the target program to the on-chip programmable non-volatile memory;

C) an interactive debugger operatively configured to enable interactive debugging of the target program and capable of altering program execution of the target program by continuing execution of the target program after the target program is modified;

D) a pin controller selectively configuring the I/O pins of the microcontroller chip to be input pins or output pins; and E) an interrupt service module including:

I) an on-chip event detector which is configured to detect an asynchronous on-chip event specified in the target program during execution of the target program; and II) trampoline code which is configured to invoke, in response to the event detected by the on-chip event detector, an application-level interrupt handler which handles an interrupt specified for the event by executing a specific portion of the target program;

wherein the trusted layer is configured to run the target program in an application layer.

23. The programmed microcontroller as recited in claim 22, wherein the microcontroller chip further includes a timer, and the on-chip event is an expiration of the timer.

24. The programmed microcontroller as recited in claim 22, wherein the microcontroller chip further includes a UART with transmit and receive buffers, and the on-chip event is a transition in the presence of data in one of the transmit and receive buffers.

25. The programmed microcontroller as recited in claim 22, wherein the interrupt service module is configured to selectively mask the interrupt for later servicing.

26. The programmed microcontroller as recited in claim 22, wherein the interactive debugger is configured to provide insertable breakpoints in the target program, to provide single-stepping operation of the target program, and to provide execution tracing of the target program.

27. The programmed microcontroller as recited in claim 22, wherein the interactive debugger is additionally configured to alter program execution by I) continuing execution of the target program from a line different than where execution of the target program left off, and II) continuing execution of the target program after data that is tested conditionally during program execution is altered.

28. The programmed microcontroller as recited in claim 22, wherein the trusted layer further includes:

F) a bytecode execution engine configured to a) execute the compiled bytecode program statements as part of the target program and b) execute an individual compiled bytecode program statement immediately, apart from any target program.

29. The programmed microcontroller as recited in claim 22, wherein the microcontroller chip further includes:

v) I/O registers connected to the I/O pins for reading current pin states and storing output pin data;

wherein trusted layer further includes:

F) a variable access module configured to define at least one pin variable which is bound to one of the I/O pins of the microcontroller chip through one of the I/O registers; and wherein the variable access module is configured so that manipulation of each pin variable bound to one of the I/O pins configured as an output pin will cause a state of the output pin to change correspondingly, and examination by the target program of each pin variable bound to one of the I/O pins configured as an input pin will cause a state of the input pin to be detected accordingly.

30. The programmed microcontroller as recited in claim 22, wherein the trusted layer further includes:

F) a variable access module configured to define at least one flash variable, for use in the target program, which is stored in the on-chip programmable non-volatile memory rather than in the on-chip RAM.

31. The programmed microcontroller as recited in claim 22, wherein the compiler is configured to initially compile the program lines of the source code symbolic information input by the user to a delta portion of the target program which is stored in the on-chip RAM, and wherein the trusted layer further includes:

F) a code access module which is configured to merge the delta portion of the target program stored in the on-chip RAM with a base portion of the target program stored in the on-chip programmable non-volatile memory.

32. The programmed microcontroller as recited in claim 22, wherein the trusted layer further includes:

F) a command interpreter configured to receive an "upgrade" command; and

G) a small upgrade control program which is adapted to be copied to the on-chip RAM of the microcontroller chip and executed therefrom upon receipt of the "upgrade" command by the command interpreter, in order to reprogram the on-chip programmable non-volatile memory with a new version of the operating system.

33. The programmed microcontroller as recited in claim 22, further comprising a bytecode de-compiler which is configured to translate the compiled bytecode program statements into textual program statements.

34. The programmed microcontroller as recited in claim 22, wherein the trusted layer further includes:

F) a text editor configured to permit the user to enter and manipulate lines of source code symbolic information.

35. A programmed microcontroller for embedded systems comprising:
 a) a microcontroller chip having:
  i) at least one on-chip CPU core,
  ii) on-chip memory including an on-chip programmable non-volatile memory and an on-chip RAM,
  iii) an on-chip communications interface adapted to be connected to a user terminal and configured to receive and transmit source code symbolic information,
  iv) I/O pins adapted to interface between the microcontroller chip and a system in which the microcontroller chip is to be embedded, and
  v) I/O registers connected to the I/O pins for reading current pin states and storing output pin data; and
 b) an operating system including a trusted layer which is wholly programmed into the on-chip programmable non-volatile memory and which is configured to run on the CPU core, the trusted layer including:
  A) a compiler configured to compile the source code symbolic information input by a user through the user terminal into a target program comprising a plurality of compiled bytecode program statements to be stored in the on-chip memory;
  B) a non-volatile memory controller configured to save the target program to the programmable non-volatile memory;
  C) a pin controller for selectively configuring at least one of the I/O pins of the microcontroller chip, wherein each I/O pin configured by the pin controller is configured as one of an input pin and an output pin;
  D) a variable access module configured to provide access to named program variables and to define at least one pin variable which is bound to one of the I/O pins of the microcontroller chip through one of the I/O registers; and
  E) a bytecode execution engine configured to execute the compiled bytecode program statements;
 wherein the variable access module provides access to the named program variables, including the at least one pin variable, during bytecode execution,
 wherein the variable access module is configured so that manipulation by the target program of each pin variable bound to one of the I/O pins configured as an output pin will cause a state of the output pin to change correspondingly, and examination by the target program of each pin variable bound to one of the I/O pins configured as an input pin will cause a state of the input pin to be detected accordingly; and
 wherein the trusted layer is configured to run the target program in an application layer.

36. The programmed microcontroller as recited in claim 35, wherein the variable access module is further configured to define at least one flash variable, for use in the target program, which is stored in the on-chip programmable non-volatile memory rather than in the on-chip RAM.

37. The programmed microcontroller as recited in claim 35, wherein the compiler is configured to individually compile, on a line-by-line basis, program lines of the source code symbolic information input by the user through the user terminal into the target program.

38. The programmed microcontroller as recited in claim 35, wherein the trusted layer further includes:
 F) an interactive debugger operatively configured to enable interactive debugging of the target program and capable of altering program execution of the target program by at least one of I) continuing execution of the target program from a line different than where execution of the target program left off, II) continuing execution of the target program after the target program is modified, and III) continuing execution of the target program after data that is tested conditionally during program execution is altered.

39. The programmed microcontroller as recited in claim 35, wherein the trusted layer further includes:
 F) an interactive debugger operatively configured to enable interactive debugging of the target program and capable of altering program execution of the target program by continuing execution of the target program after the target program is modified.

40. The programmed microcontroller for embedded systems as recited in claim 35, wherein the bytecode execution engine is configured to a) execute the compiled bytecode program statements as part of the target program and b) execute an individual compiled bytecode program statement immediately, apart from any target program.

41. The programmed microcontroller for embedded systems as recited in claim 35, wherein the pin controller configures at least one of the I/O pins of the microcontroller chip as an analog input pin, and wherein one of the at least one pin variables is bound to the analog input pin configured by the pin controller.

42. The programmed microcontroller for embedded systems as recited in claim 37, wherein the trusted layer further comprises:
 F) an interrupt service module including:
  I) an on-chip event detector which is configured to detect an asynchronous on-chip event specified in the target program during execution of the target program; and
  II) trampoline code which is configured to invoke, in response to the event detected by the on-chip event detector, an application-level interrupt handler which handles an interrupt specified for the event by executing a specific portion of the target program.

43. The programmed microcontroller as recited in claim 35, further comprising a bytecode de-compiler which is configured to translate the compiled bytecode program statements into textual program statements.

44. The programmed microcontroller as recited in claim 35, wherein the trusted layer further includes:
 F) a text editor configured to permit the user to enter and manipulate lines of source code symbolic information.

45. A programmed microcontroller for embedded systems comprising:
 a) a microcontroller chip having:
  i) at least one on-chip CPU core,
  ii) on-chip memory including an on-chip programmable non-volatile memory and an on-chip RAM,
  iii) an on-chip communications interface adapted to be connected to a user terminal and configured to receive and transmit program lines of source code symbolic information,
  iv) I/O pins adapted to interface between the microcontroller chip and a system in which the microcontroller chip is to be embedded, and
  v) I/O registers connected to the I/O pins for reading current pin states and storing output pin data; and
 b) an operating system including a trusted layer which is wholly programmed into the on-chip programmable non-volatile memory and which is configured to run on the CPU core, the trusted layer including:
  A) a compiler configured to compile the source code symbolic information input by a user through the user terminal into a target program to be stored in the on-chip memory;

B) an interactive debugger operatively configured to enable interactive debugging of the target program and capable of altering program execution of the target program by continuing execution of the target program after the target program is modified;

C) an interrupt service module including:
   I) an on-chip event detector which is configured to detect an asynchronous on-chip event specified in the target program during execution of the target program; and
   II) trampoline code which is configured to invoke, in response to the event detected by the on-chip event detector, an application-level interrupt handler which handles an interrupt specified for the event by executing a specific portion of the target program;

D) a pin controller for selectively configuring at least one of the I/O pins of the microcontroller chip, wherein each I/O pin configured by the pin controller is configured as one of an input pin and an output pin; and E) a variable access module configured to define at least one pin variable, wherein each pin variable defined by the variable access module is bound to one of the I/O pins configured by the pin controller through one of the I/O registers, wherein the variable access module is configured in such a manner that manipulation of each pin variable bound to one of the I/O pins configured as an output pin by the pin controller will cause a state of the output pin to change correspondingly, and examination of each pin variable bound to one of the I/O pins configured as an input pin by the pin controller will cause a state of the input pin to be detected; and wherein the trusted layer is configured to run the target program in an application layer.

46. The programmed microcontroller as recited in claim 22, wherein the trusted layer further includes:
   F) a bytecode execution engine configured to execute the compiled bytecode program statements.

* * * * *